United States Patent
Bequet et al.

(10) Patent No.: US 9,684,544 B1
(45) Date of Patent: *Jun. 20, 2017

(54) DISTRIBUTED DATA SET STORAGE AND ANALYSIS REPRODUCIBILITY

(71) Applicant: SAS Institute Inc., Cary, NC (US)

(72) Inventors: Henry Gabriel Victor Bequet, Cary, NC (US); Kais Arfaoui, Raleigh, NC (US); Ronald Earl Stogner, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,886

(22) Filed: Feb. 6, 2017

Related U.S. Application Data

(63) Continuation of application No. 15/425,749, filed on Feb. 6, 2017.

(60) Provisional application No. 62/292,078, filed on Feb. 5, 2016, provisional application No. 62/297,454, filed on Feb. 19, 2016.

(51) Int. Cl.
  *G06F 9/46* (2006.01)
  *G06F 9/50* (2006.01)
  *G06F 17/30* (2006.01)

(52) U.S. Cl.
  CPC ...... *G06F 9/5083* (2013.01); *G06F 17/30949* (2013.01); *G06F 17/30985* (2013.01)

(58) Field of Classification Search
  None
  See application file for complete search history.

(56) References Cited

U.S. PATENT DOCUMENTS

| | | | |
|---|---|---|---|
| 5,581,691 A * | 12/1996 | Hsu | G06F 9/466 714/15 |
| 6,088,694 A | 7/2000 | Burns et al. | |
| 6,496,978 B1 * | 12/2002 | Ito | G06F 8/65 711/103 |
| 7,421,458 B1 | 9/2008 | Taylor et al. | |
| 7,433,896 B2 | 10/2008 | Owen et al. | |
| 7,533,115 B2 | 5/2009 | Chou et al. | |

(Continued)

OTHER PUBLICATIONS

Chen et al., "Efficient Algorithms for Pattern Matching on Directed Acyclic Graphs", Proceedings of the 21st International Conference on Data Engineering (ICDE 2005), 2 pages.

(Continued)

*Primary Examiner* — Hiren Patel

(57) ABSTRACT

An apparatus includes a processor and a storage storing instructions causing the processor to: maintain a federated area; receive a request to perform a job flow with a data set from a remote device; retrieve a job flow definition specifying the tasks of the job flow from the federated area; determine whether there is an instance log in the federated area generated by a previous performance of the job flow with the data set; in response to there being such an instance log, retrieve the version specified in the instance log of each task routine for each task from the federated area; in response to there being no such instance log, retrieve the most recent version of each task routine; perform the job flow with the retrieved versions of the task routines and the data set to generate a result report; and provide the result report to the remote device.

29 Claims, 38 Drawing Sheets

(56) References Cited

U.S. PATENT DOCUMENTS

| | | | |
|---|---|---|---|
| 7,676,478 B2* | 3/2010 | Rausch | G06F 17/30592 707/999.1 |
| 8,751,464 B1 | 6/2014 | Weiss et al. | |
| 8,782,631 B2 | 7/2014 | Volkmer et al. | |
| 8,880,418 B2* | 11/2014 | Nonaka | G06Q 10/06311 705/7.11 |
| 9,026,577 B1* | 5/2015 | Johnston | G06Q 10/0633 709/202 |
| 2003/0009545 A1 | 1/2003 | Sahai et al. | |
| 2003/0115580 A1* | 6/2003 | Arai | G06F 8/443 717/158 |
| 2004/0010775 A1 | 1/2004 | Matsa et al. | |
| 2005/0131941 A1* | 6/2005 | Dettinger | G06F 17/30286 |
| 2005/0198639 A1* | 9/2005 | Matsui | G06Q 10/0633 718/100 |
| 2006/0026595 A1* | 2/2006 | Nakayama | G06Q 10/10 718/100 |
| 2006/0041558 A1 | 2/2006 | McCauley et al. | |
| 2006/0085412 A1 | 4/2006 | Johnson et al. | |
| 2007/0011334 A1* | 1/2007 | Higgins | G06F 11/3604 709/227 |
| 2007/0067373 A1* | 3/2007 | Higgins | G06F 11/3013 |
| 2007/0162324 A1* | 7/2007 | Suzuki | G06Q 10/06316 705/7.26 |
| 2008/0172679 A1 | 7/2008 | Shen et al. | |
| 2010/0088270 A1 | 4/2010 | Ziwegler | |
| 2011/0179058 A1* | 7/2011 | Purcell | G06Q 10/103 707/769 |
| 2013/0104134 A1* | 4/2013 | Chen | G06F 17/3089 718/102 |
| 2013/0226639 A1* | 8/2013 | Yokoyama | G06Q 10/06 705/7.14 |
| 2014/0067457 A1* | 3/2014 | Nagendra | G06Q 10/0633 705/7.27 |
| 2014/0258656 A1 | 9/2014 | Ju | |
| 2015/0082317 A1* | 3/2015 | You | G06F 9/5094 718/104 |
| 2015/0261573 A1* | 9/2015 | Rausch | G06F 9/4881 718/106 |
| 2016/0034706 A1* | 2/2016 | Munakata | G06F 21/6245 726/28 |
| 2016/0063145 A1* | 3/2016 | Chang | H04L 65/403 703/6 |
| 2016/0350107 A1* | 12/2016 | Bragg, Jr. | G06F 8/71 |
| 2016/0378443 A1* | 12/2016 | Sun | G06F 21/00 717/140 |
| 2017/0017912 A1* | 1/2017 | Teraguchi | G06Q 10/0635 |
| 2017/0026441 A1* | 1/2017 | Moudy | G06F 17/00 |
| 2017/0093988 A1* | 3/2017 | Rehaag et al. | H04L 67/142 |

OTHER PUBLICATIONS

"How Object Pooling Works", retrieved from <http://msdn.microsoft.com/en-us/library/ms679797(d=printer, v=vs.85).aspx>, Mar. 8, 2010 (author unknown).

Zhu et al., "Federated Content Management Assessing Content from Disparate Repositories with IBM Content Federation Services and IBM Content Integrator", IBM.com/redbooks, Apr. 2010, pages.

* cited by examiner

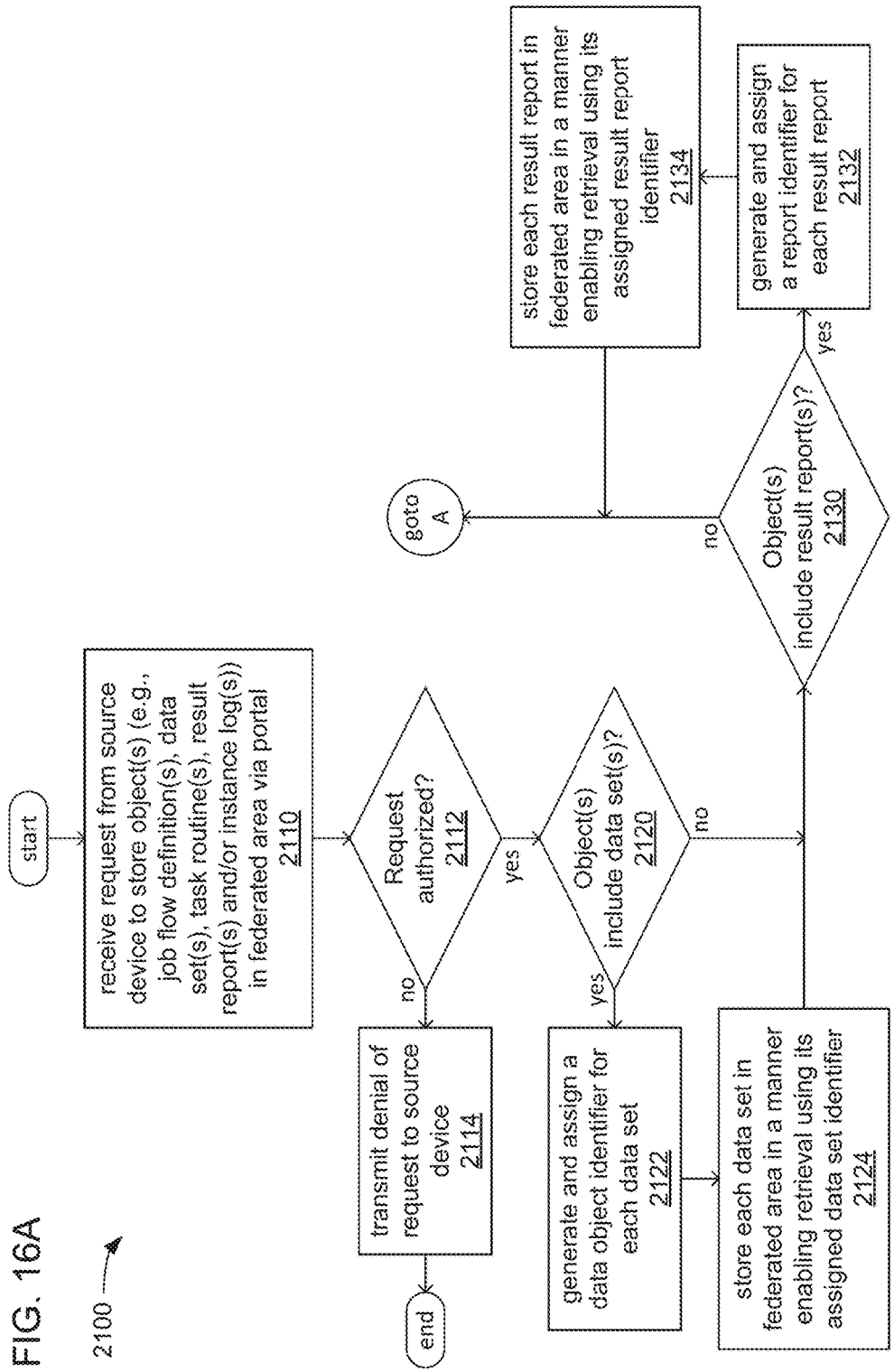

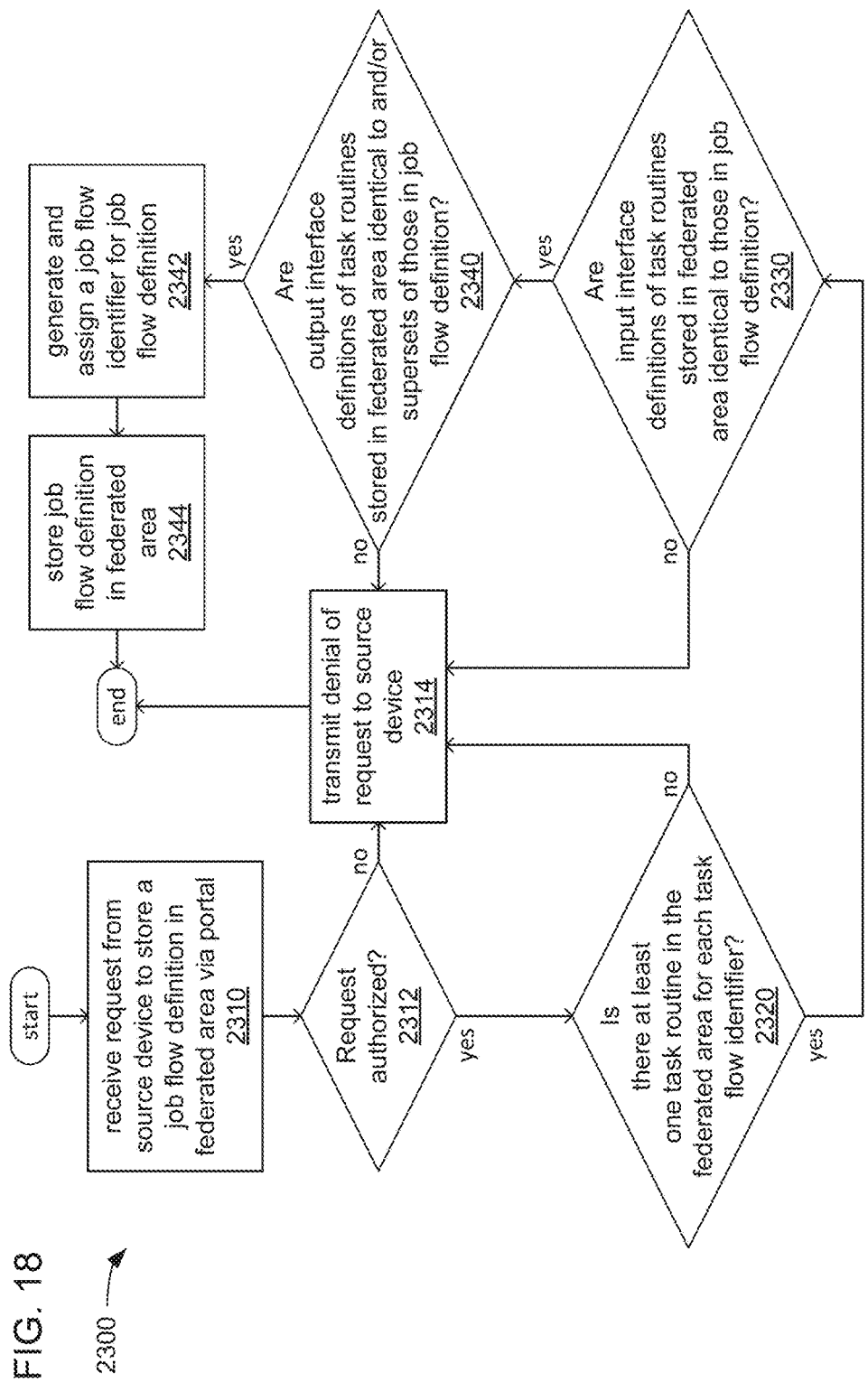

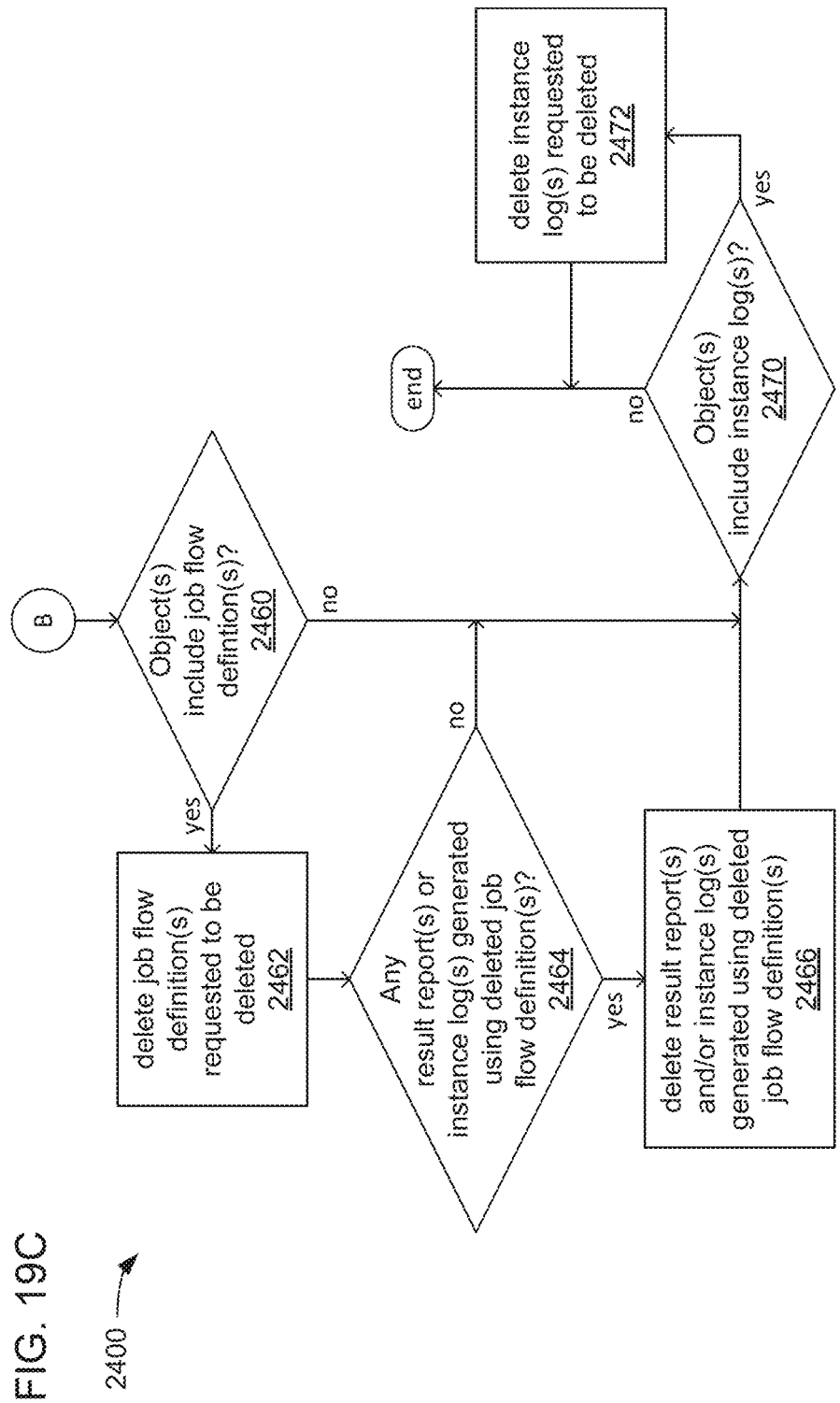

2500

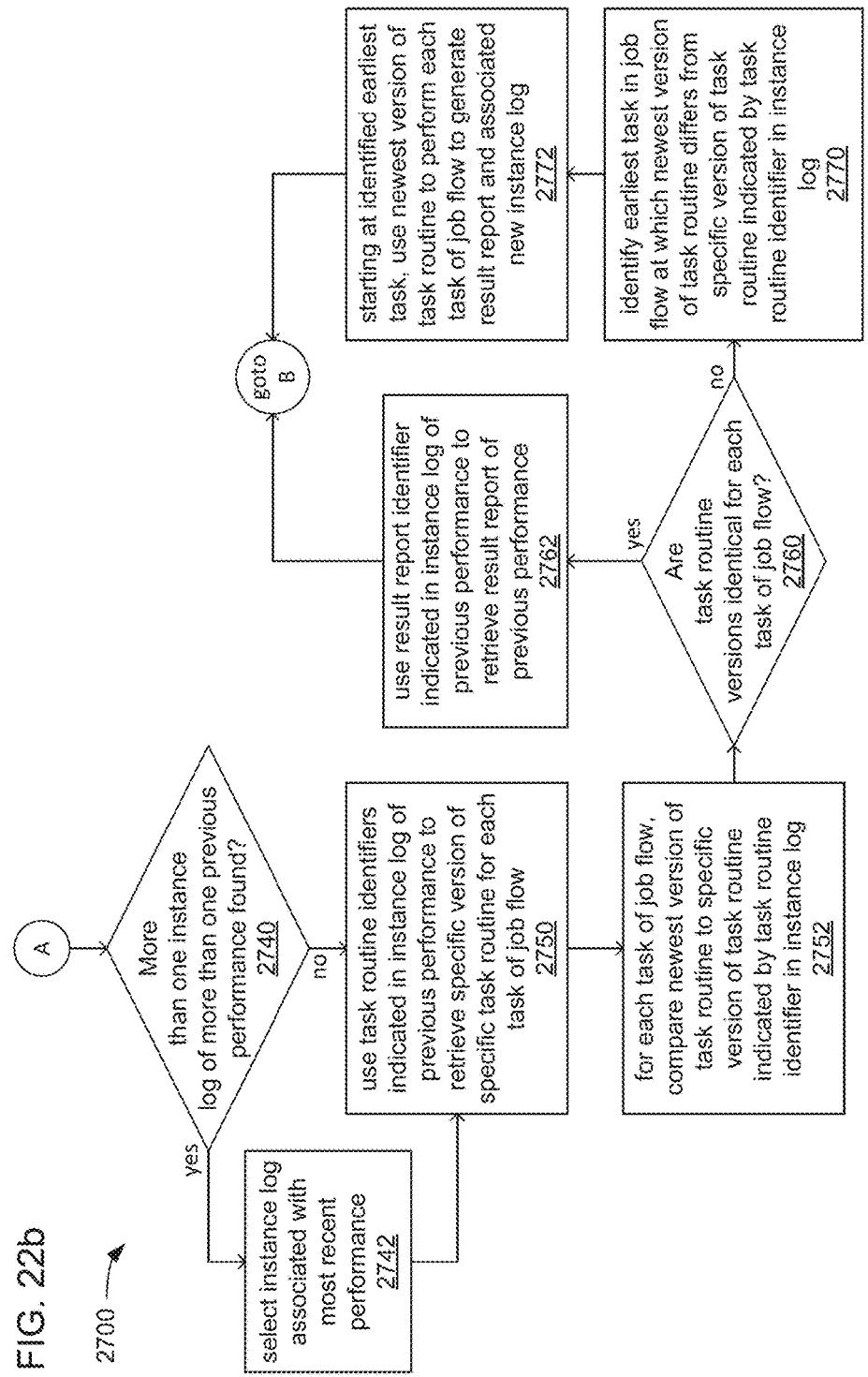

DISTRIBUTED DATA SET STORAGE AND ANALYSIS REPRODUCIBILITY

CROSS-REFERENCE TO RELATED APPLICATIONS

This application claims the benefit of priority under 35 U.S.C. §119(e) to U.S. Provisional Application Ser. No. 62/292,078 filed Feb. 5, 2016, and to U.S. Provisional Application Ser. No. 62/297,454 filed Feb. 19, 2016, the entirety of each of which is incorporated herein by reference. This application is a continuation of, and claims the benefit of priority under 35 U.S.C. §120 to, U.S. patent application Ser. No. 15/425,749 filed concurrently herewith on Feb. 6, 2017, the entirety of which is incorporated herein by reference.

BACKGROUND

Distributed development of task routines and the performance of analysis tasks using pooled task routines with pooled data has advanced to an extent that the addition of mechanisms for oversight to provide reproducibility and accountability has become increasingly desired. In various scientific, technical and other areas, the quantities of data employed in performing analysis tasks have become ever larger, thereby making desirable the pooling of data objects to share costs and/or improve access. Also, such large quantities of data, by virtue of the amount and detail of the information they contain, have become of such value that it has become desirable to find as many uses as possible for such data in peer reviewing and in as wide a variety of analysis tasks. Thus, the pooling of components of analysis routines to enable reuse, oversight and error checking has also become desirable.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to perform operations including: maintain, within one or more storage devices, a federated area to store multiple data sets, multiple job flow definitions, multiple task routines, multiple result reports and multiple instance logs; provide, on a network, a portal to control access by a remote device to the federated area via the network; receive, at the portal, and from the remote device via the network, a first request to execute at least one task routine stored in the federated area to perform at least one corresponding task of a job flow described in a job flow definition stored in the federated area with at least one data set stored in the federated area, wherein the first request specifies the job flow definition and the at least one data set; retrieve the job flow definition from among the multiple job flow definitions stored in the federated area, wherein the job flow definition includes a flow task identifier to identify each task of the job flow and specifies a relative order in which each task is to be performed in the job flow; for each task of the job flow, retrieve, from among the multiple task routines stored in the federated area, a most recent version of the corresponding task routine of the at least one task routine; and determine whether there is an instance log among the multiple instance logs stored in the federated area that was generated by a previous performance of the at least one task of the job flow with the at least one data set. In response to a determination that there is an instance log among the multiple instance logs stored in the federated area that was generated by a previous performance of the at least one task of the job flow with the at least one data set, the processor may be caused to perform operations including: retrieve, from among the multiple task routines stored in the federated area, a version specified by the instance log of each task routine of the at least one task routine; and for each task of the at least one task of the job flow, compare the version specified by the instance log of each task routine of the at least one task routine to the most recent version of each task routine of the at least one task routine. In response to each version specified by the instance log of each task routine of the at least one task routine matching the most recent version of the same task routine, the processor may be caused to perform operations including: retrieve a result report that was generated by the previous performance of the at least one task of the job flow along with the instance log; and provide access to the result report to the remote device via the network.

In response to a determination that there is no instance log among the multiple instance logs stored in the federated area that was generated by a previous performance of the at least one task of the job flow with the at least one data set, the processor may be caused to perform operations including: retrieve the at least one data set from among the multiple data sets stored in the federated area; execute the retrieved version of each task routine of the at least one task routine to perform the at least one corresponding task of the job flow with the at least one data set to generate a new result report and a new instance log; store the new result report among the multiple result reports in the federated area; store the new instance log among the multiple instance logs in the federated area; and provide access to the new result report to the remote device via the network. In the generation of the new instance log, the processor may be caused to perform operations including: take at least a first hash of the at least one data set; take at least a second hash of the retrieved version of a task routine of the at least one task routine; take at least a third hash of the new result report; concatenate at least the first, second and third hashes to generate a string; and generate the new instance log to include the string.

In response to one version specified by the instance log of a task routine of the at least one task routine not matching the most recent version of the same task routine, the processor may be caused to perform operations including: retrieve the at least one data set from among the multiple data sets stored in the federated area; starting with an earliest task to be performed of the at least one task of the job flow indicated in the job flow definition, identify the earliest task for which the version of the corresponding task routine specified by the instance log does not match the most recent version of the same task routine; for each task of the at least one task of the job flow, starting with the identified earliest task, execute the most recent version of the corresponding task routine of the at least one task routine to generate a new result report and a new instance log; store the new result report among the multiple result reports in the federated area; store the new instance log among the multiple instance logs in the federated area; and provide access to the new result report to the remote device via the network.

The determination of whether there is an instance log among the multiple instance logs stored in the federated area that was generated by a previous performance of the at least one task of the job flow with the at least one data set may include a determination, by the processor, of whether there is more than one instance log among the multiple instance logs that were each generated by a previous performance of the at least one task of the job flow with the at least one data set. In response to a determination that there is more than one instance log among the multiple instance logs that were each generated by a previous performance of the at least one task of the job flow with the at least one data set, the processor may be caused to retrieve, from among the multiple task routines stored in the federated area, a version of each task routine of the at least one task routine specified by the most recently generated one of the more than one instance logs.

In the comparison of the version specified by the instance log of each task routine to the most recent version of each task routine for each task of the at least one task of the job flow, the processor may be caused to compare a hash taken of the version specified by the instance log of each task routine to a hash taken of the most recent version of each task routine for each task of the at least one task of the job flow. In the determination of whether there is an instance log stored among the multiple instance logs that was generated by a previous performance of the at least one task of the job flow with the at least one data set, the processor may be caused to perform operations including: use at least one data set identifier of the at least one data set and a flow identifier of the job flow as portions of an index to a location in the federated area; and search the location for an instance log that was generated by a previous performance of the at least one task of the job flow with the at least one data set.

The processor may be caused to caused to perform operations including: receive, at the portal, and from a source device via the network, a second request to store a task routine among the multiple task routines in the federated area, wherein the task routine includes a flow task identifier to indicate a corresponding task that is performed when the task routine is executed; determine whether another task routine is already stored among the multiple task routines in the federated area that includes the same flow task identifier to indicate that the same corresponding task is performed when the other task routine is executed; and in response to a determination that another task routine is already stored among the multiple task routines that includes the same flow task identifier, store the task routine among the multiple task routines and store an indication of the storage of more than one task routine including the same flow task identifier in the federated area.

For each task of the at least one task of the job flow, the job flow definition may include a corresponding flow task identifier; and in the retrieval of a task routine for each task of the at least one task of the job flow, the processor may be caused to use the corresponding task flow identifier as at least a portion of an index to a location in the federated area.

The processor may be caused to perform operations including: prior to the determination of whether there is an instance log that was generated by a previous performance of the at least one task, determine whether the first request is authorized; condition performance of the retrieval of the job flow definition, the retrieval of the most recent version of the at least one task routine, and the determination of whether there is an instance log that was generated by a previous performance of the at least one task, the performance of the at least one task on the determination of whether the first request is authorized; and in response to a determination that the first request is not authorized, provide an indication of a denial of the first request to the remote device via the network.

A computer-program product tangibly embodied in a non-transitory machine-readable storage medium, the computer-program product including instructions operable to cause a processor to perform operations including: maintain, within one or more storage devices, a federated area to store multiple data sets, multiple job flow definitions, multiple task routines, multiple result reports and multiple instance logs; provide, on a network, a portal to control access by a remote device to the federated area via the network; receive, at the portal, and from the remote device via the network, a first request to execute at least one task routine stored in the federated area to perform at least one corresponding task of a job flow described in a job flow definition stored in the federated area with at least one data set stored in the federated area, wherein the first request specifies the job flow definition and the at least one data set; retrieve the job flow definition from among the multiple job flow definitions stored in the federated area, wherein the job flow definition includes a flow task identifier to identify each task of the job flow and specifies a relative order in which each task is to be performed in the job flow; for each task of the job flow, retrieve, from among the multiple task routines stored in the federated area, a most recent version of the corresponding task routine of the at least one task routine; and determine whether there is an instance log among the multiple instance logs stored in the federated area that was generated by a previous performance of the at least one task of the job flow with the at least one data set. In response to a determination that there is an instance log among the multiple instance logs stored in the federated area that was generated by a previous performance of the at least one task of the job flow with the at least one data set, the processor may be caused to perform operations including: retrieve, from among the multiple task routines stored in the federated area, a version specified by the instance log of each task routine of the at least one task routine; and for each task of the at least one task of the job flow, compare the version specified by the instance log of each task routine of the at least one task routine to the most recent version of each task routine of the at least one task routine. In response to each version specified by the instance log of each task routine of the at least one task routine matching the most recent version of the same task routine, the processor may be caused to perform operations including: retrieve a result report that was generated by the previous performance of the at least one task of the job flow along with the instance log; and provide access to the result report to the remote device via the network.

In response to a determination that there is no instance log among the multiple instance logs stored in the federated area that was generated by a previous performance of the at least one task of the job flow with the at least one data set, the processor may be caused to perform operations including: retrieve the at least one data set from among the multiple data sets stored in the federated area; execute the retrieved version of each task routine of the at least one task routine to perform the at least one corresponding task of the job flow with the at least one data set to generate a new result report and a new instance log; store the new result report among the multiple result reports in the federated area; store the new instance log among the multiple instance logs in the federated area; and provide access to the new result report to the remote device via the network. In the generation of the new instance log, the processor may be caused to perform operations including: take at least a first hash of the at least one data set; take at least a second hash of the retrieved version of a task routine of the at least one task routine; take at least a third hash of the new result report; concatenate at least the first, second and third hashes to generate a string; and use the string as an index to a location in the federated area at which the new instance log is stored.

In response to one version specified by the instance log of a task routine of the at least one task routine not matching the most recent version of the same task routine, the processor may be caused to perform operations including: retrieve the at least one data set from among the multiple data sets stored in the federated area; starting with an earliest task to be performed of the at least one task of the job flow indicated in the job flow definition, identify the earliest task for which the version of the corresponding task routine specified by the instance log does not match the most recent version of the same task routine; for each task of the at least one task of the job flow, starting with the identified earliest task, execute the most recent version of the corresponding task routine of the at least one task routine to generate a new result report and a new instance log; store the new result report among the multiple result reports in the federated area; store the new instance log among the multiple instance logs in the federated area; and provide access to the new result report to the remote device via the network.

The determination of whether there is an instance log among the multiple instance logs stored in the federated area that was generated by a previous performance of the at least one task of the job flow with the at least one data set may include a determination, by the processor, of whether there is more than one instance log among the multiple instance logs that were each generated by a previous performance of the at least one task of the job flow with the at least one data set. In response to a determination that there is more than one instance log among the multiple instance logs that were each generated by a previous performance of the at least one task of the job flow with the at least one data set, the processor may be caused to retrieve, from among the multiple task routines stored in the federated area, a version of each task routine of the at least one task routine specified by the most recently generated one of the more than one instance logs.

In the comparison of the version specified by the instance log of each task routine to the most recent version of each task routine for each task of the at least one task of the job flow, the processor may be caused to compare a hash taken of the version specified by the instance log of each task routine to a hash taken of the most recent version of each task routine for each task of the at least one task of the job flow. In the determination of whether there is an instance log stored among the multiple instance logs that was generated by a previous performance of the at least one task of the job flow with the at least one data set, the processor is caused to perform operations including: use at least one data set identifier of the at least one data set and a flow identifier of the job flow as portions of an index to a location in the federated area; and search the location for an instance log that was generated by a previous performance of the at least one task of the job flow with the at least one data set.

The processor may be caused to perform operations including, receive, at the portal, and from a source device via the network, a second request to store a task routine among the multiple task routines in the federated area, wherein the task routine includes: a flow task identifier to indicate a corresponding task that is performed when the task routine is executed; an input interface by which the task routine is to receive the at least one data set; and an output interface. The processor may be caused to perform operations including determine whether another task routine is already stored among the multiple task routines in the federated area that includes the same flow task identifier to indicate that the same corresponding task is performed when the other task routine is executed. In response to a determination that another task routine is already stored among the multiple task routines that includes the same flow task identifier, the processor may be caused to perform operations including: compare the input interface to a corresponding input interface of the other task routine; compare the output interface to a corresponding output interface of the other task routine; and in response to a determination that the input interface matches the corresponding input interface, and in response to a determination that the output interface matches or is a superset of the corresponding output interface, store the task routine among the multiple task routines and store an indication of the storage of more than one task routine including the same flow task identifier in the federated area.

For each task of the at least one task of the job flow, the job flow definition may include a corresponding flow task identifier; and in the retrieval of a task routine for each task of the at least one task of the job flow, the processor may be caused to use the corresponding task flow identifier as at least a portion of an index to a location in the federated area.

The processor may be caused to perform operations including: prior to the determination of whether there is an instance log that was generated by a previous performance of the at least one task, determine whether the first request is authorized; condition performance of the retrieval of the job flow definition, the retrieval of the most recent version of the at least one task routine, and the determination of whether there is an instance log that was generated by a previous performance of the at least one task, the performance of the at least one task on the determination of whether the first request is authorized; and in response to a determination that the first request is not authorized, provide an indication of a denial of the first request to the remote device via the network.

A computer-implemented method may include: maintaining, at a server by a processor, and within one or more storage devices, a federated area to store multiple data sets, multiple job flow definitions, multiple task routines, multiple result reports and multiple instance logs; providing, at the server by the processor, a portal to control access by a remote device to the federated area through a network coupled to the server; receiving, at the portal at the server, and from the remote device via the network, a first request to execute at least one task routine stored in the federated area to perform at least one corresponding task of a job flow described in a job flow definition stored in the federated area with at least one data set stored in the federated area, wherein the first request specifies the job flow definition and the at least one data set; retrieving, by the processor, the job flow definition, and from among the multiple job flow definitions stored in the federated area, wherein the job flow definition includes a flow task identifier to identify each task of the job flow and specifies a relative order in which each task is to be performed in the job flow; for each task of the job flow, retrieving, by the processor and from among the multiple task routines stored in the federated area, a most recent version of the corresponding task routine of the at least one task routine; and determining, by the processor, whether there is an instance log among the multiple instance logs stored in the federated area that was generated by a previous performance of the at least one task of the job flow with the at least one data set. In response to a determination by the processor that there is an instance log among the multiple instance logs stored in the federated area that was generated by a previous performance of the at least one task of the job flow with the at least one data set, the method may include performing operations including: retrieving, by the processor, and from among the multiple task routines stored in the federated area, a version specified by the instance log of each task routine of the at least one task routine; and for each task of the at least one task of the job flow, comparing, by the processor, the version specified by the instance log of each task routine of the at least one task routine to the most recent version of each task routine of the at least one task routine. In response to each version specified by the instance log of each task routine of the at least one task routine matching the most recent version of the same task routine, the method may include performing operations including: retrieving, by the processor, and from among the multiple result reports, a result report that was generated by the previous performance of the at least one task of the job flow along with the instance log; and providing access to the result report to the remote device via the network.

The method may include, in response to a determination that there is no instance log among the multiple instance logs stored in the federated area that was generated by a previous performance of the at least one task of the job flow with the at least one data set, performing operations including: retrieving, by the processor, the at least one data set from among the multiple data sets stored in the federated area; executing the retrieved version of each task routine of the at least one task routine to perform the at least one corresponding task of the job flow with the at least one data set to generate a new result report and a new instance log; storing, by the processor, the new result report among the multiple result reports in the federated area; storing, by the processor, the new instance log among the multiple instance logs in the federated area; and providing access to the new result report to the remote device via the network. Generating the new instance log may include: taking, by the processor, at least a first hash of the at least one data set; taking, by the processor, at least a second hash of the retrieved version of a task routine of the at least one task routine; taking, by the processor, at least a third hash of the new result report; concatenating, by the processor, at least the first, second and third hashes to generate a string; and generating the new instance log to include the string.

The method may include, in response to one version specified by the instance log of a task routine of the at least one task routine not matching the most recent version of the same task routine, performing operations including: retrieving, by the processor, the at least one data set from among the multiple data sets stored in the federated area; starting with an earliest task to be performed of the at least one task of the job flow indicated in the job flow definition, identifying, by the processor, the earliest task for which the version of the corresponding task routine specified by the instance log does not match the most recent version of the same task routine; for each task of the at least one task of the job flow, starting with the identified earliest task, executing the most recent version of the corresponding task routine of the at least one task routine to generate a new result report and a new instance log; storing, by the processor, the new result report among the multiple result reports in the federated area; storing, by the processor, the new instance log among the multiple instance logs in the federated area; and providing access to the new result report to the remote device via the network.

Determining whether there is an instance log among the multiple instance logs stored in the federated area that was generated by a previous performance of the at least one task of the job flow with the at least one data set may include determining, by the processor, whether there is more than one instance log among the multiple instance logs that were each generated by a previous performance of the at least one task of the job flow with the at least one data set. The method may include, in response to a determination that there is more than one instance log among the multiple instance logs that were each generated by a previous performance of the at least one task of the job flow with the at least one data set, retrieving, by the processor, and from among the multiple task routines stored in the federated area, a version of each task routine of the at least one task routine specified by the most recently generated one of the more than one instance logs.

Comparing the version specified by the instance log of each task routine to the most recent version of each task routine for each task of the at least one task of the job flow may include comparing, by the processor, a hash taken of the version specified by the instance log of each task routine to a hash taken of the most recent version of each task routine for each task of the at least one task of the job flow. Determining whether there is an instance log stored among the multiple instance logs that was generated by a previous performance of the at least one task of the job flow with the at least one data set may include: using, by the processor, at least one data set identifier of the at least one data set and a flow identifier of the job flow as portions of an index to a location in the federated area; and searching, by the processor, the location for an instance log that was generated by a previous performance of the at least one task of the job flow with the at least one data set.

The method may include: receiving, at the portal at the server, and from a source device via the network, a second request to store a task routine among the multiple task routines in the federated area, wherein the task routine includes a flow task identifier to indicate a corresponding task that is performed when the task routine is executed; determining, by the processor, whether another task routine is already stored among the multiple task routines in the federated area that includes the same flow task identifier to indicate that the same corresponding task is performed when the other task routine is executed; and in response to determining that another task routine is already stored among the multiple task routines that includes the same flow task identifier, storing, by the processor, the task routine among the multiple task routines and store an indication of the storage of more than one task routine including the same flow task identifier in the federated area.

For each task of the at least one task of the job flow, the job flow definition may include a corresponding flow task identifier; and the retrieving of a task routine for each task of the at least one task of the job flow may include using, by the processor, the corresponding task flow identifier as at least a portion of an index to a location in the federated area.

The method may include: prior to determining whether there is an instance log that was generated by a previous performance of the at least one task, determining, by the processor, whether the first request is authorized; conditioning the retrieving of the job flow definition, the retrieving of the most recent version of the at least one task routine, and the determining of whether there is an instance log that was generated by a previous performance of the at least one task, the performance of the at least one task on the determining of whether the first request is authorized; and in response determining that the first request is not authorized, providing an indication of a denial of the first request to the remote device via the network.

An apparatus may include a processor and a storage to store instructions that, when executed by the processor, cause the processor to perform operations including: maintain, within one or more storage devices, a federated area to store multiple data sets, multiple job flow definitions, multiple task routines, multiple result reports and multiple instance logs; provide, on a network, a portal to control access by a remote device to the federated area via the network; receive, at the portal, and from the remote device via the network, a first request to execute at least one task routine stored in the federated area to perform at least one corresponding task of a job flow specified in a job flow definition stored in the federated area with at least one data set stored in the federated area, wherein the first request specifies the job flow definition and the at least one data set; retrieve the job flow definition from among the multiple job flow definitions stored in the federated area; retrieve the at least one data set from among the multiple data sets stored in the federated area; determine whether there is an instance log among the multiple instance logs stored in the federated area that was generated by a previous performance of the at least one task of the job flow with the at least one data set; in response to a determination that there is an instance log among the multiple instance logs stored in the federated area that was generated by a previous performance of the at least one task of the job flow with the at least one data set, retrieve, from among the multiple task routines stored in the federated area, a version specified by the instance log of each task routine of the at least one task routine; in response to a determination that there is no instance log among the multiple instance logs stored in the federated area that was generated by a previous performance of the at least one task of the job flow with the at least one data set, retrieve, from among the multiple task routines stored in the federated area, a most recent version of each task routine of the at least one task routine; execute the retrieved version of each task routine of the at least one task routine to perform the at least one corresponding task of the job flow with the at least one data set to generate a new result report and a new instance log; store the new result report among the multiple result reports in the federated area; store the new instance log among the multiple instance logs in the federated area; and provide access to the new result report to the remote device via the network.

The determination of whether there is an instance log among the multiple instance logs stored in the federated area that was generated by a previous performance of the at least one task of the job flow with the at least one data set may include a determination, by the processor, of whether there is more than one instance log among the multiple instance logs that were each generated by a previous performance of the at least one task of the job flow with the at least one data set. In response to a determination that there is more than one instance log among the multiple instance logs that were each generated by a previous performance of the at least one task of the job flow with the at least one data set, the processor may be caused to perform operations including: provide, via the network, an indication of the more than one instance log and a second request to the remote device to select an instance log from among the more than one instance log; receive, at the portal, and from the remote device via the network, an indication of a selected instance log from among the more than one instance log; and retrieve, from among the multiple task routines stored in the federated area, a version of each task routine of the at least one task routine specified by the selected instance log.

The determination of whether there is an instance log among the multiple instance logs stored in the federated area that was generated by a previous performance of the at least one task of the job flow with the at least one data set may include a determination, by the processor, of whether there is more than one instance log among the multiple instance logs that were each generated by a previous performance of the at least one task of the job flow with the at least one data set. In response to a determination that there is more than one instance log among the multiple instance logs that were each generated by a previous performance of the at least one task of the job flow with the at least one data set, the processor may be caused to retrieve, from among the multiple task routines stored in the federated area, a version of each task routine of the at least one task routine specified by the most recently generated one of the more than one instance logs.

The processor is caused to perform operations including: prior to the determination of whether there is an instance log that was generated by a previous performance of the at least one task, determine whether the first request is authorized; condition performance of the determination of whether there is an instance log that was generated by a previous performance of the at least one task, the performance of the at least one task, and the storage of the new result report and the new instance log on the determination of whether the first request is authorized; and in response to a determination that the first request is not authorized, provide an indication of a denial of the first request to the remote device via the network.

In the generation of the new instance log, the processor may be caused to perform operations including: take at least a first hash of the at least one data set; take at least a second hash of the retrieved version of a task routine of the at least one task routine; take at least a third hash of the new result report; and concatenate at least the first, second and third hashes to generate a string. In the generation of the new instance log, the processor may be caused to generate the new instance log to include the string. In the storage of the new instance log among the multiple instance logs within the federated area, the processor may be caused to use the string as an index to a location in the federated area at which the new instance log is stored.

In the determination of whether there is an instance log stored among the multiple instance logs that was generated by a previous performance of the at least one task of the job flow with the at least one data set, the processor may be caused to perform operations including: use at least one data set identifier of the at least one data set and a flow identifier of the job flow as portions of an index to a location in the federated area; and search the location for an instance log that was generated by a previous performance of the at least one task of the job flow with the at least one data set.

The processor may be caused to caused to perform operations including: receive, at the portal, and from a source device via the network, a second request to store a task routine among the multiple task routines in the federated area, wherein the task routine includes a flow task identifier to indicate a corresponding task that is performed when the task routine is executed; determine whether another task routine is already stored among the multiple task routines in the federated area that includes the same flow task identifier to indicate that the same corresponding task is performed when the other task routine is executed; and in response to a determination that another task routine is already stored among the multiple task routines that includes the same flow task identifier, store the task routine among the multiple task routines and store an indication of the storage of more than one task routine including the same flow task identifier in the federated area.

For each task of the at least one task of the job flow, the job flow definition may include a corresponding flow task identifier; and in the retrieval of a task routine for each task of the at least one task of the job flow, the processor may be caused to use the corresponding task flow identifier as at least a portion of an index to a location in the federated area.

A computer-program product tangibly embodied in a non-transitory machine-readable storage medium, the computer-program product including instructions operable to cause a processor to perform operations including: maintain, within one or more storage devices, a federated area to store multiple data sets, multiple job flow definitions, multiple task routines, multiple result reports and multiple instance logs; provide, on a network, a portal to control access by a remote device to the federated area via the network; receive, at the portal, and from the remote device via the network, a first request to execute at least one task routine stored in the federated area to perform at least one corresponding task of a job flow specified in a job flow definition stored in the federated area with at least one data set stored in the federated area, wherein the first request specifies the job flow definition and the at least one data set; retrieve the job flow definition from among the multiple job flow definitions stored in the federated area; retrieve the at least one data set from among the multiple data sets stored in the federated area; determine whether there is an instance log among the multiple instance logs stored in the federated area that was generated by a previous performance of the at least one task of the job flow with the at least one data set; in response to a determination that there is an instance log among the multiple instance logs stored in the federated area that was generated by a previous performance of the at least one task of the job flow with the at least one data set, retrieve, from among the multiple task routines stored in the federated area, a version specified by the instance log of each task routine of the at least one task routine; in response to a determination that there is no instance log among the multiple instance logs stored in the federated area that was generated by a previous performance of the at least one task of the job flow with the at least one data set, retrieve, from among the multiple task routines stored in the federated area, a most recent version of each task routine of the at least one task routine; execute the retrieved version of each task routine of the at least one task routine to perform the at least one corresponding task of the job flow with the at least one data set to generate a new result report and a new instance log; store the new result report among the multiple result reports in the federated area; store the new instance log among the multiple instance logs in the federated area; and provide access to the new result report to the remote device via the network.

The determination of whether there is an instance log among the multiple instance logs stored in the federated area that was generated by a previous performance of the at least one task of the job flow with the at least one data set may include a determination, by the processor, of whether there is more than one instance log among the multiple instance logs that were each generated by a previous performance of the at least one task of the job flow with the at least one data set. In response to a determination that there is more than one instance log among the multiple instance logs that were each generated by a previous performance of the at least one task of the job flow with the at least one data set, the processor may be caused to perform operations including: provide, via the network, an indication of the more than one instance log and a second request to the remote device to select an instance log from among the more than one instance log; receive, at the portal, and from the remote device via the network, an indication of a selected instance log from among the more than one instance log; and retrieve, from among the multiple task routines stored in the federated area, a version of each task routine of the at least one task routine specified by the selected instance log.

The determination of whether there is an instance log among the multiple instance logs stored in the federated area that was generated by a previous performance of the at least one task of the job flow with the at least one data set may include a determination, by the processor, of whether there is more than one instance log among the multiple instance logs that were each generated by a previous performance of the at least one task of the job flow with the at least one data set. In response to a determination that there is more than one instance log among the multiple instance logs that were each generated by a previous performance of the at least one task of the job flow with the at least one data set, the processor may be caused to retrieve, from among the multiple task routines stored in the federated area, a version of each task routine of the at least one task routine specified by the most recently generated one of the more than one instance logs.

The processor may be caused to perform operations including: prior to the determination of whether there is an instance log that was generated by a previous performance of the at least one task, determine whether the first request is authorized; condition performance of the determination of whether there is an instance log that was generated by a previous performance of the at least one task, the performance of the at least one task, and the storage of the new result report and the new instance log on the determination of whether the first request is authorized; and in response to a determination that the first request is not authorized, provide an indication of a denial of the first request to the remote device via the network.

In the generation of the new instance log, the processor may be caused to perform operations including: take at least a first hash of the at least one data set; take at least a second hash of the retrieved version of a task routine of the at least one task routine; take at least a third hash of the new result report; and concatenate at least the first, second and third hashes to generate a string. In the generation of the new instance log, the processor may be caused to generate the new instance log to include the string. In the storage of the new instance log among the multiple instance logs within the federated area, the processor may be caused to use the string as an index to a location in the federated area at which the new instance log is stored.

In the determination of whether there is an instance log stored among the multiple instance logs that was generated by a previous performance of the at least one task of the job flow with the at least one data set, the processor may be caused to perform operations including: use at least one data set identifier of the at least one data set and a flow identifier of the job flow as portions of an index to a location in the federated area; and search the location for an instance log that was generated by a previous performance of the at least one task of the job flow with the at least one data set.

The processor may be caused to perform operations including: receive, at the portal, and from a source device via the network, a second request to store a task routine among the multiple task routines in the federated area, wherein the task routine includes: a flow task identifier to indicate a corresponding task that is performed when the task routine is executed; an input interface by which the task routine is to receive the at least one data set; and an output interface. The processor may be caused to determine whether another task routine is already stored among the multiple task routines in the federated area that includes the same flow task identifier to indicate that the same corresponding task is performed when the other task routine is executed. In response to a determination that another task routine is already stored among the multiple task routines that includes the same flow task identifier, the processor may be caused to perform operations including: compare the input interface to a corresponding input interface of the other task routine; compare the output interface to a corresponding output interface of the other task routine; and in response to a determination that the input interface matches the corresponding input interface, and in response to a determination that the output interface matches or is a superset of the corresponding output interface, store the task routine among the multiple task routines and store an indication of the storage of more than one task routine including the same flow task identifier in the federated area.

For each task of the at least one task of the job flow, the job flow definition may include a corresponding flow task identifier; and in the retrieval of a task routine for each task of the at least one task of the job flow, the processor may be caused to use the corresponding task flow identifier as at least a portion of an index to a location in the federated area.

A computer-implemented method may include: maintaining, at a server by a processor, and within one or more storage devices, a federated area to store multiple data sets, multiple job flow definitions, multiple task routines, multiple result reports and multiple instance logs; providing, at the server by the processor, a portal to control access by a remote device to the federated area through a network coupled to the server; receiving, at the portal at the server, and from the remote device via the network, a first request to execute at least one task routine stored in the federated area to perform at least one corresponding task of a job flow specified in a job flow definition stored in the federated area with at least one data set stored in the federated area, wherein the first request specifies the job flow definition and the at least one data set; retrieving, by the processor, the job flow definition from among the multiple job flow definitions stored in the federated area; retrieving, by the processor, the at least one data set from among the multiple data sets stored in the federated area; determining, by the processor, whether there is an instance log among the multiple instance logs stored in the federated area that was generated by a previous performance of the at least one task of the job flow with the at least one data set; in response to a determination by the processor that there is an instance log among the multiple instance logs stored in the federated area that was generated by a previous performance of the at least one task of the job flow with the at least one data set, retrieving, by the processor and from among the multiple task routines stored in the federated area, a version specified by the instance log of each task routine of the at least one task routine; executing the retrieved version of each task routine of the at least one task routine to perform the at least one corresponding task of the job flow with the at least one data set to generate a new result report and a new instance log; storing, by the processor, the new result report among the multiple result reports in the federated area; storing, by the processor, the new instance log among the multiple instance logs in the federated area; and providing access to the new result report to the remote device via the network.

Determining whether there is an instance log among the multiple instance logs stored in the federated area that was generated by a previous performance of the at least one task of the job flow with the at least one data set may include determining, by the processor, whether there is more than one instance log among the multiple instance logs that were each generated by a previous performance of the at least one task of the job flow with the at least one data set. The method may include, in response to a determination by the processor that there is more than one instance log among the multiple instance logs that were each generated by a previous performance of the at least one task of the job flow with the at least one data set, performing operations including: providing, via the network, an indication of the more than one instance log and a second request to the remote device to select an instance log from among the more than one instance log; receiving, at the portal of the server, and from the remove device via the network, an indication of a selected instance log from among the more than one instance log; and retrieving, by the processor, and from among the multiple task routines stored in the federated area, a version of each task routine of the at least one task routine specified by the selected instance log.

The method may include, in response to a determination by the processor that there is no instance log among the multiple instance logs stored in the federated area that was generated by a previous performance of the at least one task of the job flow with the at least one data set, retrieving by the processor and from among the multiple task routines stored in the federated area, a most recent version of each task routine of the at least one task routine.

The method may include: prior to determining whether there is an instance log that was generated by a previous performance of the at least one task, determining, by the processor, whether the first request is authorized; conditioning the determining of whether there is an instance log that was generated by a previous performance of the at least one task, the performing of the at least one task, and the storing of the new result report and the new instance log on the determining of whether the first request is authorized; and in response determining that the first request is not authorized, providing an indication of a denial of the first request to the remote device via the network.

Generating the new instance log may include: taking, by the processor, at least a first hash of the at least one data set; taking, by the processor, at least a second hash of the retrieved version of a task routine of the at least one task routine; taking, by the processor, at least a third hash of the new result report; and concatenating, by the processor, at least the first, second and third hashes to generate a string. Generating the new instance log may include generating the new instance log to include the string. Storing of the new instance log among the multiple instance logs within the federated area may include using, by the processor, the string as an index to a location in the federated area at which the new instance log is stored.

Determining whether there is an instance log stored among the multiple instance logs that was generated by a previous performance of the at least one task of the job flow with the at least one data set may include: using, by the processor, at least one data set identifier of the at least one data set and a flow identifier of the job flow as portions of an index to a location in the federated area; and searching, by the processor, the location for an instance log that was generated by a previous performance of the at least one task of the job flow with the at least one data set.

The method may include: receiving, at the portal at the server, and from a source device via the network, a second request to store a task routine among the multiple task routines in the federated area, wherein the task routine includes a flow task identifier to indicate a corresponding task that is performed when the task routine is executed; determining, by the processor, whether another task routine is already stored among the multiple task routines in the federated area that includes the same flow task identifier to indicate that the same corresponding task is performed when the other task routine is executed; and in response to determining that another task routine is already stored among the multiple task routines that includes the same flow task identifier, storing, by the processor, the task routine among the multiple task routines and store an indication of the storage of more than one task routine including the same flow task identifier in the federated area.

For each task of the at least one task of the job flow, the job flow definition may include a corresponding flow task identifier; and the retrieving of a task routine for each task of the at least one task of the job flow may include using, by the processor, the corresponding task flow identifier as at least a portion of an index to a location in the federated area.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 16A, 16B and 16C, together, illustrate an example embodiment of a logic flow of a federated device storing objects in a federated area.

FIG. 18 illustrates still another example embodiment of a logic flow of a federated device storing objects in a federated area.

FIGS. 19A, 19B and 19C, together, illustrate an example embodiment of a logic flow of a federated device deleting objects stored within a federated area.

FIGS. 22A and 22B, together, illustrate another example embodiment of a logic flow of a federated device performing a job flow.

DETAILED DESCRIPTION

Figure 1:
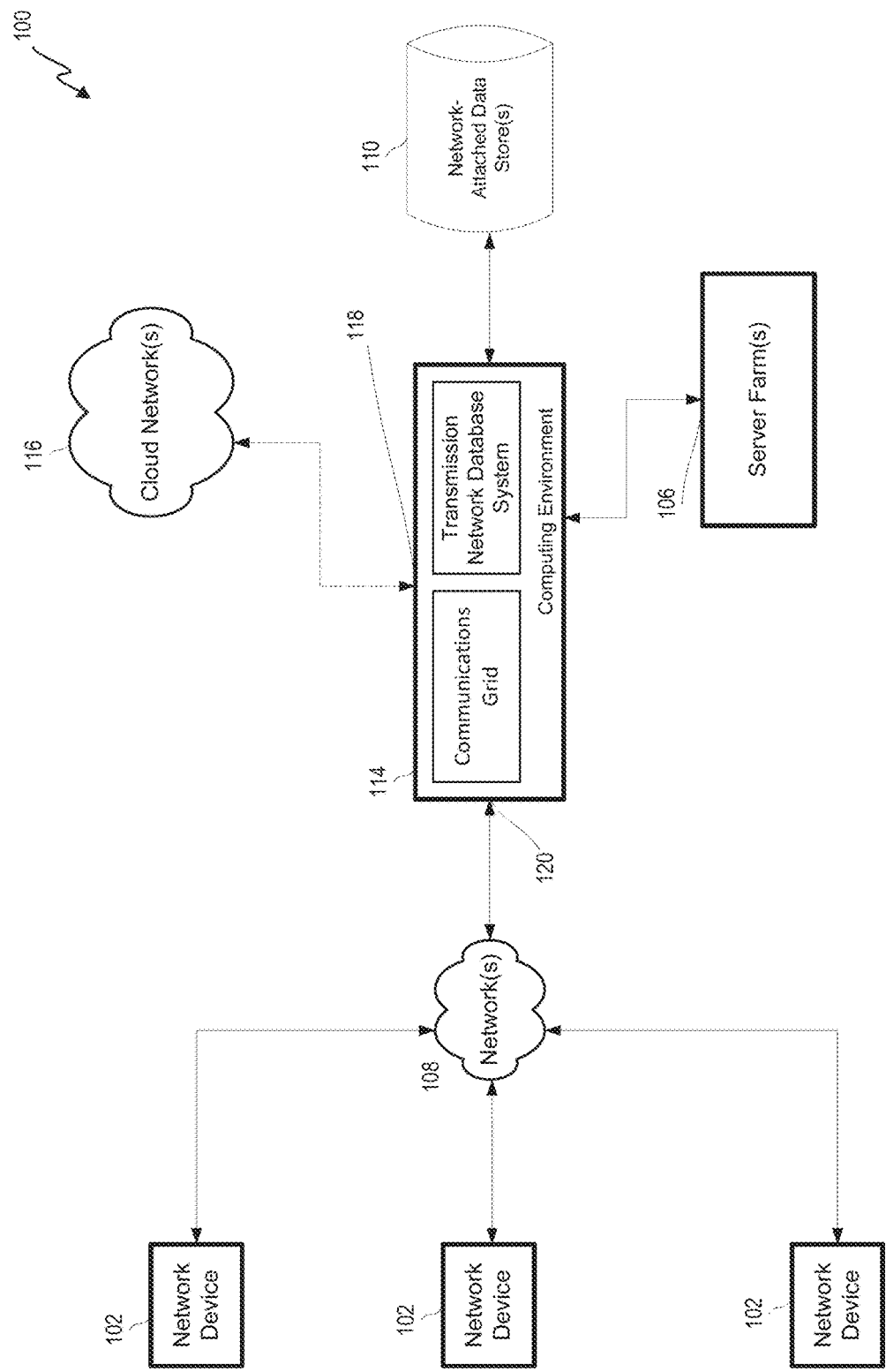
FIG. 1 illustrates a block diagram that provides an illustration of the hardware components of a computing system, according to some embodiments of the present technology.

Various embodiments described herein are generally directed to techniques for improving accountability, reproducibility and ease of access in the use of pooled data and pooled routines to perform analyses of pooled data. Network accessible gridded storage may be employed to maintain a federated area with controlled access for data objects and task routines where various rules are imposed to provide access security while improving ease of access, and to maintain interoperability while allowing updates to be made. One or more federated devices may provide a portal to control access to data objects and task routines within the federated area, including control over types of accesses made, to prevent unauthorized additions, changes and/or deletions. The one or more federated devices may maintain instance logs that document instances of activities performed with data objects and task routines to provide a reviewable audit trail of the steps in conducting analyses, as well as confirmation of the conditions under which analyses are performed. However, these features of the federated area may be provided by the one or more federated devices in a manner that improves ease of use in both the performance of and subsequent review of complex analyses with large quantities of data.

More specifically, the storage of objects (e.g., data objects, task routines and/or instance logs of performances of analyses) may be effected using a grid of storage devices that are coupled to and/or incorporated into one or more federated devices. The grid of storage devices may provide distributed storage for data objects that include large data sets, complex sets of task routines for the performance of various analyses, and/or instance logs that document an extensive history of performances of analyses. Such distributed storage may be used to provide one or both of fault tolerance and/or faster access through the use of parallelism. In various embodiments, the objects stored within the federated area may be organized in any of a variety of ways. By way of example, one or more databases may be defined by the one or more federated devices within the federated area to improve efficiency in accessing data objects, task routines and/or instance logs of performances of analyses.

The one or more federated devices may define at least some of the storage space provided by the storage device grid as providing a federated area to which access is controlled by the one or more federated devices (or one or more other devices separately providing access control) in accordance with various rules. By way of example, access to the federated area may be limited to one or more particular authorized persons and/or one or more particular authorized entities (e.g., scholastic entities, governmental entities, business entities, etc.). Alternatively or additionally, access to the federated area may be limited to one or more particular authorized devices that may be operated under the control of one or more particular persons and/or entities. Also by way of example, various aspects of the access provided to the federated area may be controlled, including and not limited to, the selection of objects within the federated area that may be accessed and/or types of activities that may be performed with one or more particular objects to which access may be granted. By way of example, a particular person, entity and/or device may be permitted to access a particular subset of the objects stored within the federated area, and/or may be permitted to employ one or more particular objects in the performance of an analysis, but may not be permitted to alter and/or delete those one or more particular objects.

In some embodiments, use of the federated area may be limited to the storage and retrieval of objects with controlled access. In such embodiments, the one or more federated devices may provide a portal accessible to other devices via a network for use in storing and retrieving objects associated with the performances of analyses by other devices. More specifically, one or more source devices may access the portal through the network to provide the one or more federated devices with the data objects, task routines, job flow definitions and/or instance logs associated with completed performances of analyses by the one or more source devices for storage within the federated area for the purpose of memorializing the details of those performances. Subsequently, one or more reviewing devices may access the portal through the network to retrieve such objects from the federated area through the one or more federated devices for the purpose of independently confirming aspects of such the performances.

In other embodiments, use of the federated area may include the performance of analyses by the one or more federated devices using the objects stored therein. In such other embodiments, the one or more federated devices may receive requests from other devices to perform analyses via the portal, and may provide indications of the results of such performances to those other devices via the portal. More specifically, in response to such a request, the one or more federated devices may execute a combination of task routines specified in a job flow definition within the federated area to perform an analysis with one or more data objects, all of which are stored in the federated area. In so doing, the one or more federated devices may generate an instance log for storage within the federated area that documents the performances of the analysis, including indications of data objects used and/or generated, indications of task routines executed, and an indication of the job flow definition that specifies the task routines to be executed to perform the analysis. In some of such other embodiments, the one or more federated devices may be nodes of a grid of federated devices across which tasks of a requested performance of an analysis may be distributed. The provision of a grid of the federated devices may make available considerable shared processing and/or storage resources to allow such a grid to itself perform complex analyses of large quantities of data, while still allowing a detailed review of aspects of the performance of that analysis in situations where questions may arise concerning data quality, correctness of assumptions made and/or coding errors.

Among the objects that may be stored in the federated area may be numerous data objects that may include data sets. Each data set may be made up of any of a variety of types of data concerning any of a wide variety of subjects. By way of example, a data set may include scientific observation data concerning geological and/or meteorological events, or from sensors in laboratory experiments in areas such as particle physics. By way of another example, a data set may include indications of activities performed by a random sample of individuals of a population of people in a selected country or municipality, or of a population of a threatened species under study in the wild.

Regardless of the types of data each such data set may contain, some data sets stored in the federated area may include data sets employed as inputs to the performance of one or more analyses, and may include data sets provided to the one or more federated devices for storage within the federated area as input data sets. Other data sets stored in the federated area may include data sets that are generated as outputs of the performance of one or more analyses. It should be noted that some data sets that serve as inputs to the performance of one analysis may be generated as an output of an earlier performance of another analysis. Still other data sets may be both generated and used as input during a single performance of an analysis, such as a data set generated by the performance of one task of an analysis for use by one or more other tasks of that same analysis. Such data sets that are both generated and used during a single performance of an analysis may exist only temporarily within the federated area in embodiments in which analyses are performed within the federated area by the one or more federated devices. In other embodiments in which analyses are performed by other devices outside of the federated area, such data sets may not be stored, even temporarily, within the federated area.

One of the rules imposed by the one or more federated devices may be that storage within the federated area of executable instructions for the performance of analysis requires that the analysis itself be defined as a set of tasks that are to be performed in an order defined as a job flow. More precisely, executable instructions for the performance of an analysis may be required to be stored as a set of task routines and a job flow definition that specifies aspects of how the set of task routines are executed together to perform the analysis. In some embodiments, the definition of each task routine may include definitions of the inputs and outputs thereof. In a job flow definition, each task to be performed may be assigned a flow task identifier, and each task routine that is to perform a particular task may be assigned the flow task identifier of that particular task to make each task routine retrievable by the flow task identifier of the task it performs. Thus, each performance of an analysis may entail a parsing of the job flow definition for that analysis to retrieve the flow task identifiers of the tasks to be performed, and may then entail the retrieval of a task routine required to perform each of those tasks.

As will also be explained in greater detail, such breaking up of an analysis into a job flow made up of tasks performed by task routines that are stored in the federated area may be relied upon to enable code reuse in which individual task routines may be shared among the job flows of multiple analyses. Such reuse of a task routine originally developed for one analysis by another analysis may be very simply effected by specifying the flow task identifier of the corresponding task in the job flow definition for the other analysis. Additionally, reuse may extend to the job flow definitions, themselves, as the availability of job flow definitions in the federated space may obviate the need for the develop of a new analysis routine where there is a job flow definition already available that defines the tasks to be performed in an analysis that may be deemed suitable. Thus, among the objects that may be stored in the federated area may be numerous selectable and reusable task routines and job flow definitions.

In some embodiments, job flow definitions may be stored within the federated area in as a file or other type of data structure in which a job flow definition is represented as a directed acyclic graph (DAG). Alternatively or additionally, a file or other type of data structure may be used that organizes aspects of a job flow definition in a manner that enables a DAG to be directly derived therefrom. In such a file or data structure may directly indicate an order of performance of tasks, or may specify dependencies between inputs and outputs of each task to enable an order of performance to be derived. By way of example, an array may be used in which there is an entry for each task routine that includes specifications of its inputs, its outputs and/or dependencies on data objects that may be provided as one or more outputs of one or more other task routines. Thus, a DAG may be usable to visually portray the relative order in which specified tasks are to be performed, while still being interpretable by a federated device and/or other devices that may be employed to perform the portrayed analysis. Such a form of a job flow definition may be deemed desirable to enable an efficient presentation of the job flow on a display of a reviewing device as a DAG. Thus, review of aspects of a performance of an analysis may be made easier by such a representation of a job flow.

The tasks that may be performed by any of the numerous tasks routines may include any of a variety of data analysis tasks, including and not limited to searches for one or more particular data items, and/or statistical analyses such as aggregation, identifying and quantifying trends, subsampling, calculating values that characterize at least a subset of the data items within a data object, deriving models, testing hypothesis with such derived models, making predictions, generating simulated samples, etc. The tasks that may be performed may also include any of a variety of data transformation tasks, including and not limited to, sorting operations, row and/or column-based mathematical operations, filtering of rows and/or columns based on the values of data items within a specified row or column, and/or reordering at least a specified subset of data items within a data object into a specified ascending, descending or other order. Alternatively or additionally, the tasks that may be performed by any of the numerous task routines may include any of a variety of data normalization tasks, including and not limited to, normalizing time values, date values, monetary values, character spacing, use of delimiter characters and/or codes, and/or other aspects of formatting employed in representing data items within one or more data objects. The tasks performed may also include, and are not limited to, normalizing use of big or little Endian encoding of binary values, use or lack of use of sign bits, the quantity of bits to be employed in representations of integers and/or floating point values (e.g., bytes, words, doublewords or quadwords), etc.

The analyses that may be defined by the job flow definitions may be any of a wide variety of types of analyses that may include any of a wide variety of combinations of analysis, normalization and/or transformation tasks. The result reports generated through performances of the tasks as directed by each of the job flow definitions may include any of a wide variety of quantities and/or sizes of data. In some embodiments, one or more of the result reports generated may contain one or more data sets that may be provided as inputs to the performances of still other analyses, and/or may be provided to a reviewing device to be presented on a display thereof in any of a wide variety of types of visualization. In other embodiments, each of one or more of the result reports generated may primarily include an indication of a prediction and/or conclusion reached through the performance of an analysis that generated the result report as an output.

Also among the objects that may be stored in the federated area may be numerous instance logs that may each provide a record of various details of a single performance of a job flow that defines an analysis. More specifically, each instance log may provide indications of when a performance of a job flow occurred, along with identifiers of various objects stored within the federated area that were used and/or generated in that performance. Among those identifiers may be an identifier of the job flow definition that defines the job flow of the analysis performed, identifiers for all of the task routines executed in that performance, identifiers for any data objects employed as an input (e.g., input data sets), and identifiers for any data objects generated as an output (e.g., a result report that may include one or more output data sets). The one or more federated devices may assign such identifiers to data objects, task routines and/or job flow definitions as each is stored and/or generated within the federated area to enable such use of identifiers in the instance logs. In some embodiments, the identifier for each such object may be generated by taking a hash of at least a portion of that object to generate a hash value to be used as the identifier with at least a very high likelihood that the identifier generated for each such object is unique. Such use of a hash algorithm may have the advantage of enabling the generation of identifiers for objects that are highly likely to be unique with no other input than the objects, themselves, and this may aid in ensuring that such an identifier generated for an object by a federated device will be identical to the identifier that would be generated for the same object by another device.

It should be noted, however, that in the case of task routines, the identifiers assigned by the one or more federated devices to each of the task routines are not the same identifiers as the flow task identifiers that are employed by the job flow definitions to specify the tasks to be performed in a job flow. As will be explained in greater detail, for each task identified in a job flow definition by a flow task identifier, there may be multiple task routines to choose from to perform that task, and each of those task routines may be assigned a different identifier by the one or more federated devices to enable each of those task routines to be uniquely identified in an instance log.

Another of the rules imposed by the one or more federated devices may be that objects referred to within job flow definitions and/or instance logs that are stored within the federated area may not be permitted to be deleted from within the federated area. More precisely, to ensure that it remains possible to perform each of the job flows defined by a job flow definition stored in the federated area, the one or more federated devices may impose a restriction against the deletion of the task routines that have flow task identifiers that are referred to by any job flow definition stored within the federated area. Correspondingly, to ensure that previous performance of job flows continue to be repeatable for purposes of review, the one or more federated devices may impose a restriction against the deletion of task routines, job flow definitions and data objects identified by their uniquely assigned identifiers within any instance log stored within the federated area.

As a result of the imposition of such restrictions on the deletion of objects, the replacement of an already stored task routine with a new version of the task routine in a manner that entails the deletion of the already stored task routine may not be permitted. However, in some embodiments, the addition of updated versions of task routines to the federated area to coexist with older versions may be permitted to allow improvements to be made. By way of example, it may be deemed desirable to make improvements to a task routine to correct an error, to add an additional feature and/or to improve its efficiency. Doing so may entail the creation of a new version of the task routine that is given the same flow task identifier as an earlier version thereof to indicate that it performs the same task as the earlier version of the task routine. When provided to the one or more federated devices for storage, the flow task identifier given to the new version will provide an indication to the one or more federated devices that the newly created task routine is a new version of the earlier task routine already stored within the federated area. However, the one or more federated devices may still generate a unique identifier for the new version of the task routine to enable the new version to be uniquely identified in an instance log so as to make clear in an instance log which version of the task routine was used in particular the performance of a job flow.

In various embodiments, with job flow definitions, task routines, data objects and/or instance logs stored within the federated area, the one or more federated devices may receive requests to employ such objects to perform analyses within the federated area and/or to provide such objects from the federated area to other devices to enable those other devices to perform analyses. Some requests may be to perform a specified job flow of an analysis with one or more specified data objects, or to provide another device with the objects needed to enable the performance by the other device of the specified job flow with the one or more specified data objects. Other requests may be to repeat an earlier performance of a job flow that begat a specified result report, or that entailed the use of a specific combination of a job flow and one or more data sets. Alternatively, other requests may be to provide another device with the objects needed to enable the other device to repeat an earlier performance of a job flow that begat a specified result report, or that entailed the use of a specific combination of a job flow and one or more data sets. Through the generation of identifiers for each of the various objects associated with each performance of a job flow, through the use of those identifiers to refer to such objects in instance logs, and through the use of those identifiers by the one or more federated devices in accessing such objects, requests for performances of analyses and/or for access to their associated objects are able to more efficiently identify particular performances, their associated objects and/or related objects.

In embodiments in which a request is received to perform a job flow of an analysis with one or more data objects (the corresponding job flow definition and the one or more data objects all identified in the request by their uniquely assigned identifiers), the one or more federated devices may analyze the instance logs stored in the federated area to determine whether there was an earlier performance of the same job flow with the same one or more data objects. If there was such an earlier performance, then the result report generated as the output of that earlier performance may already be stored in the federated area. As long as none of the task routines executed in the earlier performance have been updated since the earlier performance, then a repeat performance of the same job flow with the same one or more data objects may not be necessary. Thus, if any instance logs are found for such an earlier performance, the one or more federated devices may analyze the instance log associated with the most recent earlier performance (if there has been more than one) to obtain the identifiers uniquely assigned to each of the task routines that were executed in that earlier performance. The one or more federated devices may then analyze each of the uniquely identified task routines to determine whether each of them continues to be the most current version stored in the federated area for use in performing its corresponding task. If so, then a repeated performance of the requested job flow with the one or more data objects identified in the request is not necessary, and the one or more federated devices may retrieve the result report generated in the earlier performance from the federated area and transmit that result report to the device from which the request was received.

However, if no instance logs are found for any earlier performance of the specified job flow with the specified one or more data objects where the earlier performance entailed the execution of the most current version of each of the task routines, then the one or more federated devices may perform the specified job flow with the specified data objects using the most current version of task routine for each task of the specified in the job flow definition. The one or more federated devices may then assign a unique identifier to and store the new result report generated during such a performance in the federated area, as well as transmit the new result report to the device from which the request was received. The one or more federated devices may also generate and store in the federated area a corresponding new instance log that specifies details of the performance, including the identifier of the job flow definition, the identifiers of all of the most current versions of task routines that were executed, the identifiers of the one or more data objects used as inputs and/or generated as outputs, and the identifier of the new result report that was generated.

In embodiments in which a request is received to provide objects to a requesting device to enable the requesting device (or still another device) to perform a job flow identified in the request by the identifier of the corresponding job flow definition with one or more data objects identified by their identifiers, the one or more federated devices may retrieve the requested objects from the federated area and transmit to the requested objects to the requesting device. Those objects may include the identified job flow definition and the identified one or more data objects, along with the most current versions of the task routines required to perform each of the tasks specified in the job flow definition.

In embodiments in which a request is received to repeat a performance of a job flow of an analysis that begat a result report identified in the request by its uniquely assigned identifier, the one or more federated devices may analyze the instance logs stored in the federated area to retrieve the instance log associated with the performance that resulted in the generation of the identified result report. The one or more federated devices may then analyze the retrieved instance log to obtain the identifiers for the job flow definition that defines the job flow, the identifiers for each of the task routines executed in the performance, and the identifiers of any data objects used as inputs in the performance. Upon retrieving the identified job flow definition, each of the identified task routines, and any identified data objects, the one or more federated devices may then execute the retrieved task routines, using the retrieved data objects, and in the manner defined by the retrieved job flow definition to repeat the performance of the job flow with those objects to generate a new result report. However, since the request was to repeat an earlier performance of the job flow with the very same objects, the new result report should be identical to the earlier result report generated in the original performance such that the new result report should be a regeneration of the earlier result report. The one or more federated devices may then assign an identifier to and store the new result report in the federated area, as well as transmit the new result report to the device from which the request was received. The one or more federated devices may also generate and store in the federated area a corresponding new instance log that specifies details of the new performance of the job flow, including the identifier of the job flow definition, the identifiers of all of the task routines that were executed, the identifiers of the one or more data objects used as inputs and/or generated as outputs, and the identifier of the new result report.

In embodiments in which a request is received to provide objects to a requesting device to enable the requesting device (or still another device) to repeat a performance of a job flow that begat a result report identified in the request by the identifier of the result report, the one or more federated devices may analyze the instance logs stored in the federated area to retrieve the instance log associated with the performance that resulted in the generation of the identified result report. The one or more federated devices may then analyze the retrieved instance log to obtain the identifiers for the job flow definition that defines the job flow, the identifiers for each of the task routines executed in the performance, and the identifiers of any data objects used as inputs in the performance. Upon retrieving the identified job flow definition, each of the identified task routines, and any identified data objects, the one or more federated devices may then transmit those objects to the requesting device.

Through such a regime of rules restricting accesses that may be made to the federated area, and through use of unique identifiers for each object stored within the federated area, objects such as data sets, task routines and job flow definitions are made readily available for reuse under conditions in which their ongoing integrity against inadvertent and/or deliberate alteration is assured. Updated versions of task routines may be independently created and stored within the federated area in a manner that associates those updated versions with earlier versions without concern of accidental overwriting of earlier versions. The use of unique identifiers for every object that are able to be easily and consistently generated from the objects, themselves, serves to ensure consistency in the association of identifiers with the objects and prevent instances of accidental transposing of identifiers that may result in objects becoming irretrievable from within the federated area.

As a result of such pooling of data sets and task routines, new analyses may be more speedily created through reuse thereof by generating new job flows that identify already stored data sets and/or task routines. Additionally, where a task routine is subsequently updated, advantage may be automatically taken of that updated version in subsequent performances of each job flow that previously used the earlier version of that task routine. And yet, the earlier version of that task routine remains available to enable a comparative analysis of the results generated by the different versions if discrepancies therebetween are subsequently discovered.

As a result of such pooling of data sets, task routines and job flows, along with instance logs and result reports, repeated performances of a particular job flow with particular a data set can be avoided. Through use of identifiers uniquely associated with each object and recorded within each instance log, situations in which a requested performance of a particular job flow with a particular data set that has been previously performed can be more efficiently identified, and the result report generated by that previous performance can be more efficiently retrieved and made available in lieu of consuming time and processing resources to repeat that previous performance. And yet, if a question should arise as to the validity of the results of that previous performance, the data set(s), task routines and job flow definition on which that previous performance was based remain readily accessible for additional analysis to resolve that question.

Also, where there is no previous performance of a particular job flow with a particular data set such that there is no previously generated result report, the processing resources of the grid of federated devices may be utilized to perform the particular job flow with the particular data set. The ready availability of the particular data set to the grid of federated devices enables such a performance without the consumption of time and network bandwidth resources that would be required to transmit the particular data set and other objects to the requesting device to enable a performance by the requesting device. Instead, the transmissions to the requesting device may be limited to the result report generated by the performance. Also, advantage may be taken of the grid of federated devices to cause the performance of one or more of the tasks of the job flow as multiple instances thereof in a distributed manner (e.g., at least partially in parallel).

As a result of the requirement that the data set(s), task routines and the job flow associated with each instance log be preserved, accountability for the validity of results of past performances of job flows with particular data sets is maintained. The sources of incorrect results, whether from invalid data, or from errors made in the creation of a task routine or a job flow, may be traced and identified. By way of example, an earlier performance of a particular job flow with a particular data set using earlier versions of task routines can be compared to a later performance of the same job flow with the same data set, but using newer versions of the same task routines, as part of an analysis to identify a possible error in a task routine. As a result, mistakes can be corrected and/or instances of malfeasance can be addressed.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
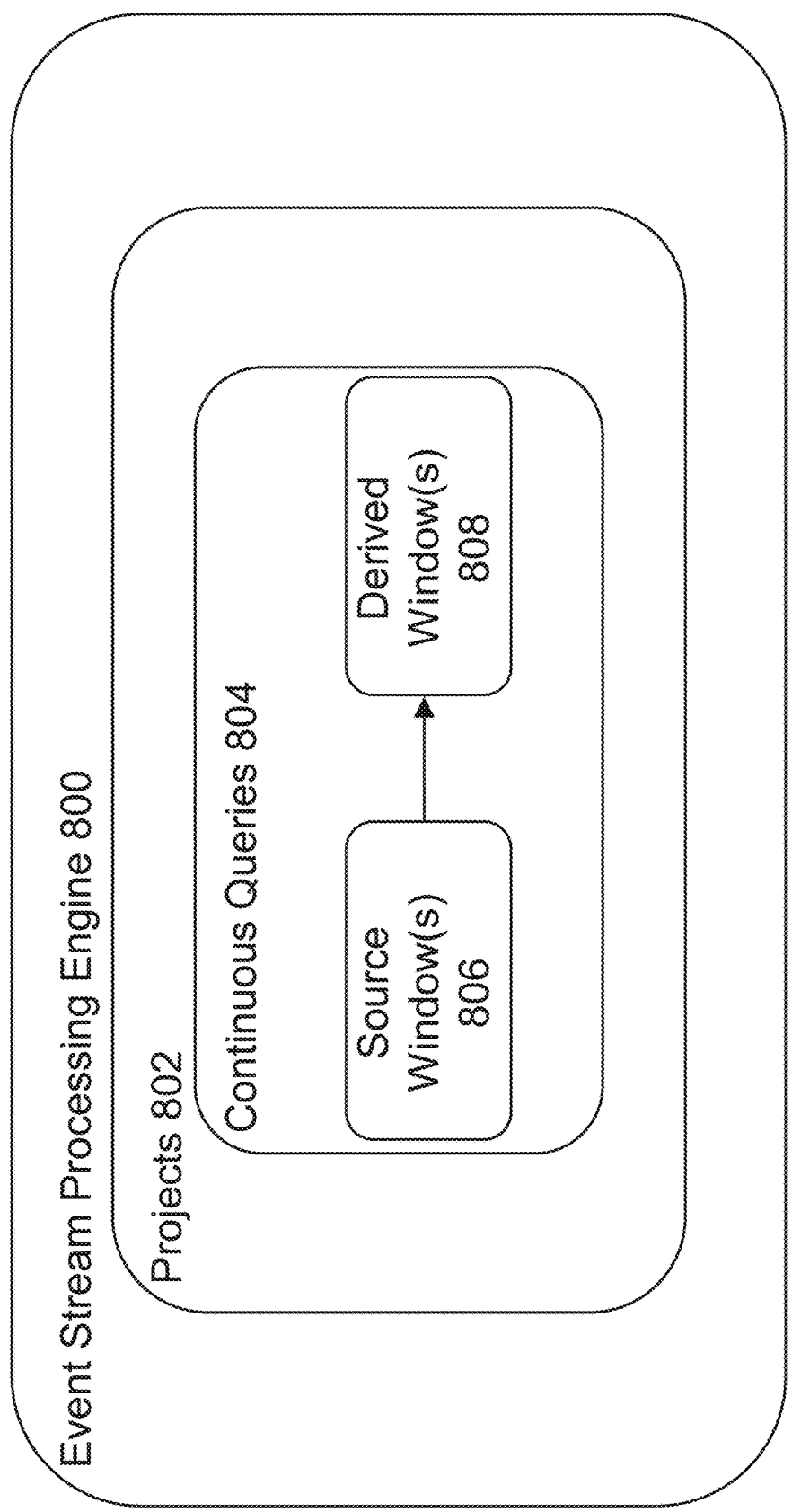
FIG. 8 illustrates a block diagram including components of an Event Stream Processing Engine (ESPE), according to embodiments of the present technology.
Figure 9:
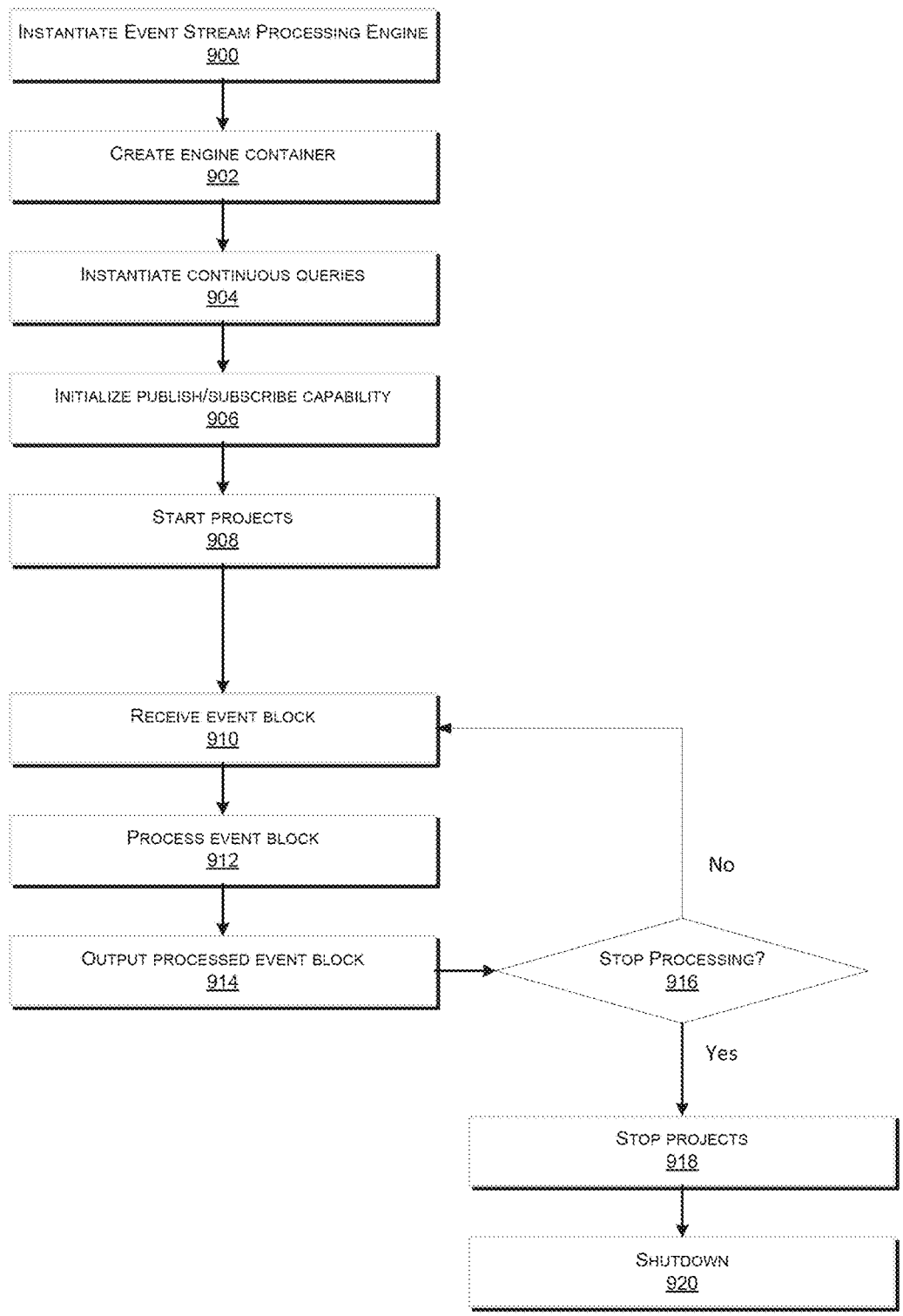
FIG. 9 illustrates a flow chart showing an example process including operations performed by an event stream processing engine, according to some embodiments of the present technology.
Figure 10:
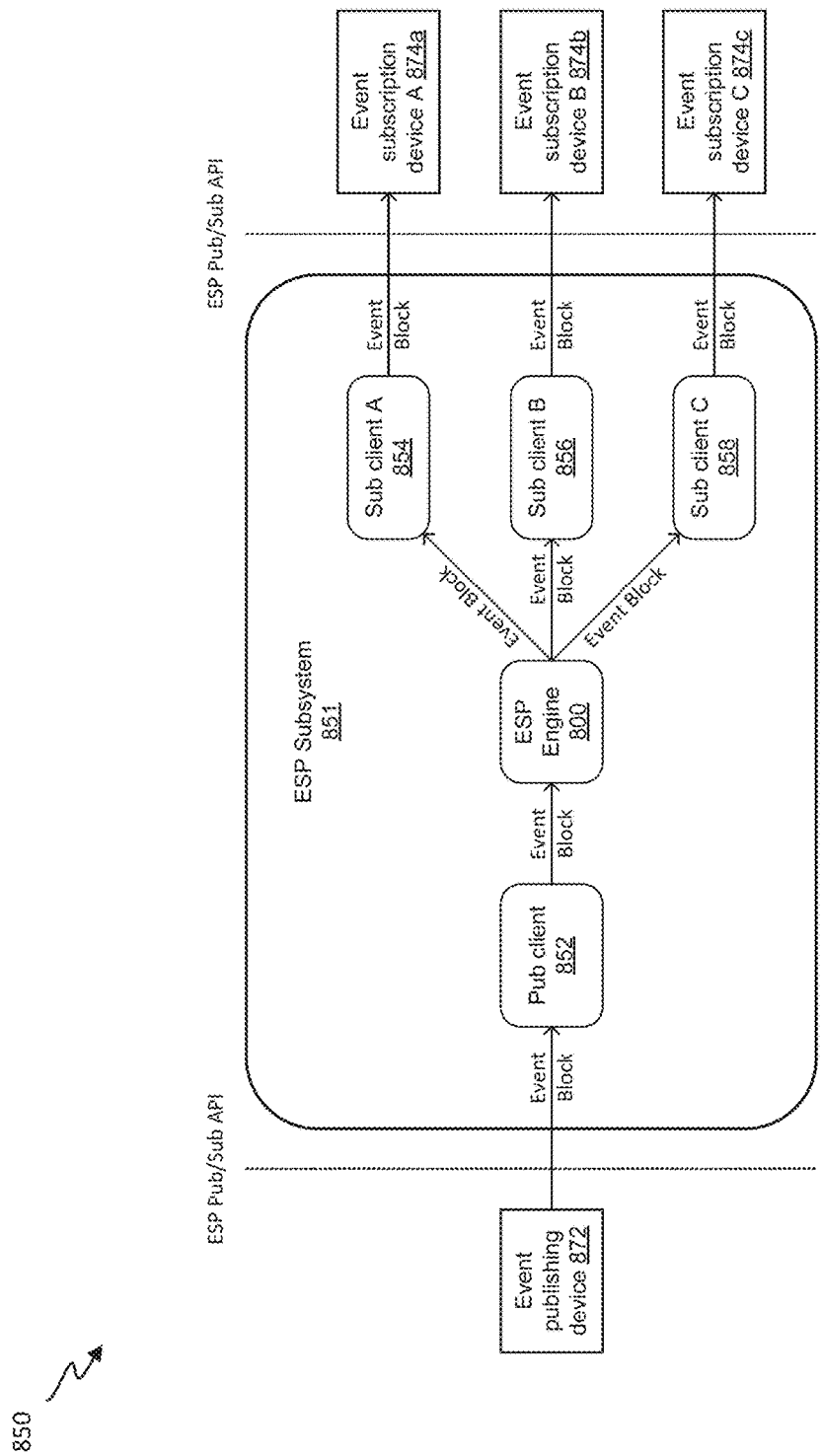
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
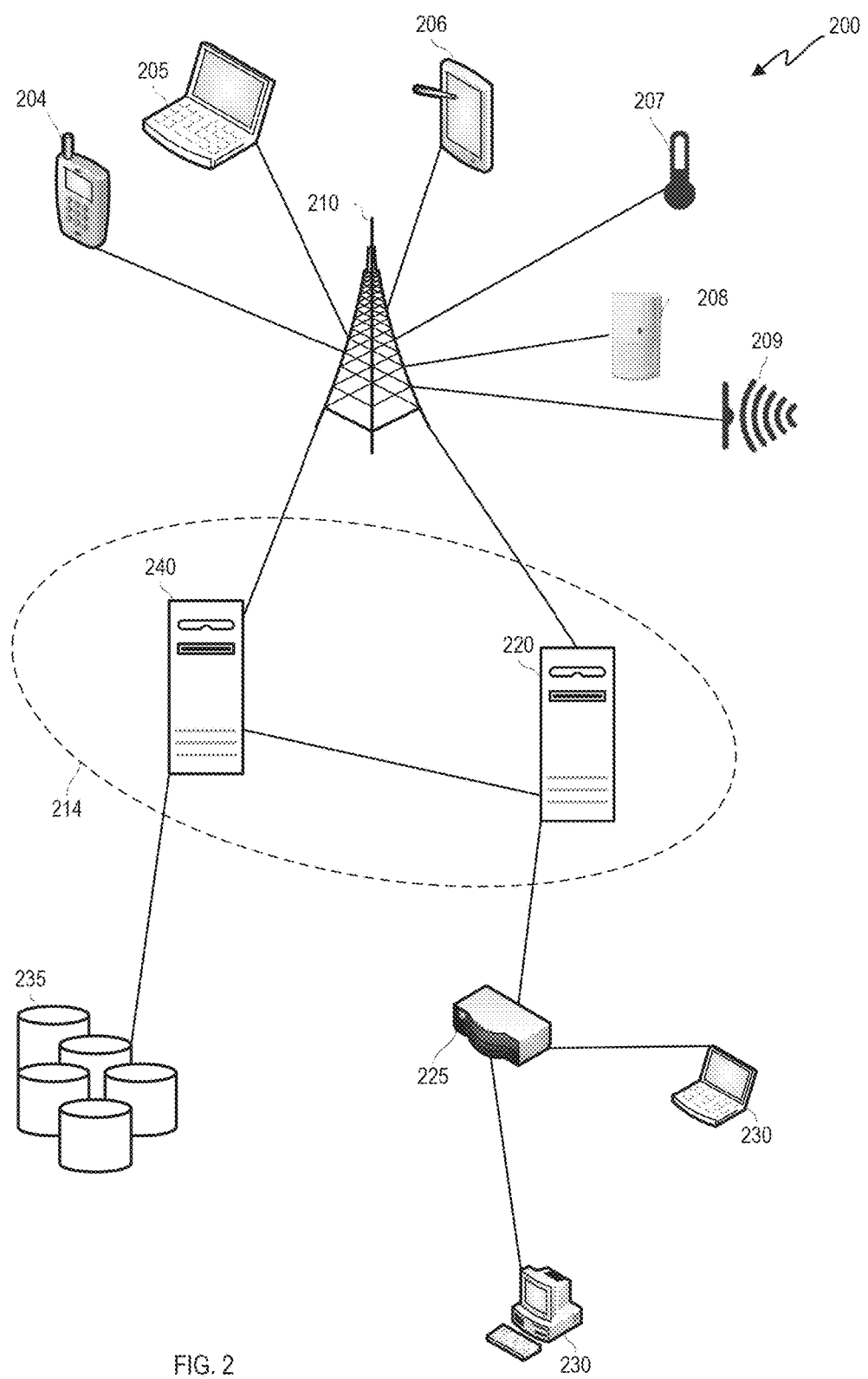
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
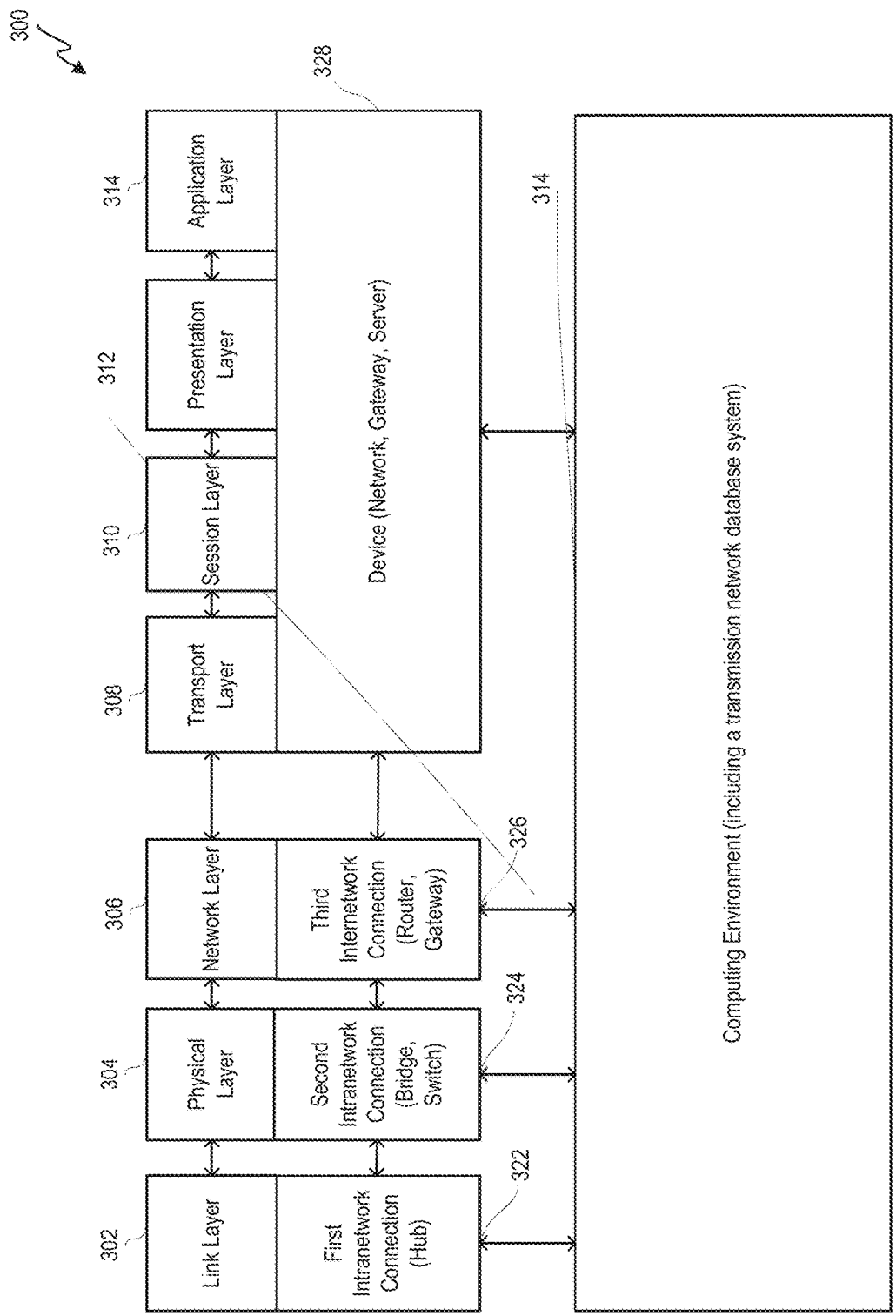
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
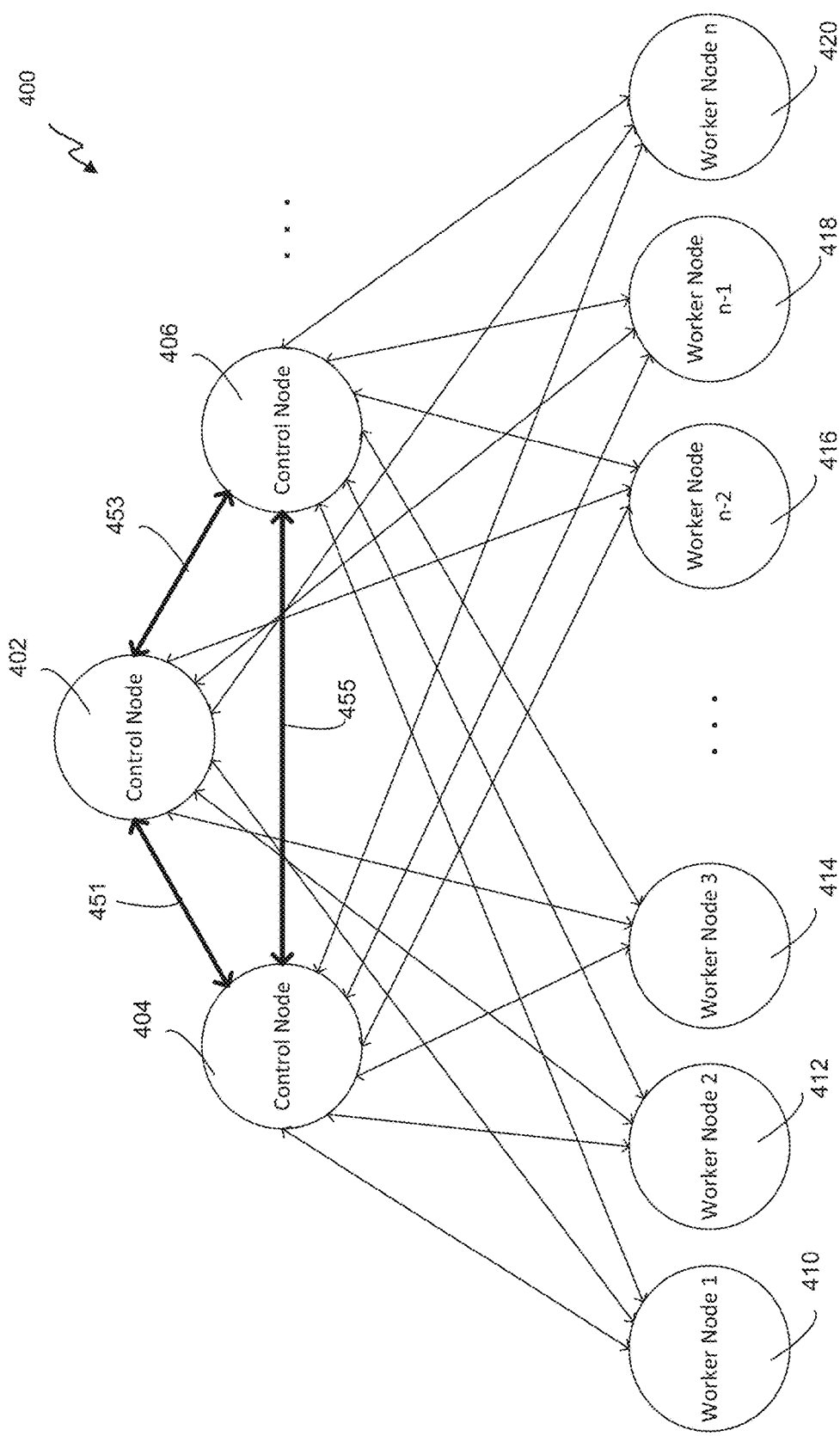
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node device may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node device on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
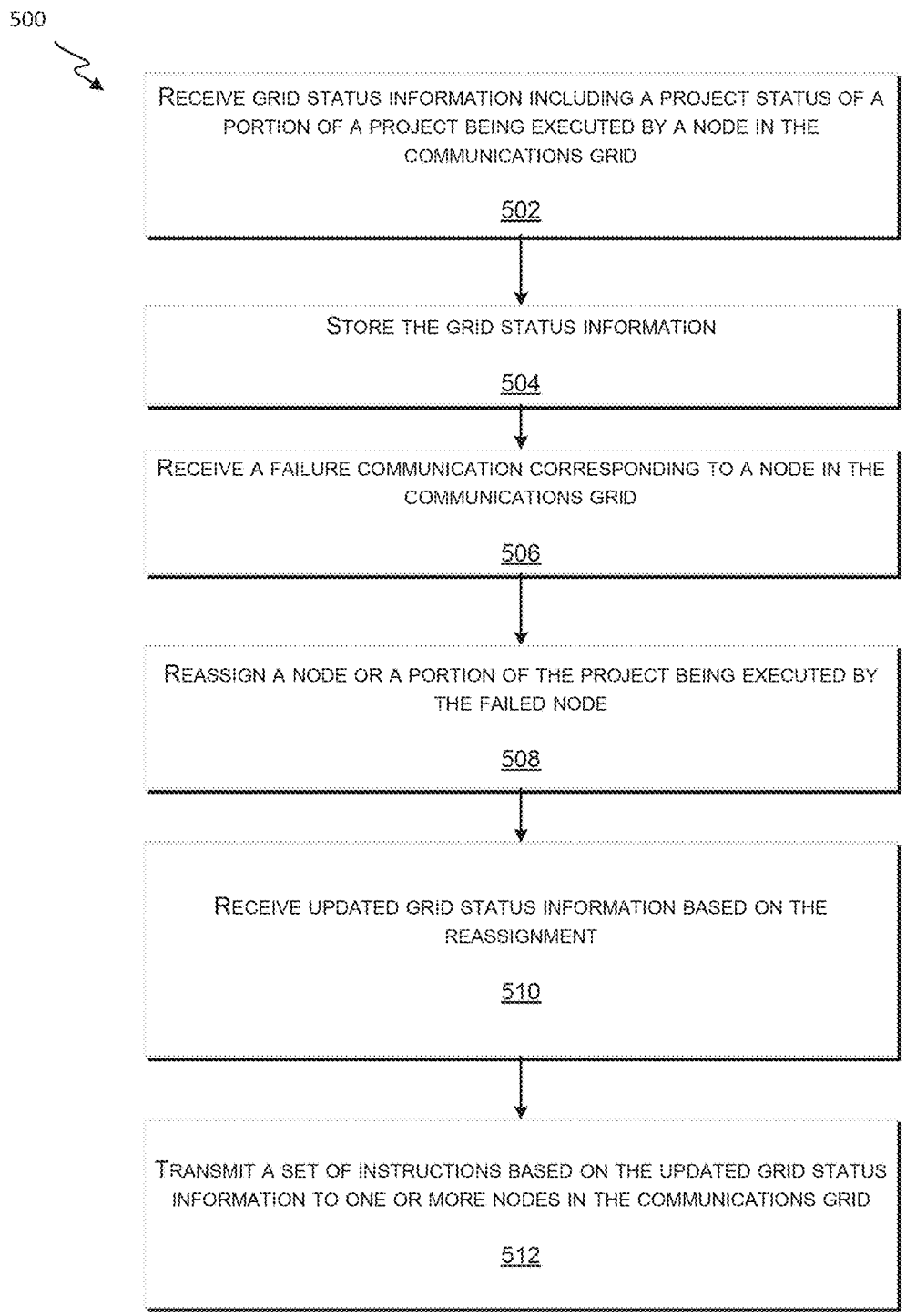
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
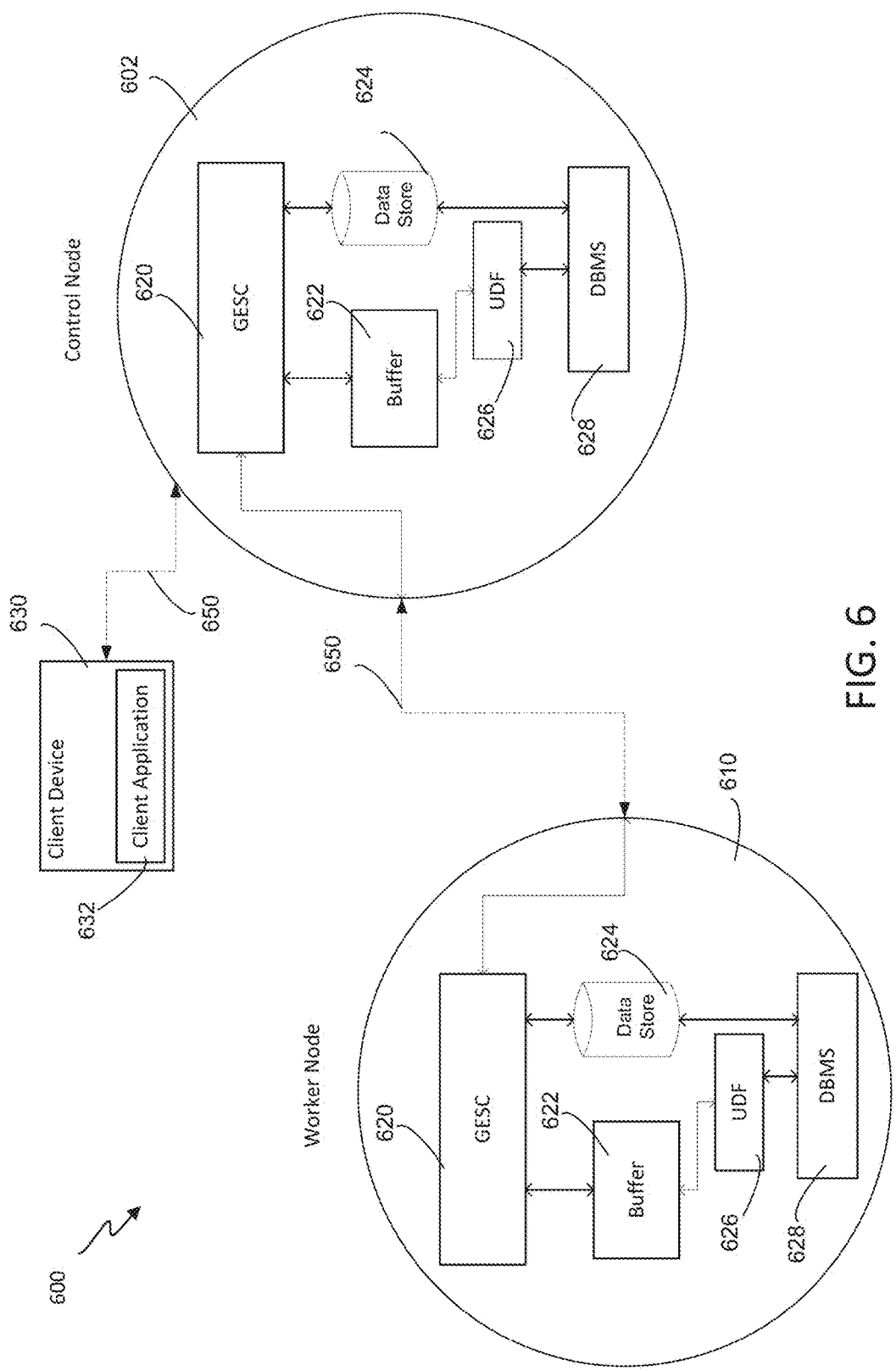
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
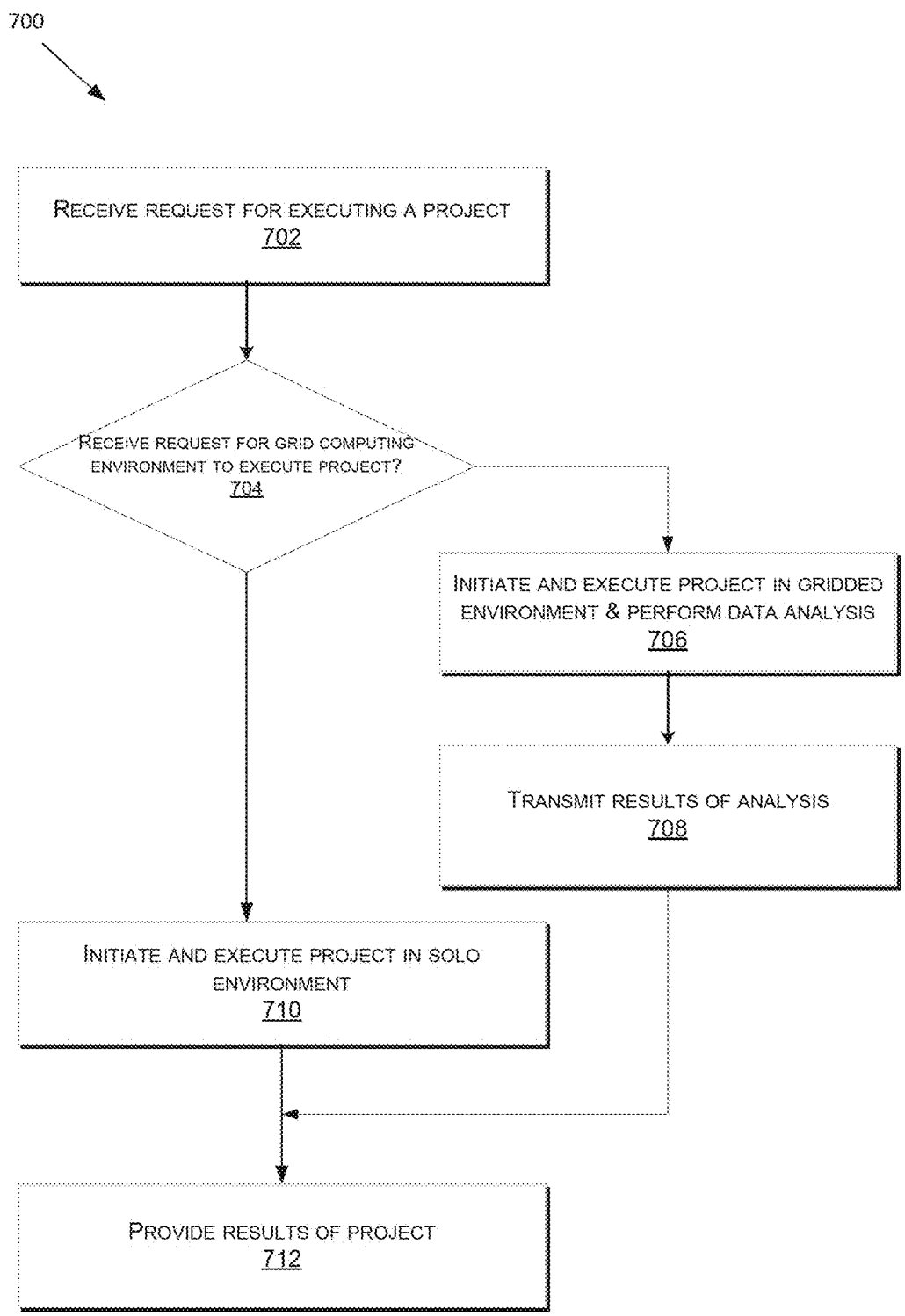
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
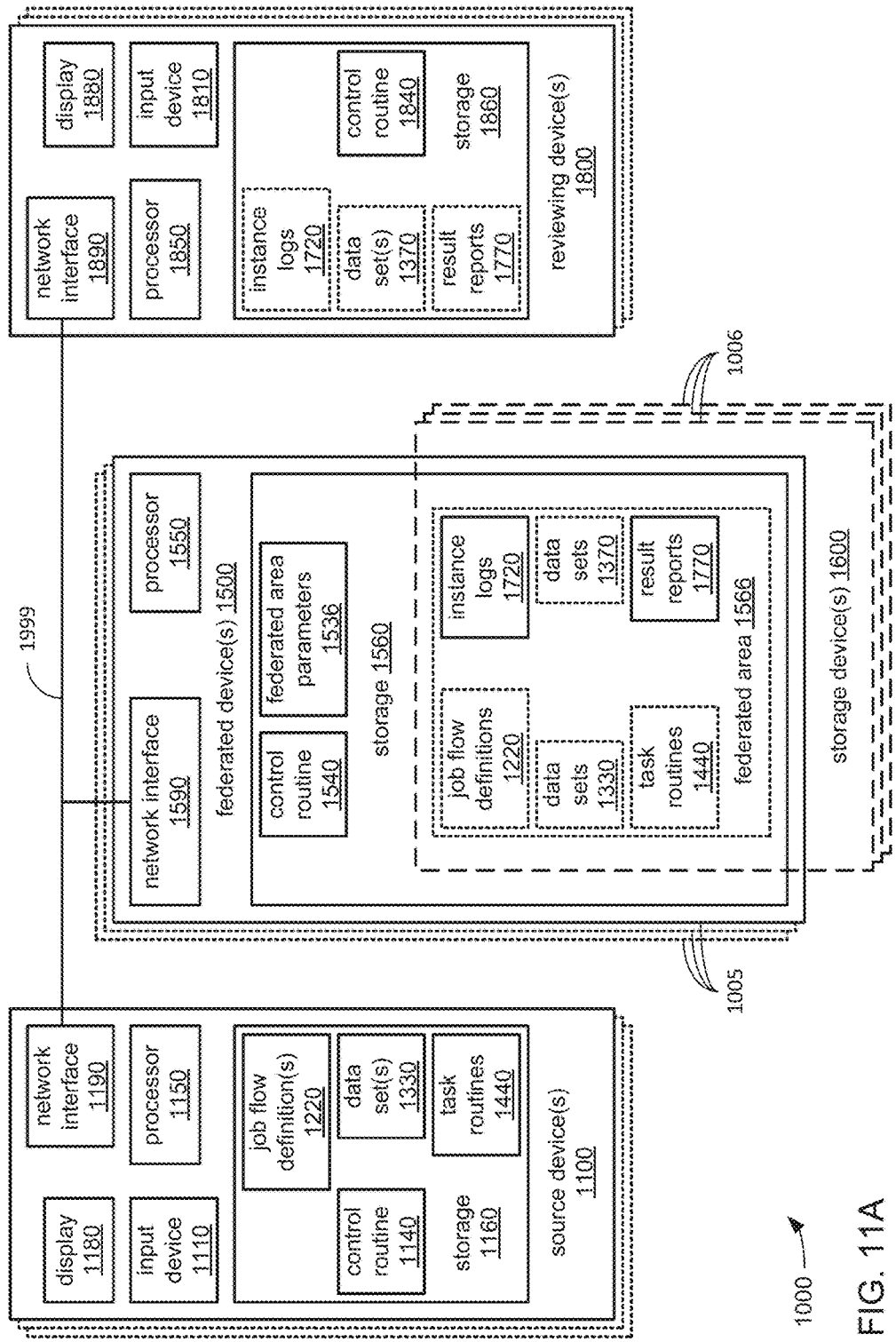
FIGS. 11A and 11B, together, illustrate an example embodiment of a distributed processing system.
Figure 11B:
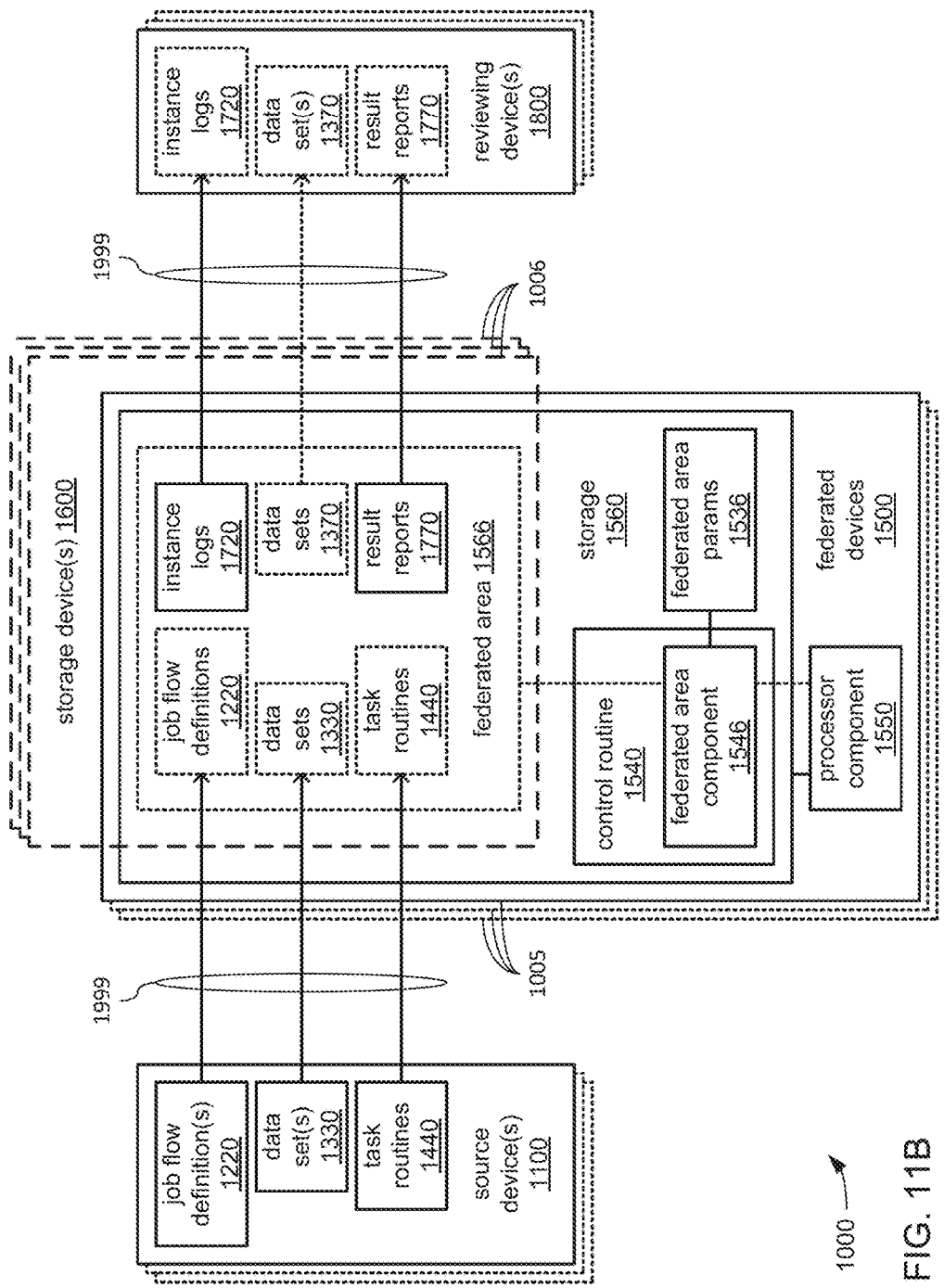

FIG. 11A illustrates a block diagram of an example embodiment of a distributed processing system 1000 incorporating one or more source devices 1100, one or more reviewing devices 1800, one or more federated devices 1500 that may form a federated device grid 1005, and/or one or more storage devices 1600 that may form a storage device grid 1006. FIG. 11B illustrates exchanges, through a network 1999, of communications among the devices 1100, 1500, 1600 and 1800 associated with the controlled storage of, access to and/or performance of job flows of analyses associated with various objects within a federated area 1566. Referring to both FIGS. 11A and 11B, such communications may include the exchange of job flow definitions 1220, data sets 1330 and/or task routines 1440. However, one or more of the devices 1100, 1500, 1600 and/or 1800 may also exchange, via the network 1999, other data entirely unrelated to any object stored within the federated area 1566. In various embodiments, the network 1999 may be a single network that may extend within a single building or other relatively limited area, a combination of connected networks that may extend a considerable distance, and/or may include the Internet. Thus, the network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the one or more source devices 1100 may incorporate one or more of an input device 1110, a display 1180, a processor 1150, a storage 1160 and a network interface 1190 to couple each of the one or more source devices 1100 to the network 1999. The storage 1160 may store a control routine 1140, one or more job flow definitions 1220, one or more data sets 1330, and/or one or more task routines 1440. The control routine 1140 may incorporate a sequence of instructions operative on the processor 1150 of each of the one or more source devices 1100 to implement logic to perform various functions. In embodiments in which multiple ones of the source devices 1100 are operated together as a grid of the source devices 1100, the sequence of instructions of the control routine 1140 may be operative on the processor 1150 of each of those source devices 1100 to perform various functions at least partially in parallel with the processors 1150 of others of the source devices 1100.

In some embodiments, one or more of the source devices 1100 may be operated by persons and/or entities (e.g., scholastic entities, governmental entities, business entities, etc.) to generate and/or maintain analysis routines, that when executed by one or more processors, causes an analysis of data to be performed. In such embodiments, execution of the control routine 1140 may cause the processor 1150 to operate the input device 1110 and/or the display 1180 to provide a user interface by which an operator of the source device 1100 may use the source device 1100 to develop such routines and/or to test their functionality by causing the processor 1150 to execute such routines. Among such routines may be routines intended for storage and/or execution within the federated area 1566. As will be explained in greater detail, a rule imposed in connection with such use of the federated area 1566 may be that routines are required to be stored therein as a combination of a set of task routines and a job flow definition that specifies aspects of how the set of task routines are executed together. In other words, a requirement for the storage and/or execution of analysis routines within the federated area 1566 may be that the analysis itself be defined as a job flow in which a set of tasks that are performed in a defined order. Thus, an analysis routine generated through operation of one or more of the source devices 1100 may be required to take the form of multiple task routines 1440 and a job flow definition 1220 that specifies the manner in which the multiple task routines 1440 are executed by a processor as a combination to cause the performance of the analysis as a job flow.

In such embodiments, further execution of the control routine 1140 may cause the processor 1150 to operate the input device 1110 and/or the display 1180 to provide a user interface by which an operator of the source device 1100 may enter commands Among those commands may be a command to the processor 1150 to operate the network interface 1190 to transmit such a combination of multiple task routines 1440 and accompanying job flow definition 1220 via the network 1999 to the one or more federated devices 1500 for storage within the federated area 1566. The processor 1150 may be further caused to operate the display 1180 to present a request received via the network 1999 from the one or more federated devices 1500 (or from one or more other devices that provide access control to the federated area 1566) on the display 1180 to the operator of the source device 1100 for the provision of a password and/or other security credential. The processor 1150 may then be caused to transmit the password and/or other security credential provided by the operator (e.g., via the input device 1110) to the one or more federated devices 1500 (or the one or more access control devices) to gain authorization to store the multiple task routines 1440 and accompanying job flow definition 1220 within the federated area 1566. Further, in some of such embodiments, the operator of the source device 1100 may additionally operate the source device 1100 to similarly provide the one or more federated devices 1500 with one or more of the data sets 1330 to also store within the federated area 1566.

The tasks that each of the task routines 1440 may cause a processor to perform may include any of a variety of data analysis tasks, data transformation tasks and/or data normalization tasks. The data analysis tasks may include, and are not limited to, searches and/or statistical analyses that entail derivation of approximations, numerical characterizations, models, evaluations of hypotheses, and/or predictions (e.g., a prediction by Bayesian analysis of actions of a crowd trying to escape a burning building, or of the behavior of bridge components in response to a wind forces). The data transformation tasks may include, and are not limited to, sorting, row and/or column-based mathematical operations, row and/or column-based filtering using one or more data items of a row or column, and/or reordering data items within a data object. The data normalization tasks may include, and are not limited to, normalizing times of day, dates, monetary values (e.g., normalizing to a single unit of currency), character spacing, use of delimiter characters (e.g., normalizing use of periods and commas in numeric values), use of formatting codes, use of big or little Endian encoding, use or lack of use of sign bits, quantities of bits used to represent integers and/or floating point values (e.g., bytes, words, doublewords or quadwords), etc.

In other embodiments, one or more of the source devices 1100 may be operated by persons and/or entities to assemble one or more data sets 1330. In such embodiments, execution of the control routine 1140 by the processor 1150 may cause the processor 1150 to operate the network interface 1190, the input device 1110 and/or one or more other components (not shown) to receive data items and to assemble those received data items into one or more of the data sets 1330. By way of example, one or more of the source devices 1100 may incorporate and/or be in communication with one or more sensors to receive data items associated with the monitoring of natural phenomena (e.g., geological or meteorological events) and/or with the performance of a scientific or other variety of experiment (e.g., a thermal camera or sensors disposed about a particle accelerator). By way of another example, the processor 1150 of one or more of the source devices 1100 may be caused by its execution of the control routine 1140 to operate the network interface 1190 to await transmissions via the network 1999 from one or more other devices providing at least at portion of at least one data set 1330. Upon assembly of one or more data sets 1330, the processor 1150 may be caused by further execution of the control routine 1140 to operate the network interface 1190 to transmit one or more completed data sets 1330 to the one or more federated devices 1500 via the network 1999 for storage within the federated area 1566. The processor 1150 may be further caused by execution of the control routine 1140 to automatically provide one or more security credentials to the one or more federated devices 1500 (or the one or more access control devices) in response to a request received therefrom for security credentials as a prerequisite to granting authorization to store one or more completed data sets 1330 within the federated area 1566.

Each of the one or more data sets 1330 may include any of a wide variety of types of data associated with any of a wide variety of subjects. By way of example, each of the data sets 1330 may include scientific observation data concerning geological and/or meteorological events, or from sensors employed in laboratory experiments in areas such as particle physics. By way of another example, the data set may include indications of activities performed by a random sample of individuals of a population of people in a selected country or municipality, or of a population of a threatened species under study in the wild.

In various embodiments, each of the one or more reviewing devices 1800 may incorporate one or more of an input device 1810, a display 1880, a processor 1850, a storage 1860 and a network interface 1890 to couple each of the one or more reviewing devices 1800 to the network 1999. The storage 1860 may store a control routine 1840, one or more data sets 1370, one or more instance logs 1720, and/or one or more result reports 1770. The control routine 1840 may incorporate a sequence of instructions operative on the processor 1850 of each of the one or more reviewing devices 1800 to implement logic to perform various functions. In embodiments in which multiple ones of the reviewing devices 1800 are operated together as a grid of the reviewing devices 1800, the sequence of instructions of the control routine 1840 may be operative on the processor 1850 of each of those reviewing devices 1800 to perform various functions at least partially in parallel with the processors 1850 of others of the reviewing devices 1800.

In some embodiments, one or more of the reviewing devices 1800 may be operated by persons and/or entities (e.g., scholastic entities, governmental entities, business entities, etc.) to request performances of job flows within the federated area 1566 by the one or more federated devices 1500, and to provide the one or more reviewing devices 1800 with result reports 1770 generated by those performances. In such embodiments, execution of the control routine 1840 may cause the processor 1850 to operate the input device 1810 and/or the display 1880 to provide a user interface by which an operator of the reviewing device 1800 may initiate such requests, and/or to use the display 1880 to view one or more of such result reports 1770. Stated differently, one of the reviewing devices 1800 may be operated by a person acting in the role of a consumer of the results of an analysis to request the one or more federated devices 1500 to make use of the objects stored within the federated area to perform an analysis and provide the results report 1770 generated as a result of that performance.

In other embodiments, one or more of the reviewing devices 1800 may be operated by persons and/or entities to request repeat performances of previously performed job flows within the federated area 1566, and/or to provide the one or more reviewing devices 1800 with instance logs 1720, data sets 1370 that may be exchanged between task routines during the performance of a job flow, and/or the result reports 1770 generated by past performances of job flows within the federated area. In such embodiments, execution of the control routine 1840 may cause the processor 1850 to operate the input device 1810 and/or the display 1880 to provide a user interface by which an operator of the reviewing device 1800 may initiate such requests. The processor 1850 may also be caused to operate the display 1880 to enable the operator to view one or more of such instance logs 1720, data sets 1370 (if there are any) and/or result reports 1770 as part of performing a review of past performances of job flows. Stated differently, one of the reviewing devices 1800 may be operated by a person acting in the role of a reviewer of the manner in which an analysis was performed to request the one or more federated devices 1500 to provide various objects associated with the performance of the analysis for use in performing such a review.

By way of example, the operator of one of the reviewing devices may be associated with a scholastic, governmental or business entity that seeks to review the a performance of a job flow of an analysis by another entity. Such a review may be a peer review between two or more entities involved in scientific or other research, and may be focused on confirming assumptions on which algorithms were based and/or the correctness of the performance of those algorithms. Alternatively, such a review may be part of an inspection by a government agency into the quality of the analyses performed by and relied upon by a business in making decisions and/or assessing its own financial soundness, and may seek to confirm whether correct legally required calculations were used. In addition to a review of the result report 1770 that provides the outputs of an analysis, a review of the instance log 1720 generated by the performance of a job flow of an analysis may provide insights into the particular tasks performed and what versions of task routines 1440 were executed to perform those tasks, as well as what data set(s) 1330 were used as inputs. Alternatively or additionally, a review of a data set 1370 that may be generated by the performance of one task of a job flow as a mechanism to convey data that it generates for use by one or more other tasks of the same job flow may provide indications of where an error and/or statistical anomaly may have been introduced in the performance of an analysis.

In various embodiments, each of the one or more federated devices 1500 may incorporate one or more of a processor 1550, a storage 1560 and a network interface 1590 to couple each of the one or more federated devices 1500 to the network 1999. The storage 1560 may store a control routine 1540 and/or federated area parameters 1536. In some embodiments, part of the storage 1560 may be allocated for at least a portion of the federated area 1566. In other embodiments, each of the one or more federated devices 1500 may incorporate and/or be coupled to one or more storage devices 1600 within which storage space may be allocated for at least a portion of the federated area 1566. Regardless of where storage space is allocated for the federated area 1566, the federated area 1566 may hold one or more job flow definitions 1220, one or more data sets 1330, one or more task routines 1440, one or more instance logs 1720, and/or one or more result reports 1770. In embodiments in which job flows are performed by the one or more federated devices 1500 within the federated area 1566, the federated area 1566 may temporarily hold one or more data sets 1370 during times when one or more of the data sets 1370 are generated and temporarily maintained as part of exchanging data between tasks during the performance of one or more job flows.

In some embodiments that include the one or more storage devices 1600 in addition to the one or more federated devices 1500, the maintenance of the federated area 1566 within such separate and distinct storage devices may be part of an approach of specialization between the federated devices 1500 and the storage devices 1600. More specifically, there may be numerous ones of the federated devices 1500 forming the grid 1005 in which each of the federated devices 1500 may incorporate processing and/or other resources selected to better enable the execution of task routines 1440 as part of performing job flows defined by the job flow definitions 1220. Correspondingly, there may be numerous ones of the storage devices 1600 forming the grid 1006 in which the storage devices 1600 may be organized and interconnected in a manner providing a distributed storage system that may provide increased speed of access to objects within the federated area 1566 through parallelism, and/or may provide fault tolerance of storage. Such distributed storage may also be deemed desirable to better accommodate the storage of particular large ones of the data sets 1330 and/or 1370, as well as any particular large data sets that may be incorporated into one or more of the result reports 1770.

The control routine 1540 may incorporate a sequence of instructions operative on the processor 1550 of each of the one or more federated devices 1500 to implement logic to perform various functions. In embodiments in which multiple ones of the federated devices 1500 are operated together as the grid 1005 of the federated devices 1500, the sequence of instructions of the control routine 1540 may be operative on the processor 1550 of each of the federated devices 1500 to perform various functions at least partially in parallel with the processors 1550 of others of the federated devices 1500. As depicted, the control routine 1540 may include a federated area component 1546 operable on the processor 1550 to generate at least a portion of the federated area 1566 within either the storage 1560 or one or more of the storage devices 1600. In so doing, the processor 1550 may be caused to retrieve specifications from within the federated area parameters 1536 of various aspects of the federated area 1566. By way of example, the federated area parameters 1536 may specify a minimum and/or maximum amount of storage space to be allocated to the federated area 1566, a manner of organizing the objects stored therein, one or more aspects of the manner in which the storage devices 1600 are operated together to provide storage space for the federated area 1566, etc.

Figure 12A:
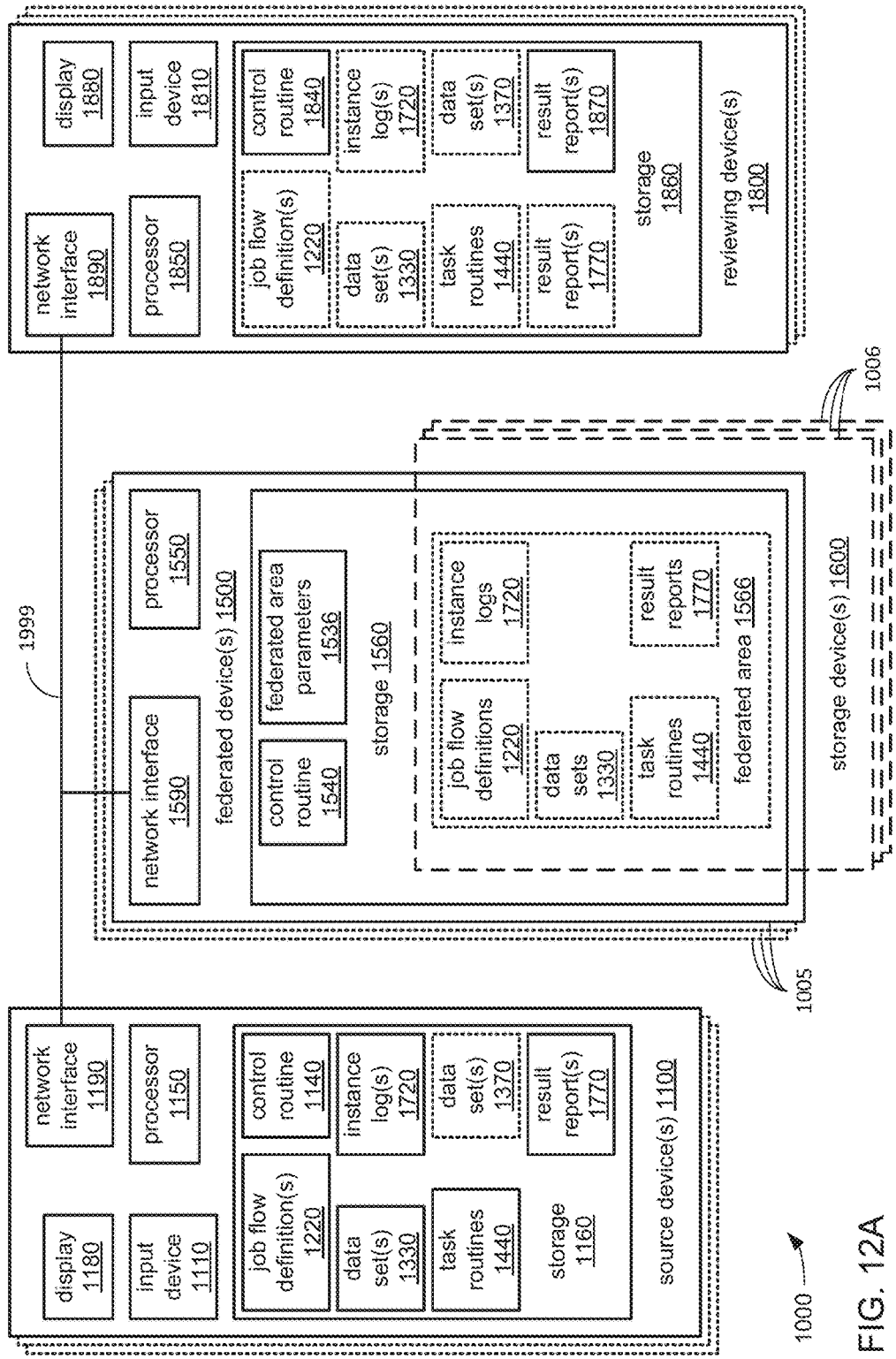
FIGS. 12A and 12B, together, illustrate an example alternate embodiment of a distributed processing system.
Figure 12B:
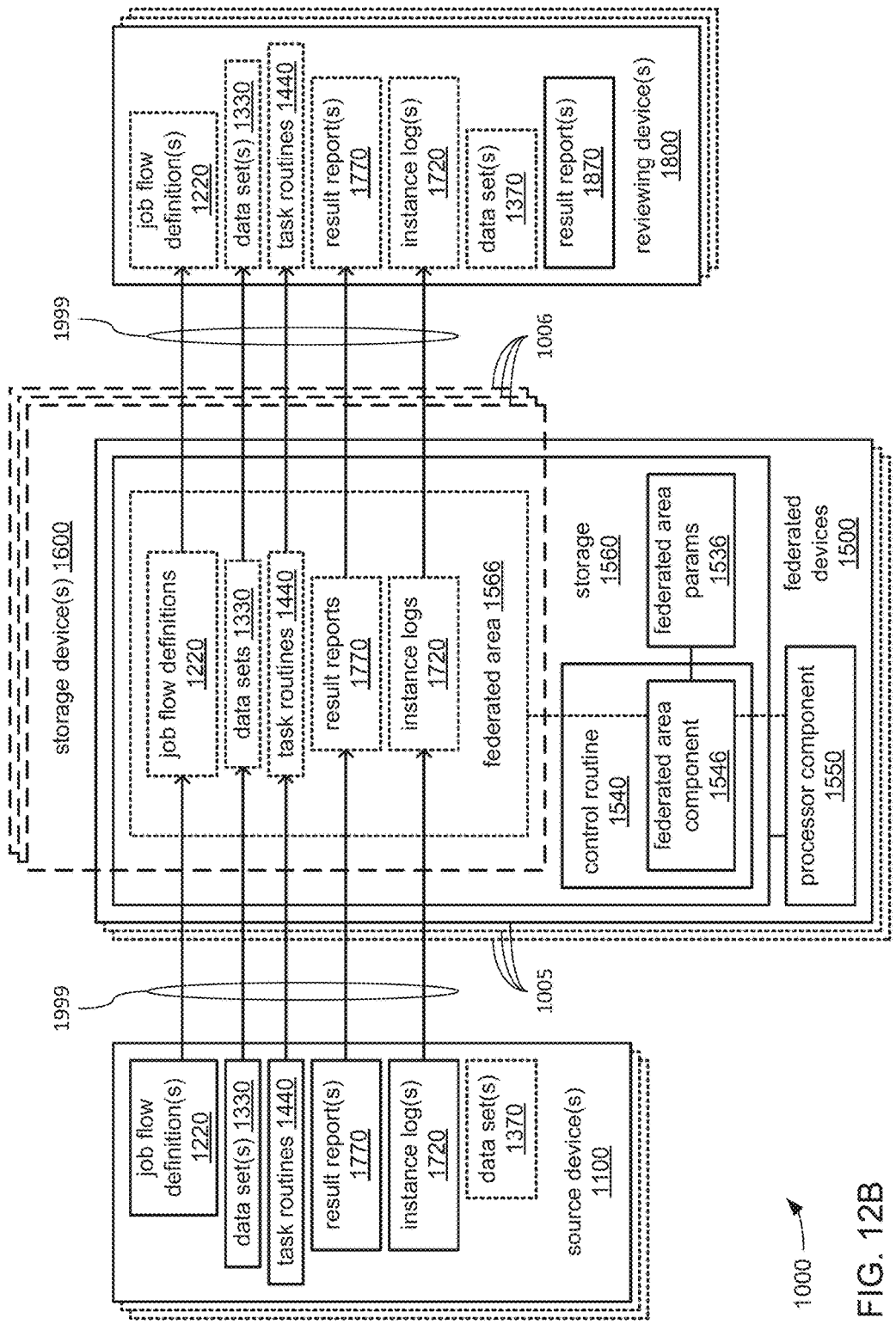

FIG. 12A illustrates a block diagram of another example embodiment of a distributed processing system 1000 also incorporating one or more source devices 1100, one or more reviewing devices 1800, one or more federated devices 1500 that may form the federated device grid 1005, and/or one or more storage devices 1600 that may form the storage device grid 1006. FIG. 12B illustrates exchanges, through a network 1999, of communications among the devices 1100, 1500, 1600 and 1800 associated with the controlled storage of and/or access to various objects within a federated area 1566. The example distributed processing system 1000 of FIGS. 12A-B is substantially similar to the example processing system 1000 of FIGS. 11A-B, but featuring an alternate embodiment of the one or more federated devices 1500 providing an embodiment of the federated area 1566 within which job flows are not performed. Thus, while task routines 1440 may be executed by the one or more federated devices 1500 within the federated area 1566 in addition to storing objects within the federated area 1566 of FIGS. 11A-B, in FIGS. 12A-B, the federated area 1566 serves as a location in which objects may be stored, but within which no task routines 1440 are executed.

Instead, in the example distributed processing system 1000 of FIGS. 12A-B, the performance of job flows, including the execution of task routines 1440 of job flows, may be performed by the one or more source devices 1100 and/or the one or more reviewing devices 1800. Thus, as best depicted in FIG. 12B, the one or more source devices 1100 may be operated to interact with the one or more federated devices 1500 to store a wider variety of objects associated with the performance of a job flow within the one or more source devices 1100. More specifically, one of the source devices 1100 may be operated to store, in the federated area 1566, a result report 1770 and/or an instance log 1720 associated with a performance of a job flow defined by a job flow definition 1220, in addition to also being operated to store the job flow definition 1220, along with the associated task routines 1440 and any associated data sets 1330 in the federated area 1566. As a result, the federated area 1566 is employed to store a record of performances of job flows that occur outside the federated area 1566.

Correspondingly, as part of a review of a performance of a job flow, the one or more reviewing devices 1800 may be operated to retrieve the job flow definition 1220 of the job flow, along within the associated task routines 1440 and any associated data sets 1330 from the federated area 1566, in addition to retrieving the corresponding result report 1770 generated by the performance and/or the instance log 1720 detailing aspects of the performance With such a more complete set of the objects associated with the performance retrieved from the federated area 1566, the one or more reviewing devices 1800 may then be operated to independently repeat the performance earlier carried out by the one or more source devices 1100. Following such an independent performance, a new result report 1870 generated by the independent performance may then be compared to the retrieved result report 1770 as part of reviewing the outputs of the earlier performance.

Referring back to all of FIGS. 11A-B and 12A-B, the role of generating objects and the role of reviewing the use of those objects in a past performance have been presented and discussed as involving separate and distinct devices, specifically, the source devices 1100 and the reviewing devices 1800, respectively. However, it should be noted that other embodiments are possible in which the same one or more devices may be employed in both roles such that at least a subset of the one or more source devices 1100 and the one or more reviewing devices 1800 may be one and the same.

Figure 13A:
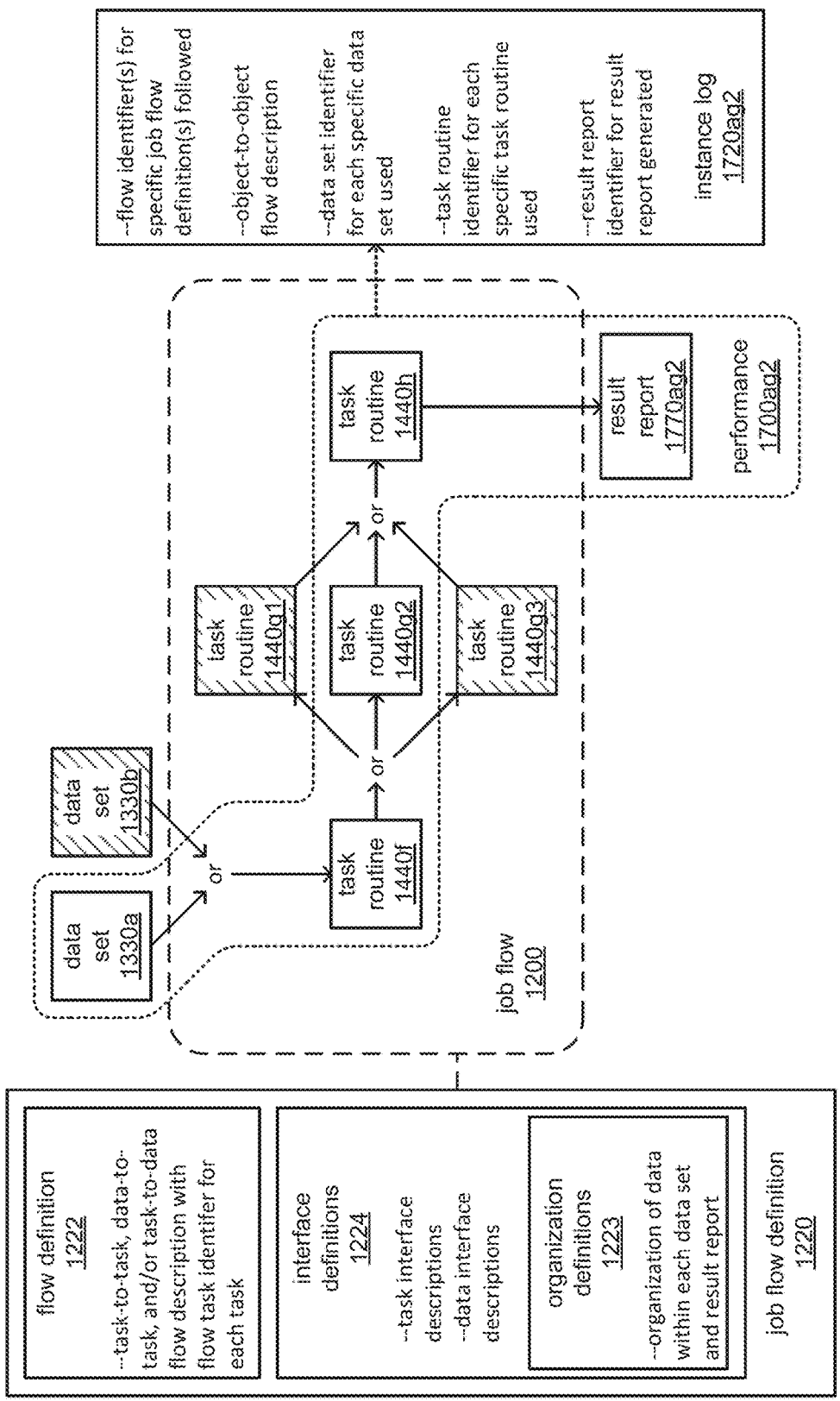
FIGS. 13A, 13B and 13C, together, illustrate an example of defining and documenting a performance of a job flow.
Figure 13B:
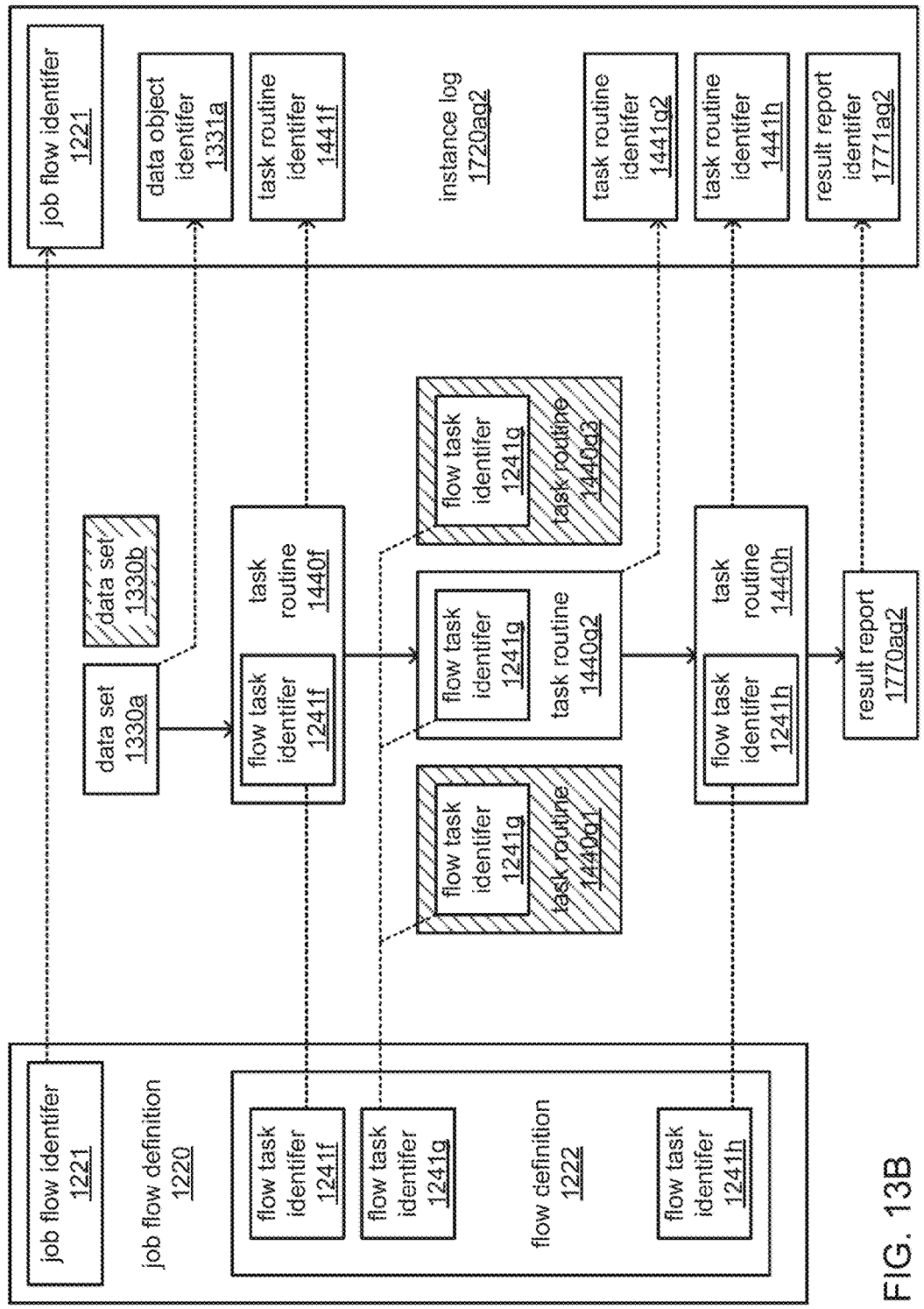
Figure 13C:
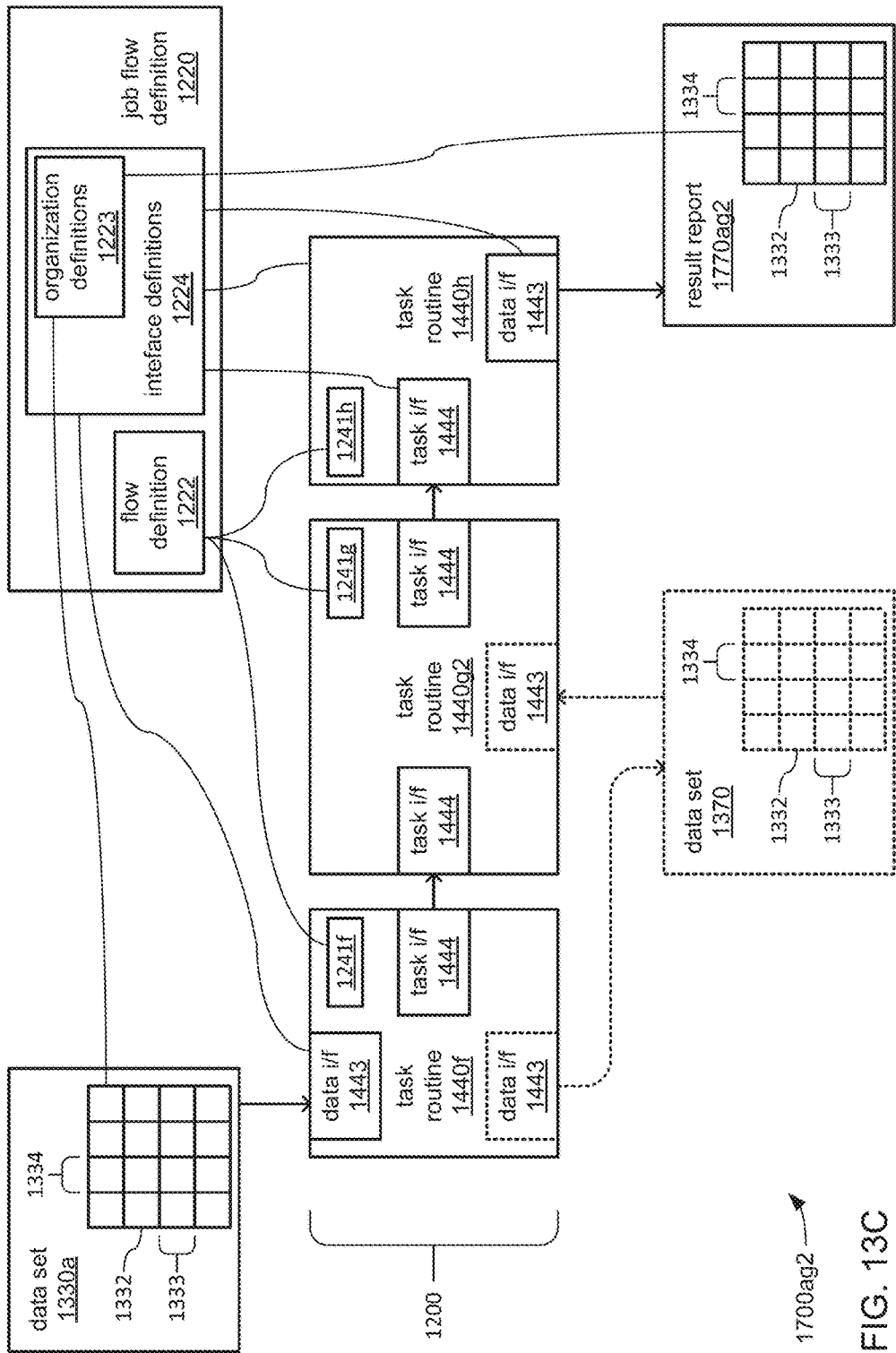

FIGS. 13A, 13B and 13C, together, illustrate the manner in which an example job flow 1200 may be configured by a job flow definition 1220. FIGS. 13A, 13B and 13C, together, also illustrate the manner in which an example performance 1700*ag*2 of the example job flow 1200 may be documented by an example instance log 1720*ag*2. For sake of ease of discussion and understanding, the same example job flow 1200 and example performance 1700*ag*2 of the example job flow 1200 are depicted throughout all of FIGS. 13A, 13B and 13C. Also, the example job flow 1200 and example performance 1700*ag*2 thereof are deliberately relatively simple examples presented herein for purposes of illustration, and should not be taken as limiting what is described and claimed herein to such relatively simple embodiments.

As depicted, the example job flow 1200 incorporates three tasks that are to be performed in a relatively simple three-step linear order through a single execution of a single task routine 1440 for each task. Also, the example job flow 1200 requires a single data set as an input data object to the first task in the linear order, may generate and exchange a single data set between two of the tasks, and generates a result report as an output data object of the last task in the linear order. As also depicted, in the example performance 1700*ag*2 of the example job flow 1200, task routines 1440*f*, 1440*g*2 and 1440*h* are the three task routines selected to be executed to perform the three tasks. Also, a data set 1330*a* is selected to serve as the input data object, a data set 1370*a* may be generated and exchanged between performed tasks as a mechanism to exchange data therebetween, and a result report 1770*ag*2 is the output data object to be generated as an output of the performance 1700*ag*2. Again, it should be noted that other embodiments of a job flow are possible in which there may be many more tasks to be performed, many more data objects that serve as inputs and/or many more data objects generated as outputs. It should also be noted that other embodiments of a job flow are possible in which there is a much more complex order of the performance of tasks that may include parallel and/or conditional branches that may converge and/or diverge.

Turning to FIGS. 13A and 13B, the job flow definition 1220 for the example job flow 1200 may include a flow definition 1222 that specifies the three tasks to be performed, the order in which they are to be performed, and which of the three tasks is to accept a data object as an input and/or generate a data object as an output. In specifying the three tasks to be performed, the flow definition 1222 may use flow task identifiers 1241, such as the depicted flow task identifiers 1241*f*, 1241*g* and 1241*h* that uniquely identify each of the three tasks. As depicted, there may be a single task routine 1440*f* that is able to perform the task specified with the flow task identifier 1241*f*, and therefore, the single task routine 1440*f* may be the one task routine assigned the flow task identifier 1241*f* to provide an indication that it is able to perform the task. Also, there may be three task routines 1440*g*1, 1440*g*2 and 1440*g*3 that are each able to perform the task specified with the flow task identifier 1241*g*, and therefore, each may be assigned the flow task identifier 1241*g*. Further, there may be a single task routine 1440*h* that is able to perform the task specified with the flow task identifier 1241*h*, resulting in the assignment of the flow task identifier 1241*h* to the single task routine 1440*h*.

As has been discussed, the job flow definition 1220 specifies the tasks to be performed in a job flow, but does not specify any particular task routine 1440 to be selected for execution to perform any particular one of those tasks during any particular performance of the job flow. Where there are multiple task routines 1440 that are capable of performing a particular task, a single one of those multiple task routines 1440 is selected for execution to do so, and the selection that is made may depend on the nature of the request received to perform a job flow. The selection of a particular task routine 1440 for execution to perform each particular task may be based on which task routine 1440 is the newest version to perform each task, and/or may be based on which task routine 1440 was used in a previous performance of each task in a specified previous performance of a job flow. As will be explained in detail, the selection criteria that is used to select task routines 1440 for each task may depend on whether an entirely new performance of a job flow is requested or a repetition of an earlier performance of a job flow is requested. As depicted, in the example performance 1700*ag*2 of the example job flow 1200, the task routine 1440*g*2 is selected from among the task routines 1440*g*1, 1440*g*2 and 1440*g*3 for execution to perform the task identified with the flow task identifier 1241*g*.

Turning to FIGS. 13A and 13C, the job flow definition 1220 may include interface definitions 1224 that specify aspects of task interfaces 1444 employed in communications among task the routines 1440 that are selected for execution to perform the tasks of the example job flow 1200 (e.g., the task routines 1440*f*, 1440*g*2 and 1440*h*). Such aspects may include quantity, type, bit widths, protocols, etc., of parameters passed from one task routine 1440 to another as part of communications among task routines 1440 during their execution. As also depicted, the interface definitions 1224 may specify aspects of data interfaces 1443 between task routines 1440 and any data objects that may be employed as an input to a performance (e.g., the data set 1330*a*) and/or that may be generated as an output of a performance (e.g., the result report 1770*ag*2) of the example job flow 1200, such as the data example performance 1700*ag*2. The interface definitions 1224 may also specify aspects of data interfaces 1443 employed by one task routine 1440 to generate a data object to convey a relatively large quantity of data to another task routine 1440 (e.g., the data set 1370 depicted with dotted lines), and may specify aspects of the data interface 1443 employed by the other task routine 1440 to retrieve data from that same data object. Since many of the specified aspects of the data interfaces 1443 may necessarily be closely associated with the manner in which data items are organized and made accessible within data objects, the interface definitions 1224 may include organization definitions 1223 that specify such organizational and access aspects of the data objects. Thus, as depicted in FIG. 13C, where each of the data sets 1330*a* and 1370 (if any are present), and the result report 1770*ag*2 include a two-dimensional array, the organization definitions 1223 may specify various aspects of the data items 1332 (e.g., data type, bit width, etc.), the rows 1333 and/or the columns 1334 for each these data objects.

As previously discussed, the job flow definition 1220 specifies tasks to be performed and not the particular task routines 1440 to be selected for execution to perform those tasks, which provides the flexibility to select the particular task routines 1440 for each task at the time a performance takes place. Similarly, the job flow definition 1220 also does not specify particular data objects to be used, which provides the flexibility to select the particular data objects with which the job flow is to be used at the time a performance takes place. However, the interface definitions 1224 do specify aspects of the interfaces among the task routines 1440, and between the task routines 1440 and data objects. The specification of aspects of the interfaces 1443 and/or 1444 may be deemed desirable to ensure continuing interoperability among task routines 1440, as well as between task routines 1440 and data objects, in each new performance of a job flow, even as new versions of one or more of the task routines 1440 and/or new data objects are created for use in later performances.

In some embodiments, new versions of task routines 1440 may be required to implement the interfaces 1443 and/or 1444 in a manner that exactly matches the specifications of those interfaces 1443 and/or 1444 within a job flow definition 1220. However, in other embodiments, a limited degree of variation in the implementation of the interfaces 1443 and/or 1444 by newer versions of task routines 1440 may be permitted as long as "backward compatibility" is maintained in retrieving input data objects or generating output data objects through data interfaces 1443, and/or in communications with other task routines through task interfaces 1444. As will be explained in greater detail, the one or more federated devices 1500 may employ the job flow definitions 1220 stored within the federated area 1566 to confirm that new versions of task routines 1440 correctly implement task interfaces 1444 and/or data interfaces 1443. By way of example, in some embodiments, it may be deemed permissible for an interface 1443 or 1444 that receives information to be altered in a new version of a task routine 1440 to accept additional information from a newer data object or a newer version of another task routine 1440 if that additional information is provided, but to not require the provision of that additional information. Alternatively or additionally, by way of example, it may be deemed permissible for an interface 1443 or 1444 that outputs information to be altered in a new version of task routine 1440 to output additional information as an additional data object generated as an output, or to output additional information to a newer version of another task routine 1440 in a manner that permits that additional information to be ignored by an older version of that other task routine 1440.

Returning to FIGS. 13A and 13B, an example instance log 1720*ag*2 that is generated as result a of the example performance 1700*ag*2 of the example job flow 1200 is depicted. Although the job flow definition 1220 does not specify particular data objects or task routines 1440 to be used in performances of the example job flow 1200, the example instance log 1720*ag*2 does include such details, as well as others, concerning the example performance 1700*ag*2. Thus, the example instance log 1720*ag*2 includes the job flow identifier 1221 for the example job flow definition 1220; the task routine identifiers 1441*f*, 1441*g*2 and 1441*h* for the particular task routines 1440*f*, 1440*g*2 and 1440*h*, respectively, that were executed in the example performance 1700*ag*2; the data object identifier 1331*a* for the data set 1330*a* used as an input data object; and the result report identifier 1771*ag*2 for the result report 1770*ag*2. As has been discussed, the example instance log 1720*ag*2 is intended to serve as a record of sufficient detail concerning the example performance 1700*ag*2 as to enable all of the objects associated with the example performance 1700*ag*2 to be later identified, retrieved and used to repeat the example performance 1700*ag*2. In contrast, the job flow definition 1220 is intended to remain relatively open-ended for use with a variety of data objects and/or with a set of task routines 1440 that may change over time as improvements are made to the task routines 1440.

Figure 14A:
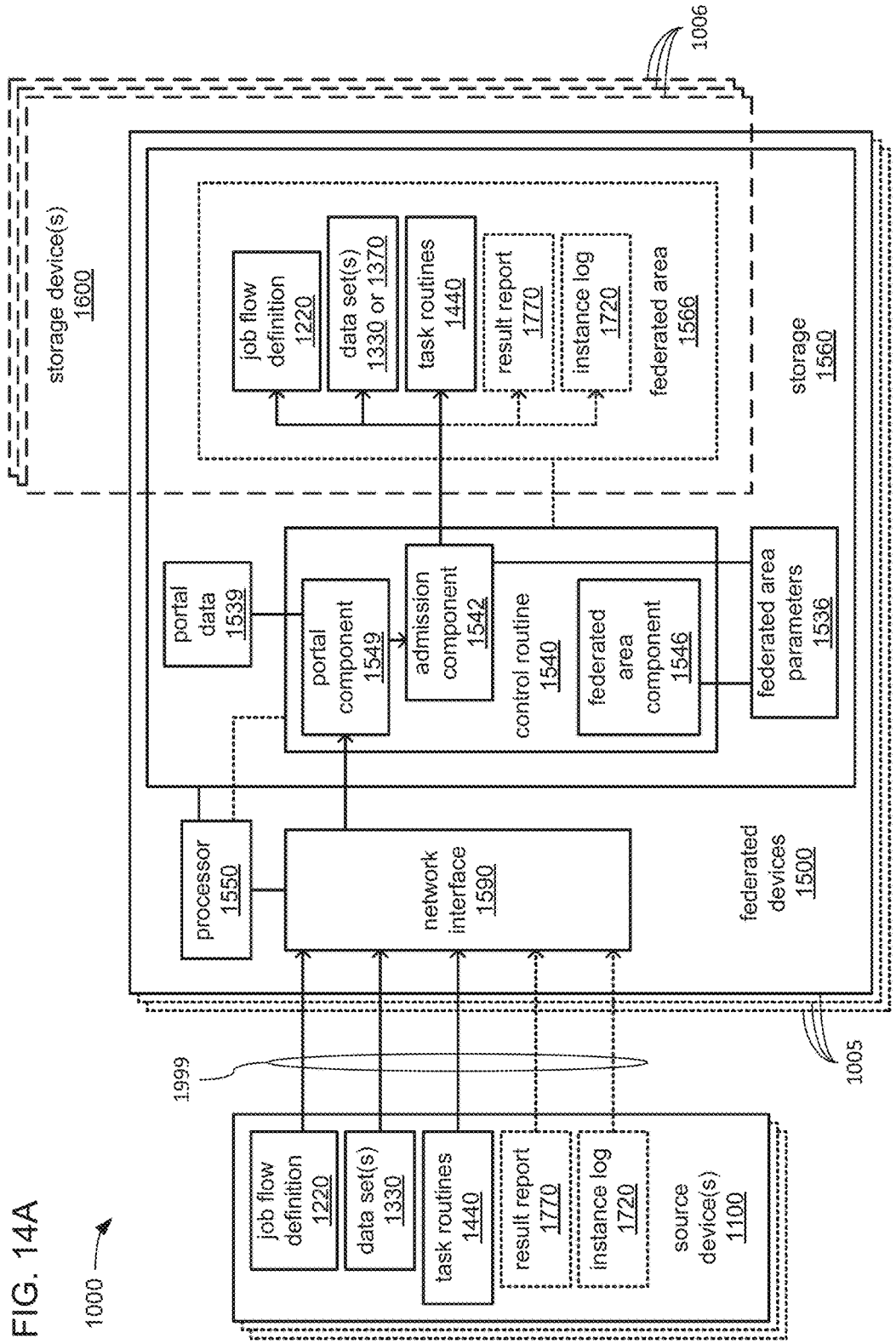
FIGS. 14A, 14B, 14C, 14D and 14E, together, illustrate an example of a federated device storing and organizing objects in a federated area.

FIGS. 14A, 14B, 14C, 14D and 14E, together, illustrate the manner in which at least one of the federated devices 1500 selectively stores and organizes objects within the federated area 1566. FIG. 14A illustrates aspects of selective storage of objects received from one or more of the source devices 1100 within the federated area 1566, and FIGS. 14B-E illustrates aspects of organization objects within the federated area 1566 in preparation for retrieval and use in performances of job flows.

Turning to FIG. 14A, one of the source devices 1100 may be operated to transmit a request to one of the federated devices 1500 to store objects associated with a job flow within the federated area 1566. As depicted, the control routine 1540 executed by the processor 1550 of the federated device 1500 that receives the request may include a portal component 1549 to restrict access to the federated area 1566 to only authorized persons, entities and/or devices, and may restrict the types of accesses made to only those for which each person, entity and/or device is authorized. However, in alternate embodiments, control of access to the federated area 1566 may be provided by one or more other devices that may be interposed between the one or more federated devices 1500 and the network 1999, or that may be interposed between the one or more federated devices 1500 and the one or more storage devices 1600 (if present), or that may still otherwise cooperate with the one or more federated devices 1500 to do so. The control routine 1540 may also include an admission component 1542 to restrict the objects that may be accepted for storage within the federated area 1566 to those that comply with one or more requirements.

In executing the portal component 1549, the processor 1550 may be caused to operate the network interface 1590 to provide a portal accessible by other devices via the network 1999, and through which access may be granted by the processor 1550 to the federated area 1566. In some embodiments in which the one or more federated devices 1500 additionally serve to control access to the federated area 1566, the portal may be implemented employing the hypertext transfer protocol over secure sockets layer (HTTPS) to provide a website securely accessible from other devices via the network 1999. Such a website may include a webpage generated by the processor 1550 that requires the provision of a password and/or other security credentials to gain access to the federated area 1566. Such a website may be configured for interaction with other devices via an implementation of representational state transfer (REST or RESTful) application programming interface (API). However, other embodiments are possible in which the processor 1550 may provide a portal accessible via the network 1999 that is implemented in any of a variety of other ways using any of a variety of handshake mechanisms and/or protocols to selectively provide secure access to the federated area 1566. In determining whether to grant or deny access to the federated area 1566 to another device from which a request for access has been received, the processor 1550 may be caused to refer to indications stored within portal data 1539 of persons, entities and/or devices that are authorized to be granted access. Such indications may include indications of security credentials expected to be provided by such persons, entities and/or machines. In some embodiments, such indications within the portal data 1539 may be organized into accounts that are each associated with an entity with which particular persons and/or devices may be associated. The processor 1550 may be caused to employ the portal data 1539 to evaluate security credentials received in association with a request for access to the federated area 1566, and may operate the network interface 1590 to transmit an indication of grant or denial of access to the federated area 1566 depending on whether the processor 1550 determines that access is to be granted.

Beyond selective granting of access to the federated area 1566 (in embodiments in which the one or more federated devices 1500 control access thereto), the processor 1550 may be further caused by execution of the portal component 1549 to restrict the types of access granted, depending on the identity of the person, entity and/or device to which access has been granted. By way of example, the portal data 1539 may indicate that different persons and/or different devices associated with a particular scholastic, governmental or business entity are each to be allowed different degrees and/or different types of access. One such person or device may be granted access to retrieve objects from within the federated area 1566, but may not be granted access to alter or delete objects, while another particular person operating a particular device may be granted a greater degree of access that allows such actions. In embodiments in which there is a per-object control of access, the one or more federated devices 1500 (or the one or more other devices that separately control access) may cooperate with the one or more storage devices 1600 (if present) to effect such per-object access control.

It should be noted that the granting of access to the federated area 1566 to store one or more objects may lead to a parallel transfer of portions of one or more of the objects via the network 1999 from and/or to a grid of devices. This may be deemed desirable for the transfer of larger objects, such as data objects (e.g., a data set 1330) that may be quite large in size. More precisely, in embodiments in which the source device 1100 that transmitted the request for access to store objects is operated as part of a grid of the source devices 1100, the granting of access to store objects in the federated area 1566 may result in multiple ones of source devices 1100 transmitting one or more of the objects to one or more of the federated devices 1500 as multiple portions in at least partially parallel transfers. Correspondingly, in embodiments in which the federated device 1500 that received the request is operated as part of a federated device grid 1005, multiple ones of the federated devices 1500 may receive one or more of the transmitted objects as portions and at least partially in parallel.

In executing the admission component 1542, the processor 1550 may be caused to impose various restrictions on what objects may be stored within the federated area 1566, presuming that the processor 1550 has been caused by the portal component 1549 to grant access in response to the received request to store objects. Some of such restrictions may be based on dependencies between objects and may advantageously automate the prevention of situations in which one object stored in the federated area 1566 is rendered nonfunctional as a result of another object having not been stored within the federated area 1566 such that it is unavailable.

By way of example, and as previously explained, such objects as job flow definitions 1220 include references to tasks to be performed. In some embodiments, it may be deemed desirable to prevent a situation in which there is a job flow definition 1220 stored within the federated area 1566 that describes a job flow that cannot be performed as a result of there being no task routines 1440 stored within the federated area 1566 that are able to perform one or more of the tasks specified in the job flow definition 1220. Thus, where a request is received to store a job flow definition 1220, the processor 1550 may be caused by the admission component 1542 to first determine whether there is at least one task routine 1440 stored within the federated area 1566 to perform each task specified in the job flow definition. If there isn't then the processor 1550 may be caused by the admission component 1542 to disallow storage of that job flow definition 1220 within the federated area 1566, at least until such missing task routine(s) 1440 have been stored therein. In so doing, and as an approach to improving ease of use, the processor 1550 may be caused to transmit an indication of the reason for the refusal to inform an operator of the source device 1100 of what can be done to remedy the situation.

Also by way of example, and as previously explained, such objects as instance logs 1720 include references to such other objects as a job flow definition, task routines executed to perform tasks, and data objects employed as inputs and/or generated as outputs. In some embodiments, it may also be deemed desirable to avoid a situation in which there is an instance log 1720 stored within the federated area 1566 that describes a performance of a job flow that cannot be repeated as a result of the job flow definition 1220, one of the task routines 1440, or one of the data objects referred to in the instance log 1720 not being stored within the federated area 1566. Such a situation may entirely prevent a review of a performance of a job flow. Thus, where a request is received to store an instance log 1720, the processor 1550 may be caused by the admission component 1542 to first determine whether all of the objects referred to in the instance log 1720 are stored within the federated area 1566, thereby enabling a repeat performance using all of the objects referred to in the instance log 1720. If there isn't then the processor 1550 may be caused by the admission component 1542 to disallow storage of that instance log 1720 within the federated area 1566, at least until such missing object(s) have been stored therein. Again, as an approach to improving ease of use, the processor 1550 may be caused to transmit an indication of the reason for the refusal to inform an operator of the source device 1100 of what can be done to remedy the situation, including identifying the missing objects.

Additionally by way of example, and as previously explained, such objects as job flow definitions 1220 may specify various aspects of interfaces among task routines, and/or between task routines and data objects. In some embodiments, it may be deemed desirable to prevent a situation in which the specification in a job flow definition 1220 of an interface for any task routine that may be selected to perform a specific task does not match the manner in which that interface is implemented in a task routine 1440 that may be selected for execution to perform that task. Thus, where a request is received to store a combination of objects that includes both a job flow definition 1220 and one or more associated task routines 1440, the processor 1550 may be caused to compare the specifications of interfaces within the job flow definition 1220 to the implementations of those interfaces within the associated task routines 1440 to determine whether they sufficiently match. Alternatively or additionally, the processor 1550 may be caused to perform such comparisons between the job flow definition 1220 that are requested to be stored and one or more task routines 1440 already stored within the federated area 1566, and/or to perform such comparisons between each of the task routines 1440 that are requested to be stored and one or more job flow definitions 1220 already stored within the federated area 1566. If the processor 1550 determines that there is an insufficient match, then the processor 1550 may be caused to disallow storage of the job flow definition 1220 and/or of the one or more associated task routines 1440. In so doing, and as an approach to improving ease of use, the processor 1550 may be caused to transmit an indication of the reason for the refusal to inform an operator of the source device 1100 of what can be done to remedy the situation, including providing details of the insufficiency of the match.

Figure 14B:
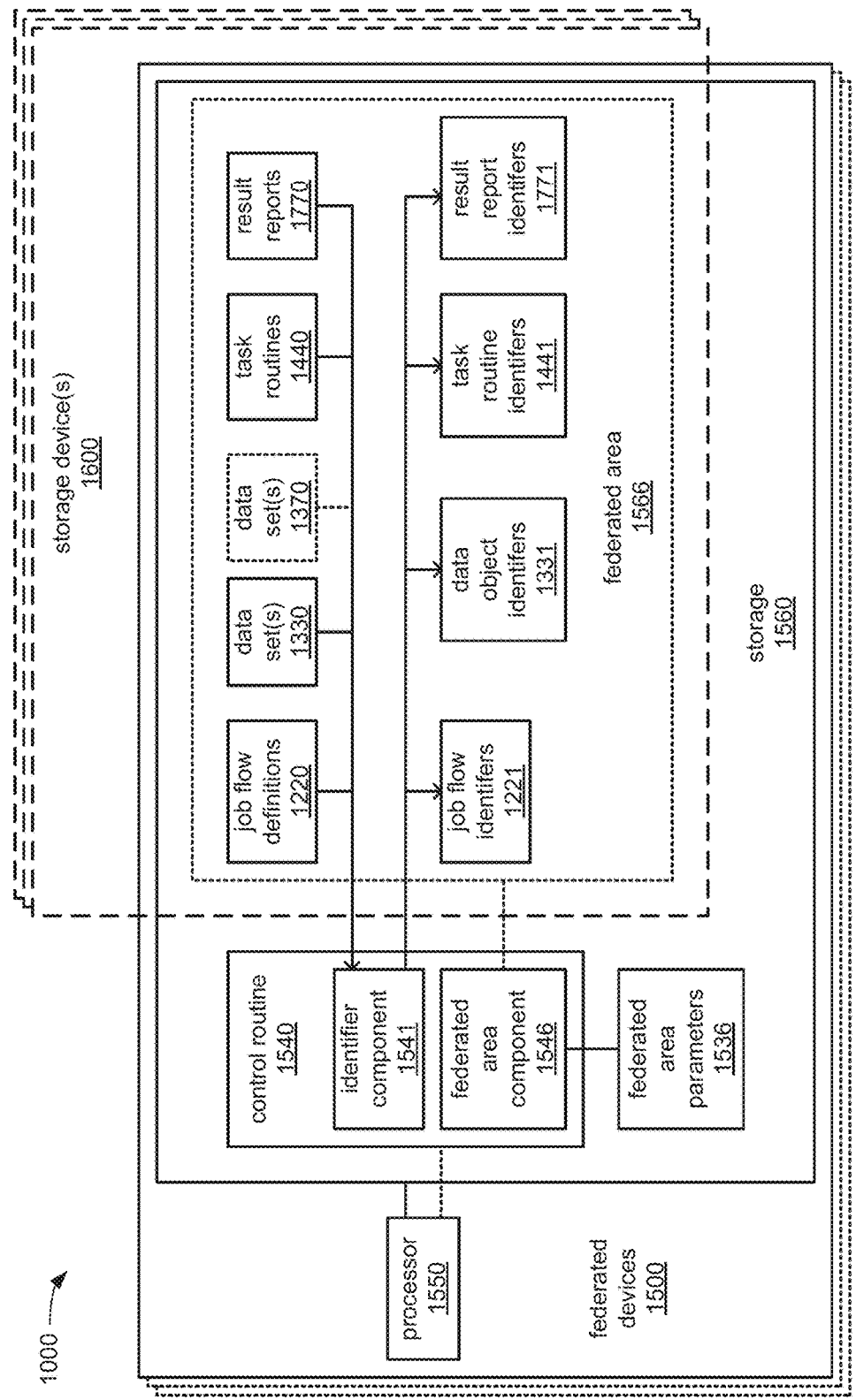

Turning to FIG. 14B, as depicted, the control routine 1540 executed by at least one of the federated devices 1500 may include an identifier component 1541 to assign identifiers to objects within the federated area 1566. As previously discussed, each instance log 1720 may refer to objects associated with a performance of a job flow (e.g., a job flow definition 1220, task routines 1440, and/or data objects used as inputs and/or generated as outputs, such as the data sets 1330 and/or 1370, and/or a result report 1770) by identifiers assigned to each. Also, as will shortly be explained, the assigned identifiers may be employed as part of an indexing system in one or more data structures and/or databases to more efficiently retrieve such objects. In some embodiments, the processor 1550 may be caused by the identifier component 1541 to assign identifiers to objects as they area received via the network 1999 from other devices, such as the one or more source devices 1100. In other embodiments, the processor 1550 may be caused by the identifier component 1541 to assign identifiers to objects generated as a result of a performance of a job flow (e.g., a result report 1770 generated as an output data object).

In some embodiments, each identifier may be generated by taking a hash of at least a portion of its associated object to generate a hash value that becomes the identifier. More specifically, a job flow identifier 1221 may be generated by taking a hash of at least a portion of the corresponding job flow definition 1220; a data object identifier 1331 may be generated by taking a hash of at least a portion of the corresponding data set 1330 or 1370; a task routine identifier 1441 may be generated by taking a hash of at least a portion of the corresponding task routine 1440; and/or a result report identifier 1771 may be generated by taking a hash of at least a portion of the corresponding result report 1770. Any of a variety of hash algorithms familiar to those skilled in the art may be employed. Such an approach to generating identifiers may be deemed desirable as it may provide a relatively simple mechanism to generate identifiers that are highly likely to be unique to each object, presuming that a large enough portion of each object is used as the basis for each hash taken. In some embodiments, the size of the portions of each of these different objects of which a hash is taken may be identical. Alternatively or additionally, the bit widths of the result hash values that become the identifiers 1221, 1331, 1441 and 1771 may be identical.

Such an approach to generating identifiers may advantageously be easily implemented by devices other than the one or more federated devices 1550 to reliably generate identifiers for objects that are identical to the identifiers generated by the processor 1550 of any of the federated devices 1500. Thus, if a job flow is performed by another device, the instance log 1720 generated by the other device would use identifiers to refer to the objects associated with that performance that would be identical to the identifiers that would have been generated by the processor 1550 of the federated device 1500 to refer to those same objects. As a result, such an instance log 1720 could be received by the federated device 1500 and stored within the federated area 1566 without the need to derive new identifiers to replace those already included within the instance log 1720 to refer to objects associated with a performance of a job flow.

Referring to FIG. 14A in addition to FIG. 14B, in some embodiments, the identifier component 1541 may cooperate with the admission component 1542 in causing the processor 1550 to analyze received objects to determine compliance with various restrictions as part of determining whether to allow those objects to be stored within the federated area 1566. More specifically, and by way of example, the identifier component 1541 may generate identifiers for each received object. The provision of identifiers for each received object may enable the admission component 1542 to cause the processor 1550 to check whether the objects specified in a received instance log 1720 are available among the other objects received along with the received instance log 1720, as well as whether the objects specified in the received instance log 1720 are available as already stored within the federated area 1566. If an object referred to in the received instance log 1720 is neither among the other received objects or among the objects already stored within the federated area 1566, then the processor 1550 may be caused by the admission component 1542 to disallow storage of the received instance log 1720 within the federated area 1566. As previously discussed, a disallowing the storage of an instance log 1720 for such reasons may be deemed desirable to prevent storage of an instance log that describes a performance of a job flow that cannot be repeated due to one or more of the objects associated with that performance being missing.

Figure 14C:
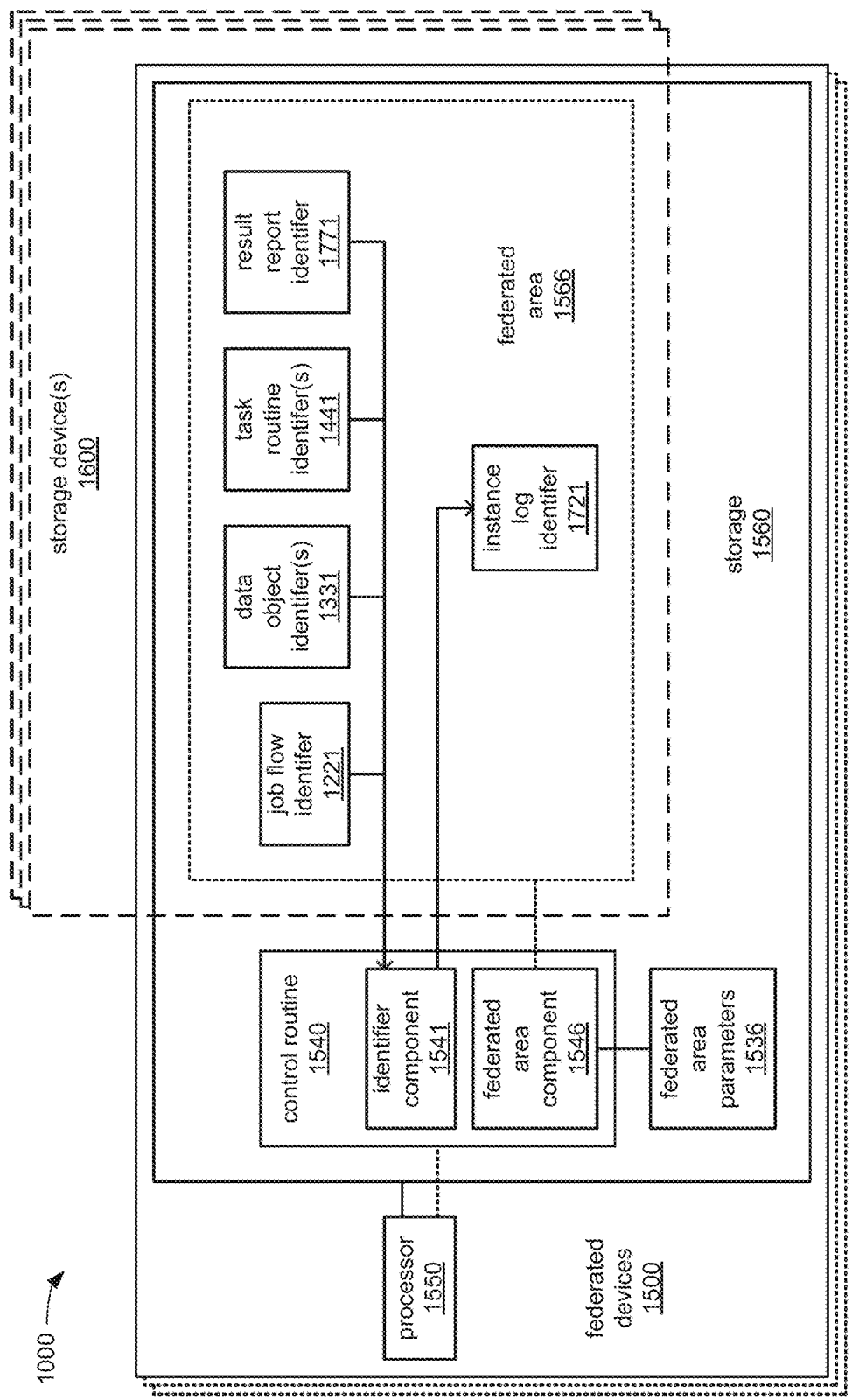

Turning to FIG. 14C, in some embodiments, the generation of identifiers for instance logs 1720 may differ from the generation of identifiers for other objects. More specifically, while the identifiers 1221, 1331, 1441 and 1771 may each be derived by taking a hash of at least a portion of its corresponding object, an instance log identifier 1721 for an instance log 1720 may be derived from at least a portion of each of the identifiers for the objects that are associated with the performance that corresponds to that instance log. Thus, as depicted, the processor 1550 may be caused by the identifier component 1541 to generate an instance log identifier 1721 for a performance of a job flow by concatenating at least a portion of each of a job flow identifier 1221, one or more data object identifiers 1331, one or more task routine identifiers 1441, and a result report identifier 1771 for a job flow definition 1220, one or more data sets 1330 and/or 1370, one or more task routines 1440, and a result report 1770, respectively, that are all associated with that performance of that job flow. In embodiments in which the bit widths of each of the identifiers 1221, 1331, 1441 and 1771 are identical, log identifiers 1721 may be formed from identically sized portions of each of such identifiers 1221, 1331, 1441 and 1771, regardless of the quantity of each of the identifiers 1221, 1331, 1441 and 1771 used. Such use of identically sized portions of such identifiers 1221, 1331, 1441 and 1771 may be deemed desirable to aid in limiting the overall bit widths of the resulting log identifiers 1721.

Figure 14D:
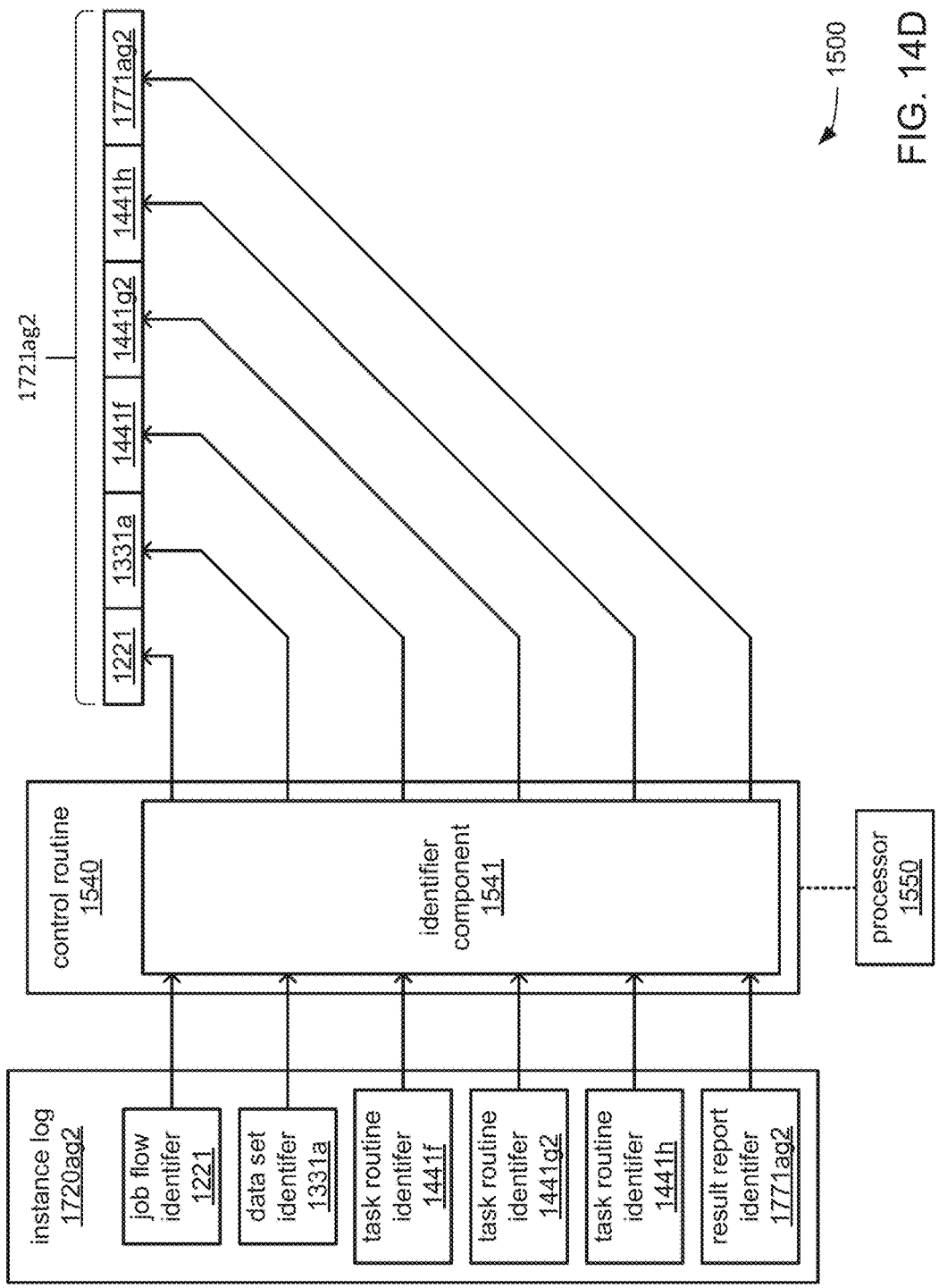

FIG. 14D illustrates such a concatenation of identifiers in greater detail using identifiers of objects associated with the example job flow 1200 and the example performance 1700ag2 earlier discussed in connection with FIGS. 13A-C. As depicted, after having generated a job flow identifier 1221, a data set identifier 1331a, a task routine identifier 1441f, a task routine identifier 1441g2, a task routine identifier 1441h and a result report identifier 1771ag2 for the example job flow definition 1220, the data set 1330a, the task routine 1440f, the task routine 1440g2, the task routine 1440h and the result report 1770ag2, respectively, the processor 1550 may be caused by the identifier component 1541 to concatenate at least an identically sized portion of each of these identifiers together to form the single instance log identifier 1721ag2 for the example instance log 1720ag2 of FIGS. 13A-C.

Figure 14E:
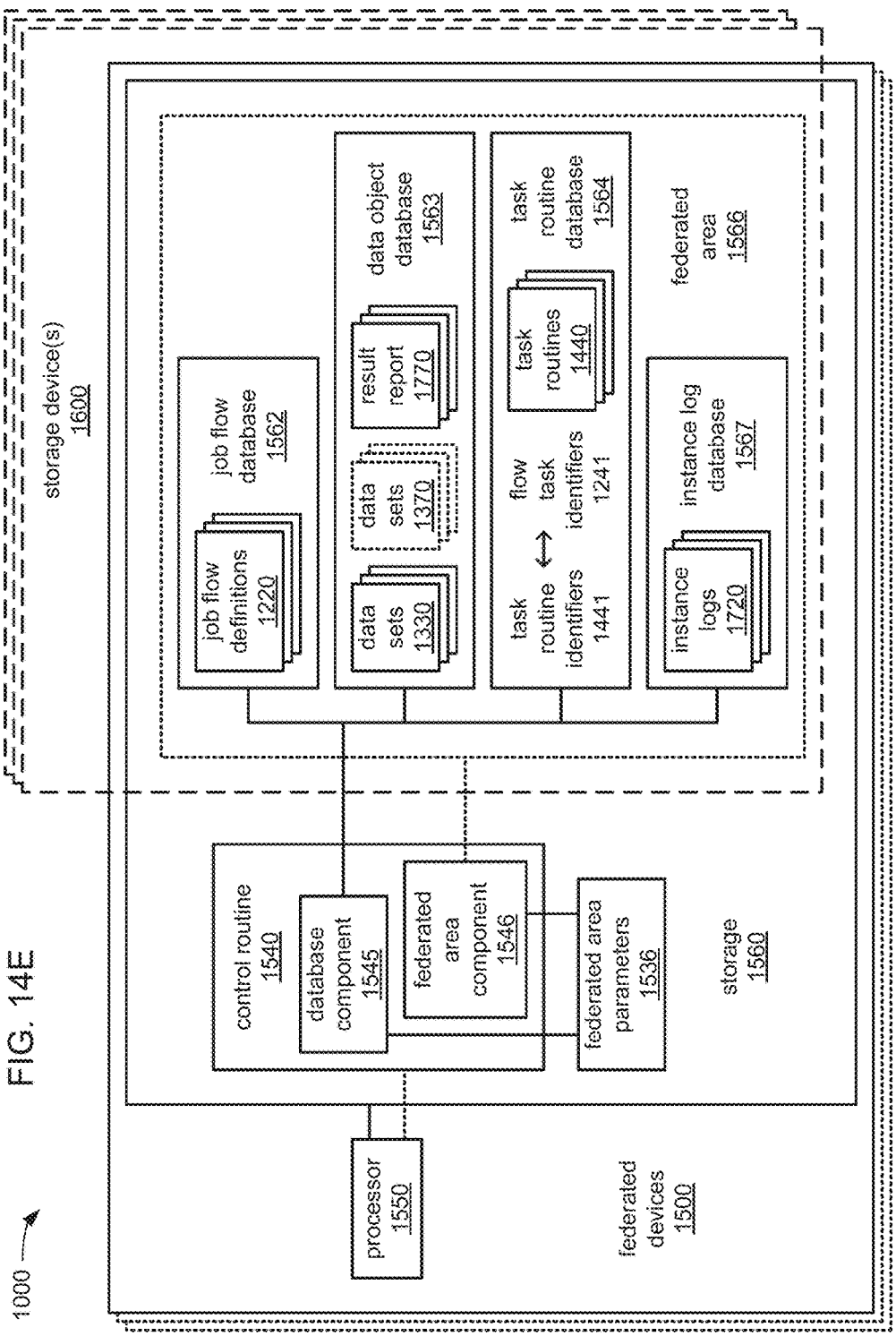

Turning to FIG. 14E, as depicted, the control routine 1540 executed by the processor 1550 of at least one of the federated devices 1500 may include a database component 1545 to organize various ones of the objects 1220, 1330, 1370, 1440, 1720 and 1770 into one or more databases (or one or more other data structures of other varieties) for more efficient storage and retrieval thereof within the federated area 1566. In some embodiments, such organization of objects may be performed within the storages 1560 of multiple federated devices 1500, which may be operated together as the federated device grid 1005. In other embodiments, such organization of objects may be performed within multiple storage devices 1600, which may be operated together as the storage device grid 1006. In different embodiments, either of the grids 1005 or 1006 may be employed to provide distributed storage space across multiple ones of the devices 1500 or 1600, respectively, for the federated area 1566.

As depicted, the processor 1550 may be caused by the database component 1545 to generate and/or maintain a distinct job flow database 1562 of the job flow definitions 1220. Within the job flow database 1562, the job flow definitions 1220 may be indexed or made otherwise addressable by their corresponding job flow identifiers 1221. The processor 1550 may also be caused to generate and/or maintain a distinct data object database 1563 of the data sets 1330 and/or 1370, and/or for the result reports 1770. Within the data object database 1563, each of the data sets 1330 and/or 1370 may be accessible via their corresponding data object identifiers 1331, and/or each of the result reports 1770 may be accessible via their corresponding result report identifiers 1771.

As also depicted, the processor 1550 may be caused by the database component 1545 to generate and/or maintain a distinct task routine database 1564 of the task routines 1440. Within the task routine database 1564, the task routines 1440 may be indexed or made otherwise addressable both by their corresponding task routine identifiers 1441, and by the flow task identifiers 1241 that each may also be assigned to indicate the particular task that each is able to perform. As has been discussed, there may be tasks that multiple task routines 1440 are able to perform such that there may be sets of multiple task routines 1440 that all share the same flow task identifier 1241. In some embodiments, a search of the task routine database 1564 using a flow task identifier 1241 to find a task routine 1440 that is able to perform the task identified by that flow task identifier 1241 may beget an indication from the task routine database 1564 of there being more than one of such task routines 1440, such as a list of the task routine identifiers 1441 of such task routines 1440. Such an indication may also include an indication of which of the multiple task routines 1440 so identified is the most recent version thereof. Such an indication may be provided by an ordering of the task routine identifiers 1441 of the multiple task routines 1440 that places the task routine identifier 1441 of the most recent version of the task routines 1440 at a particular position within the list. In this way, indications of whether one, or more than one, task routines 1440 exist that are able to perform a task, as well as which one of multiple task routines 1440 is the newest version may be quickly provided by the task routine database 1564 in a manner that obviates the need to access and/or analyze any of the task routines 1440 therefrom.

As further depicted, the processor 1550 may be caused by the database component 1545 to generate and/or maintain a distinct instance log database 1567 of the instance logs 1720. Within the instance log database 1567, the instance logs 1720 may be indexed or made otherwise addressable by their corresponding instance log identifiers 1721. As has been discussed, each performance of a job flow may cause the generation of a separate corresponding instance log 1720 during that performance that provides a log of events occurring during the performance, including and not limited to, each performance of a task. In such embodiments, each instance log 1720 may be implemented as a separate data structure and/or file to provide indications of events occurring during the performance to which it corresponds. However, other embodiments are possible in which each of the instance logs 1720 is implemented as an entry of a larger log data structure and/or larger log data file, such as the instance log database 1567. In some embodiments, the manner in which the instance log identifiers 1721 of the instance logs 1720 stored within the instance log database 1567 (or other data structure) may be structured to allow each of the instance log identifiers 1721 to be searched for at least portions of particular identifiers for other objects that were concatenated to form one or more of the instance log identifiers 1721. As will shortly be explained in greater detail, enable such searches to be performed of the instance log identifiers 1721 may advantageously allow an instance log 1720 for a particular performance of a particular job flow to be identified in a manner that obviates the need to access and/or analyze any of the instance logs 1720 within the instance log database 1567.

Figure 15A:
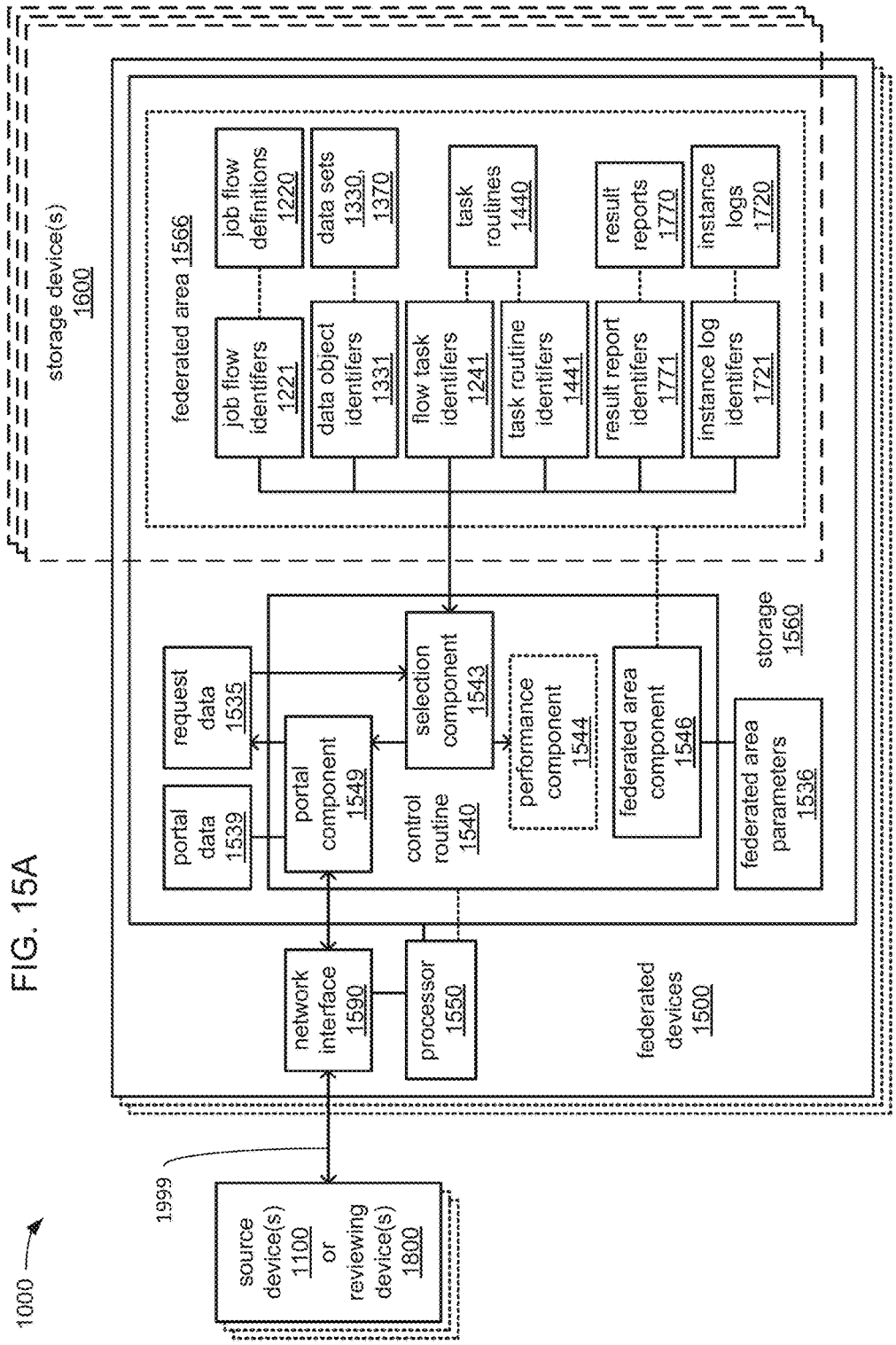
FIGS. 15A and 15B, together, illustrate an example of a federated device retrieving objects from a federated area.
Figure 15B:
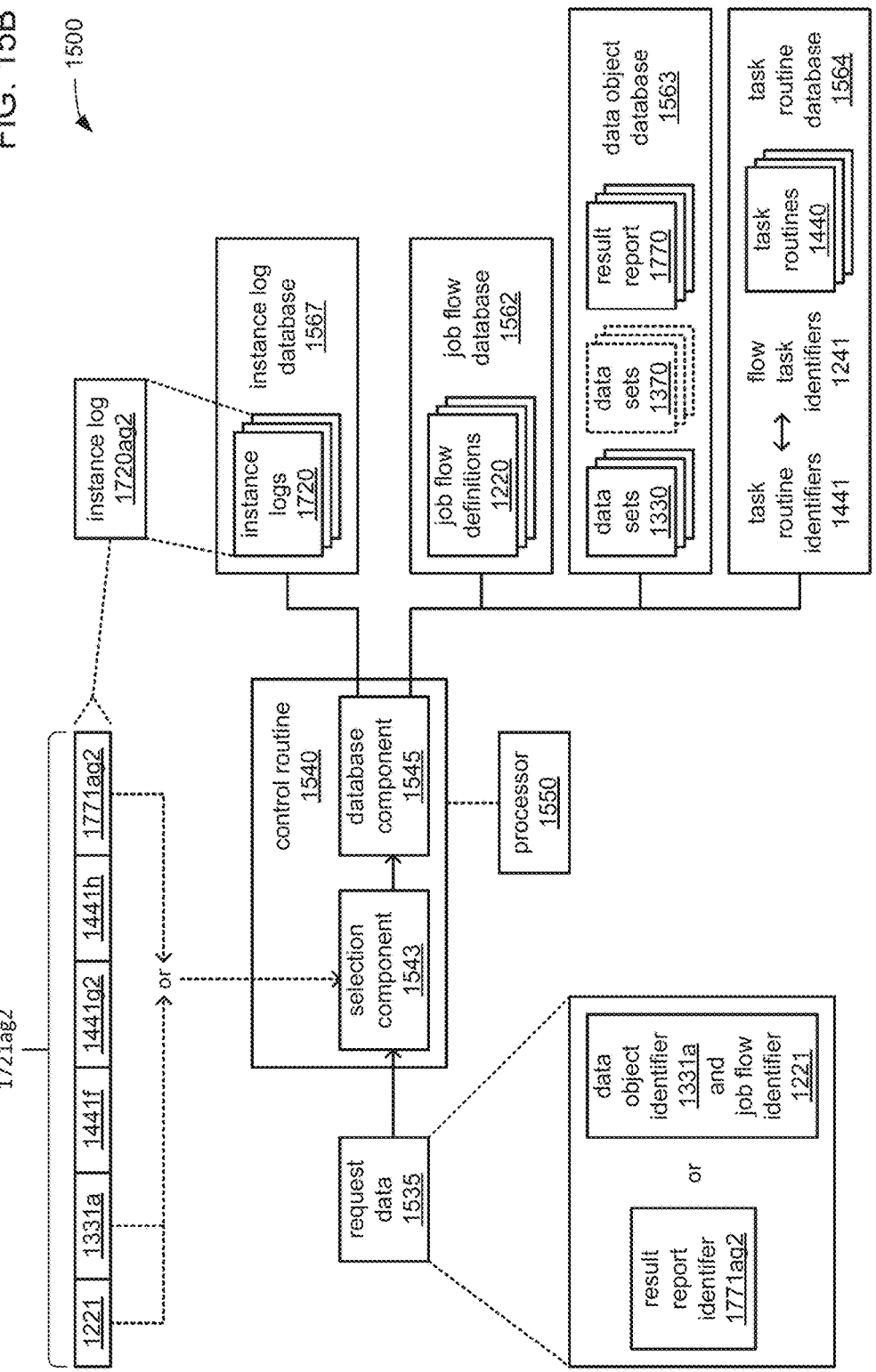

FIGS. 15A and 15B, together, illustrate the manner in which at least one of the federated devices 1500 selectively locates and retrieves objects from the federated area 1566 for transmission to another device and/or for use in directly performing a job flow. FIG. 15A illustrates aspects of selective retrieval of objects from the federated area 1566 in response to requests received from one or more of the reviewing devices 1800, and FIG. 15B illustrates aspects of the use of identifiers assigned to objects to locate objects within the federated area 1566 and/or identify object associations.

Turning to FIG. 15A, one of the reviewing devices 1800 may be operated to transmit a request to one of the federated devices 1500 to retrieve one or more objects associated with a job flow within the federated area 1566. Alternatively the request may be to use one or more objects associated with a job flow to perform the job flow to provide results of an analysis for viewing or other uses at the reviewing device 1800, or to repeat a previous performance of a job flow for purposes of reviewing aspects of that previous performance. In some embodiments, the processor 1550 may be caused to queue such requests as request data 1535 to enable out-of-order handling of requests, and/or other approaches to increase the efficiency with which requests are responded to. As previously discussed in connection with FIG. 14A, the processor 1550 of the federated device 1500 that receives the request may be caused by its execution of the portal component 1549 to restrict access to the federated area 1566 for any of these requests to only authorized persons, entities and/or devices, and may restrict the types of requests that may be granted to only those for which each person, entity and/or device is authorized. Also, as depicted, the control routine 1540 may also include a selection component 1543 to employ one or more identifiers provided in a request and/or one or more rules to locate, select and retrieve objects associated with a job flow from the federated area 1566. The control routine 1540 may further include a performance component 1544 to perform a job flow or to repeat a previous performance of a job flow based on objects that the processor 1550 is caused to retrieve from the federated area 1566 by the selection component 1543.

Again, in executing the portal component 1549, the processor 1550 may be caused to operate the network interface 1590 to provide a portal accessible by other devices via the network 1999, and thereby enable the receipt by the processor 1550 of requests for access to the federated area 1566. Also again, the processor 1550 may be caused to refer to indications in the portal data 1539 of which persons, entities and/or devices are to be granted various forms of requested access, and/or what security credentials are required.

It should be noted that the granting of access to the federated area 1566 to retrieve one or more objects for transmission to a reviewing device 1800, and/or to transmit to a reviewing device 1800 one or more objects generated during a performance of a job flow by the one or more federated devices 1500, may lead to a parallel transfer of portions of one or more objects via the network 1999 from and/or to a grid of devices. This may be deemed desirable for the transfer of larger objects, such as result reports 1770 that include data set(s) that may be quite large in size. More precisely, in embodiments in which the reviewing device 1800 that transmitted a request that includes being provided with one or more objects, the granting of the request may result in multiple ones of viewing devices 1800 receiving one or more objects as multiple portions in at least partially parallel transfers. Correspondingly, in embodiments in which the federated device 1500 that received the request is operated as part of a federated device grid 1005, multiple ones of the federated devices 1500 may transmit one or more objects as portions and at least partially in parallel.

In executing the selection component 1543, the processor may be caused to use one or more identifiers of objects that may be provided in a granted request to directly retrieve those one or more objects from the federated area 1566. By way of example, a request may be received for the retrieval and transmission to the requesting device of a particular data set 1330, and the request may include the data object identifier 1331 of the particular data set 1330. In response to the request, the processor 1550 may be caused by the selection component 1543 to employ the provided data object identifier 1331 to retrieve the particular data set 1330 from the federated area 1566 and transmit it to the requesting device 1800.

However, other requests may be for the retrieval of objects from the federated area 1566 where the identifiers of the requested objects may not be provided within the requests. Instead, such requests may employ other identifiers that provide an indirect reference to the requested objects.

In one example use of an indirect reference to objects, a request may be received for the retrieval and transmission to a reviewing device 1800 of a task routine that performs a particular task, and the request may include the flow task identifier 1241 of the particular task instead of any task routine identifier 1441 for any particular task routine 1440. The processor 1550 may be caused by the selection component 1543 to employ the flow task identifier 1241 provided in the request to search within the federated area 1566 for such task routines 1440. In embodiments in which the task routines 1440 have been organized into a task routine database 1564 as depicted as an example in FIG. 14E (or other searchable data structure), the search may be within such a database or other data structure. The result of such a search may be an indication from such a database or other data structure that there is more than one task routine 1440 that is able to perform the task identified by the flow task identifier 1241 provided in the request. As previously discussed, such an indication may be in the form of a list of the task routine identifiers 1441 for the task routines 1440 that are able to perform the specified task. Additionally, and as also previously discussed, such a list may be ordered to provide an indication of which of those task routines 1440 is the newest. Again, it may be deemed desirable to favor the use of the newest version of a task routine 1440 that performs a particular task where there is more than one task routine 1440 stored within the federated area 1566 that is able to do so. Thus, the processor 1550 may be caused by the selection component 1543 to impose a requirement that, unless there is to be a repetition of a previous performance in which particular task routines 1440 were used, newest versions of task routines 1440 to perform each task are to be selected by default. Therefore, in response to the request, the processor 1550 may be caused to select the newest task routine 1440 indicated in the list to perform the task specified in the request by the flow task identifier 1241, and to transmit that newest version to the requesting device. Through such automatic selection and retrieval of the newest versions of task routines 1440, individuals and/or entities that may be developing new analyses may be encouraged to use the newest versions.

In another example use of an indirect reference to objects, a request may be received by the one or more federated devices 1500 to repeat a previous performance of a specified job flow with one or more specified data objects as inputs (e.g., one or more of the data sets 1330), or to provide the requesting device with the objects needed to repeat the previous performance of the job flow, itself. Thus, the request may include the job flow identifier 1221 of the job flow definition 1220 for the job flow, and may include one or more data object identifiers 1331 of the one or more data sets 1330 to be employed as inputs to the previous performance of that job flow sought to be repeated, but may not include identifiers for any other object associated with that previous performance.

The processor 1550 may be caused by the selection component 1543 to employ the job flow identifier 1221 and the one or more data objects identifiers 1331 to search the federated area 1566 for all instance logs 1720 that provide an indication of a past performance of the specified job flow with the specified one or more input data objects. In embodiments in which the instance logs 1720 have been organized into an instance log database 1567 as depicted as an example in FIG. 14E (or other searchable data structure), the search may be within such a database or other data structure, and may be limited to the instance log identifiers 1721. More specifically, in embodiments in which the instance log identifiers 1721 were each generated by concatenating the identifiers of objects associated with a corresponding previous performance, the instance log identifiers 1721, themselves, may be analyzed to determine whether the identifiers of particular objects are included within any of the instance log identifiers 1721. Thus, the processor 1550 may be caused to search each instance log identifier 1721 to determine whether there are any instance log identifiers 1721 that include the job flow identifier 1221 and all of the data object identifiers 1331 provided in the request. If such an instance log identifier 1721 is found, then it is an indication that the instance log 1720 that was assigned that instance log identifier 1721 is associated with a previous performance of that job flow associated with the one or more data sets 1330 specified in the request.

It should be noted, however, that a situation may arise in which more than one of such instance log identifiers 1721 may be found, indicating that there has been more than one past performance of the job flow with the one or more data sets. In response to such a situation, the processor 1550 may be caused to transmit an indication of the multiple previous performances to the requesting device along with a request for a selection to be made from among those previous performances. The processor 1550 may then await a response from the requesting device that provides an indication of a selection from among the multiple previous performances. As an alternative to such an exchange with the requesting device, or in response to a predetermined period of time having elapsed since requesting a selection without an indication of a selection having been received, the processor 1550 may be caused by the selection component 1543 to itself select the most recent one of the previous performances.

After the finding of a single previous performance, or after the selection of one of multiple previous performances, the processor 1550 may then be caused by the selection component 1543 to retrieve the task routine identifiers 1441 specified within the corresponding instance log 1720 of the particular task routines 1440 used in the previous performance. The processor 1550 may then employ those task routine identifiers 1441 to retrieve the particular task routines 1440 associated with the previous performance from the federated area 1566. The processor 1550 may also be caused to retrieve the result report identifier 1771 specified within the instance log 1720 of the result report that was generated in the previous performance. The processor 1550 may be further caused to retrieve any data object identifiers 1331 that may be present within the instance log 1720 that specify one or more data sets 1370 that may have been generated as a mechanism to exchange data between task routines 1440 during the performance of a job flow.

If the request was for the provision of objects to the requesting device, then the processor 1550 may be caused by the selection component 1543 to transmit, to the requesting device, the job flow definition 1220 and the one or more data sets 1330 specified by the job flow identifier 1221 and the one or more data object identifiers 1331, respectively, in the request. The processor 1550 may also be caused to transmit the instance log 1720 generated in the previous performance, and the result report 1770 specified by the result report identifier 1771 retrieved from the instance log 1720. If any data sets 1370 were indicated in the instance log 1720 as having been generated in the previous performance, then the processor 1550 may be further caused to transmit such data sets 1370 to the requesting device. Thus, based on a request that provided only identifiers for a job flow definition 1220 and one or more data objects used as inputs to a previous performance of the job flow, a full set of objects may be automatically selected and transmitted to the requesting device to enable an independent performance of the job flow as part of a review of that previous performance.

However, if the request was for a repeat of the previous performance of the job flow by the one or more federated devices 1500, then instead of (or in addition to) transmitting the objects needed to repeat the previous performance to the requesting device, the processor 1550 may be caused by execution of the performance component 1544 to use those objects to repeat the previous performance within the federated area 1566. More specifically, the processor 1550 may be caused to execute the task routines 1440 specified in the instance log 1720, in the order specified in the job flow definition 1220 specified in the request, and using the one or more data sets 1330 specified in the request as input data objects. In some embodiments, where multiple ones of the federated devices 1500 are operated together as the federated device grid 1005, the processor 1550 may be caused by the performance component 1544 to cooperate with the processors 1550 of others of the federated devices 1500 to divide the execution of one or more of the tasks thereamong. Such a division of one or more of the tasks may be deemed desirable where one or more of the data objects associated with the job flow is of relatively large size. Regardless of the quantity of the federated devices 1500 involved in repeating the previous performance of the job flow, upon completion of the repeat performance, the processor 1550 may be further caused by the performance component to transmit the newly regenerated result report 1770 to the requesting device. Alternatively or additionally, the processor 1550 may perform a comparison between the newly regenerated result report 1770 and the result report 1770 previously generated in the previous performance to determine if there are any differences, and may transmit an indication of the results of that comparison to the requesting device. Thus, based on a request that provided only identifiers for a job flow definition 1220 and one or more data objects used as inputs to the job flow, a previous performance of a job flow may be repeated and the results thereof transmitted to the requesting device as part of a review of the previous performance.

In still another example use of an indirect reference to objects, a request may be received by the one or more federated devices 1500 to perform a specified job flow with one or more specified data objects as inputs (e.g., one or more of the data sets 1330). Thus, the request may include the job flow identifier 1221 of the job flow definition 1220 for the job flow, and may include one or more data object identifiers 1331 of the one or more data sets 1330 to be employed as input data objects, but may not include any identifiers for any other objects needed for the performance.

The processor 1550 may be caused by the selection component 1543 to employ the job flow identifier 1221 provided in the request to retrieve the job flow definition 1220 for the job flow to be performed. The processor 1550 may then be caused retrieve the flow task identifiers 1241 from the job flow definition 1220 that specify the tasks to be performed, and may employ the flow task identifiers 1241 to retrieve the newest version of task routine 1440 within the federated area 1566 (e.g., within the task routine database 1564) for each task. The processor 1550 may also be caused by the selection component 1543 to employ the job flow identifier 1221 and the one or more data objects identifiers 1331 to search the federated area 1566 for any instance logs 1720 that provide an indication of a past performance of the specified job flow with the specified one or more input data objects.

If no such instance log identifier 1721 is found, then it is an indication that there is no record within the federated area of any previous performance of the specified job flow with the one or more specified data sets 1330. In response, the processor 1550 may be caused by execution of the performance component 1544 to execute the retrieved newest version of each task routines 1440 to perform the tasks of the job flow in the order specified in the job flow definition 1220 specified in the request, and using the one or more data sets 1330 specified in the request as input data objects. Again, in embodiments in which multiple ones of the federated devices 1500 are operated together as the federated device grid 1005, the processor 1550 may be caused by the performance component 1544 to cooperate with the processors 1550 of others of the federated devices 1500 to divide the execution of one or more of the tasks thereamong. Upon completion of the performance of the job flow, the processor 1550 may be further caused by the performance component to transmit the result report 1770 generated in the performance of the job flow to the requesting device. Thus, based on a request that provided only identifiers for a job flow definition 1220 and one or more data objects used as inputs to the job flow, a performance of a job flow is caused to occur using the newest available versions of task routines 1440 to perform each task.

However, if such an instance log identifier 1721 is found, then it is an indication that there was a previous performance of the job flow specified in the request where the one or more data sets 1330 specified in the request were used as input data objects. If a situation should occur where multiple ones of such instance log identifiers 1721 are found, then it is an indication that there have been multiple previous performances of the job flow, and the processor 1550 may be caused by the selection component 1543 to select the most recent one of the multiple previous performances. After the finding of a single previous performance, or after the selection of the most recent one of multiple previous performances, the processor 1550 may then be caused by the selection component 1543 to retrieve the task routine identifiers 1441 specified within the corresponding instance log 1720 of the particular task routines 1440 used in the previous performance. The processor 1550 may then employ those task routine identifiers 1441 to retrieve the particular task routines 1440 associated with the previous performance from the federated area 1566. The processor 1550 may then compare each of the task routines 1440 specified in the instance log 1720 to the newest task routines 1440 retrieved for each task specified in the job flow definition 1220 to determine whether all of the task routines 1440 specified in the instance log 1720 are the newest versions thereof. If so, then the result report 1770 generated in the previous performance associated with the instance log 1720 was generated using the most recent versions of each of the task routines 1440 needed to perform the tasks of the job flow. The processor 1550 may then entirely forego performing the job flow, may employ the result report identifier 1771 provided in the instance log 1720 to retrieve the result report 1770 generated in the earlier performance, and may transmit that result report 1770 to the requesting device. In this way, a form of caching is provided by which the previously generated result report 1770 is able to be recognized as reusable, and the use of processing resources of the one or more federated devices 1500 to repeat a previous performance of the job flow is avoided.

It should be noted, however, that a situation may arise in which one or more of the task routines 1440 specified in the instance log 1720 are the newest versions thereof, while one or more others of the task routines 1440 specified in the instance log 1720 are not. In response to such a situation, the processor 1550 may be caused by the selection routine 1543 to check whether at least the task routine 1440 specified in the instance log 1720 as performing the first task in the order of tasks specified in the job flow definition 1220 is the newest version of task routine 1440 able to perform that task. If not, then the processor 1550 may be caused by the performance component 1544 to employ all of the newest versions of the task routines 1440 to perform the entire job flow, just as the processor 1550 would be caused to do so if there had been no previous performance of the job flow, at all. However, if the first task in the previous performance of the job flow was performed with the newest version of task routine 1440 able to perform that first task, then the processor 1550 may iterate through each task in the order of tasks specified in job flow definition 1720 to determine which were performed with the newest version of task routine 1440. The processor 1550 would start with the first task in the specified order of tasks, and stop wherever in the specified order of tasks the processor 1550 determines that a task routine 1440 was used that is not the newest version thereof. In this way, the processor 1550 may identify an initial portion of the order of tasks specified in the job flow definition 1220 that may not need to be performed again as they were already performed using the newest versions of their respective task routines 1440. As a result, only the remainder of the tasks that follow the initial portion in the order of tasks may need to be performed again, but using the newest versions of their respective task routines 1440 for all of those remaining tasks. In this way, a form of partial caching is provided by which an initial portion of a previous performance of a job flow is able to be reused such that not all of the job flow needs to be performed again to generate a result report 1770 to be transmitted to the requesting device.

FIG. 15B illustrates two examples of searching for objects using one or more identifiers that provide an indirect reference to those objects in greater detail. More specifically, FIG. 15B depicts two different searches for objects that each employ the example instance log identifier 1721*ag2* associated with the 1720*ag2* instance log of FIGS. 13A-C.

In one example search, and referring to both FIGS. 15A and 15B, a request may be received (and stored as request data 1535) for the retrieval of objects associated with, and/or for a repetition of, the example performance 1700*ag2* that resulted in the generation of the result report 1770*ag2*. In so doing, the request may use the result report identifier 1771*ag2* to refer to the result report 1770*ag2*, while providing no other identifier for any other object associated with the performance 1700*ag2*. In response, the processor 1550 may be caused by the selection component 1543 to cooperate with the database component 1545 to search the instance log identifiers 1721 of the instance log database 1567 to locate the one of the multiple instance log identifiers 1721 that includes the result report identifier 1771*ag2*. As depicted, the instance log identifier 1721*ag2* is the one of the multiple instance log identifiers 1721 that contains the result report identifier 1771*ag2*. With the instance log identifier 1721*ag2* having been found, the processor 1550 may then be caused by the selection component 1543 to retrieve, from the instance log 1720*ag2*, the identifiers of the various objects requested to be transmitted to the requesting device and/or needed to repeat the example performance 1700*ag2*.

In another example search, a request may be received for a repetition of a previous performance of a specific job flow with a specific data object used as input. In so doing, the request may refer to the job flow by using the job flow identifier 1221 of the example job flow definition 1220 and may refer to the data object by using the data object identifier 1331*a* of the data set 1330*a* of the example job flow 1200 of FIGS. 13A-C. In response, the processor 1550 may be caused by the selection component 1543 to cooperate with the database component 1545 to search the instance log identifiers 1721 of the instance log database 1567 to locate any of the multiple instance log identifiers 1721 that includes the both the job flow identifier 1221 and the data object identifier 1331*a*. As depicted, the instance log identifier 1721*ag2* is the one of the multiple instance log identifiers 1721 that contains both of these identifiers. With the instance log identifier 1721*ag2* having been found, the processor 1550 may then be caused by the selection component 1543 to retrieve, from the instance log 1720*ag2*, the identifiers of the various objects needed to repeat the example performance 1700*ag2*. The processor 1550 may then be caused by execution of the performance component 1544 to perform the example job flow 1200 with the data set 1330*a* of FIGS. 13A-C as the input data object.

Figure 16B:
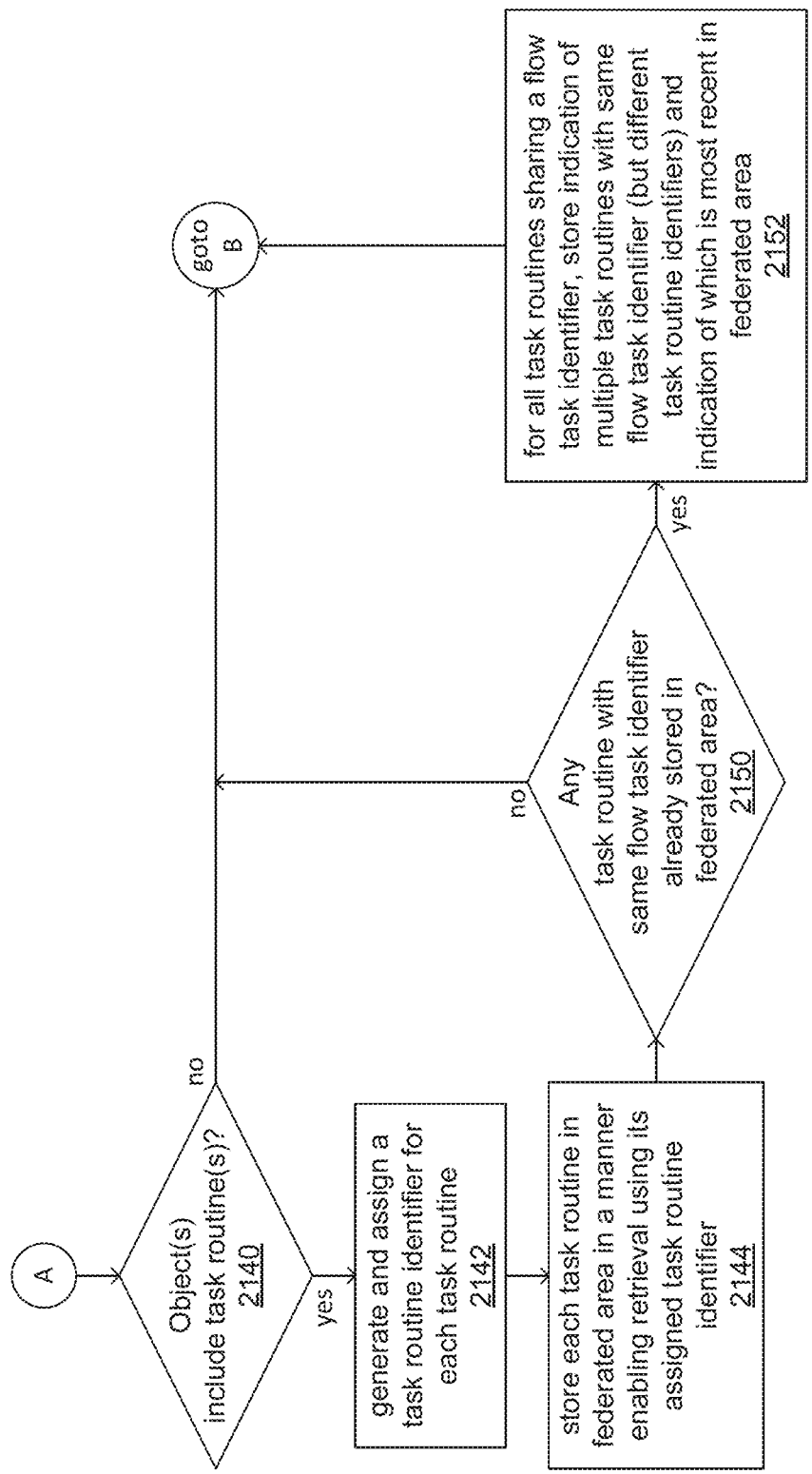
Figure 16C:
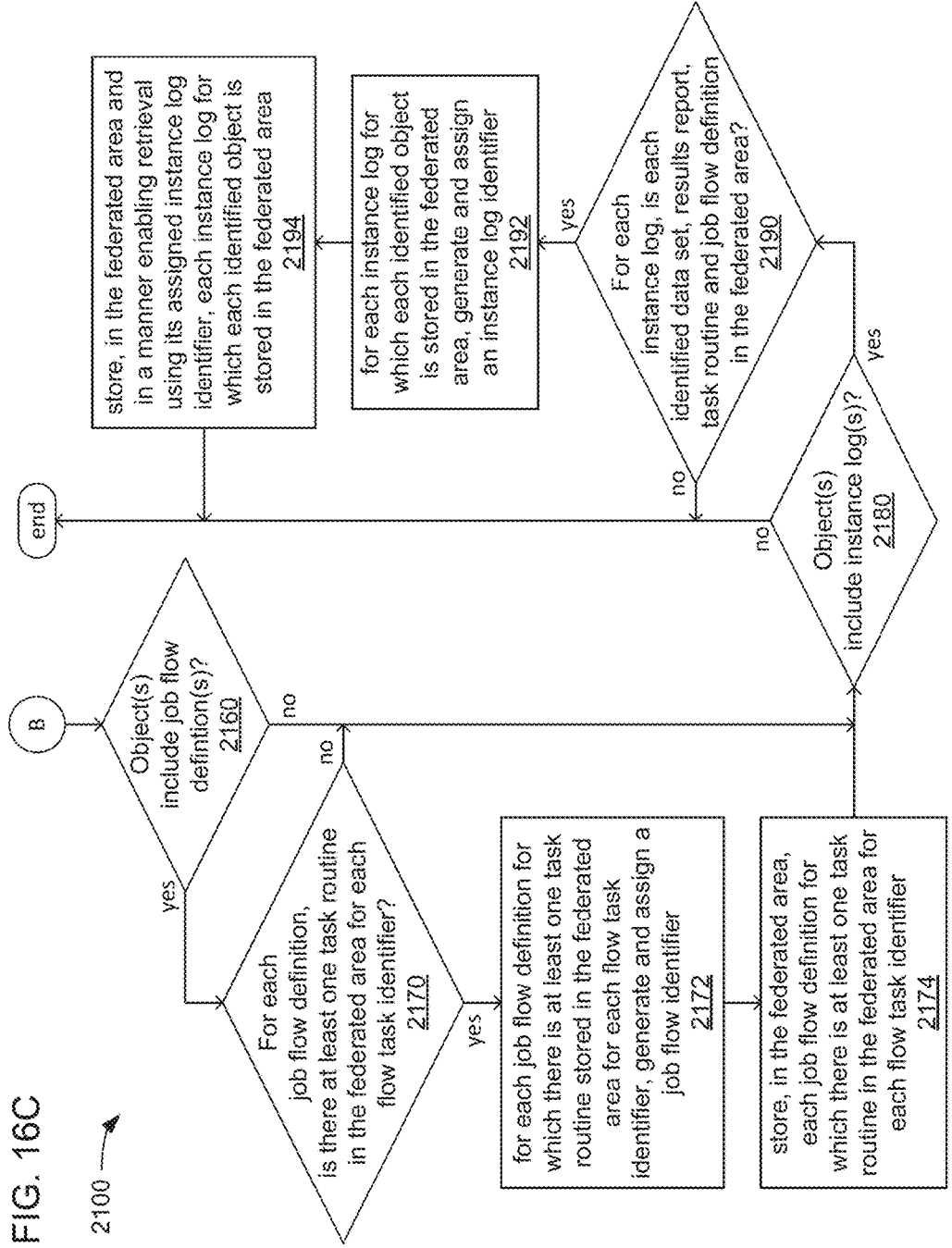

FIGS. 16A, 16B and 16C, together, illustrate an example embodiment of a logic flow 2100. The logic flow 2100 may be representative of some or all of the operations executed by one or more embodiments described herein. More specifically, the logic flow 2100 may illustrate operations performed by the processor 1550 in executing the control routine 1540, and/or performed by other component(s) of at least one of the federated devices 1500.

At 2110, a processor of a federated device of a distributed processing system (e.g., the processor 1550 of one of the federated devices 1500 of the distributed processing system 1000) may receive a request from a source device, via a network (e.g., one of the source devices 1100 via the network 1999) and through a portal provided by the processor for access to other devices via the network, to store one or more objects (e.g., one or more of the objects 1220, 1330, 1370, 1440, 1720 and/or 1770) within a federated area (e.g., the federated area 1566). As has been discussed, such a portal may employ any of a variety of protocols and/or handshake mechanisms to enable the receipt of requests for various forms of access to the federated area by other devices, as well as to exchange objects with other devices, via the network.

At 2112, in embodiments in which the federated device(s) that provide the federated area also control access to the federated area, the processor may perform a check of whether the request is from an authorized source device and/or from an authorized person or entity (e.g., scholastic, governmental or business entity) operating the source device. As has been discussed, the processor may require the receipt of one or more security credentials from devices from which requests for access to the federated area are received. If, at 2112, the processor determines that the request is not from an authorized source device and/or not from a person and/or entity authorized to be granted the access requested to store objects within the federated area, then the processor may transmit an indication of denial of the request to the source device via the network at 2114.

However, if at 2112, the processor determines that the request to store one or more objects within the federated area is authorized, then at 2120, the processor may check whether the one or more objects includes one or more data sets (e.g., one or more of the data sets 1330 or 1370). If so, then the processor may generate and assign a data object identifier for each data set that is to be stored (e.g., one or more of the data object identifiers 1331) at 2122. At 2124, the processor may store each of the one or more data sets within the federated area.

At 2130, the processor may check whether the one or more objects includes one or more result reports (e.g., one or more of the result reports 1770). If so, then the processor may generate and assign a result report identifier for each result report that is to be stored (e.g., one or more of the result report identifiers 1771) at 2132. At 2134, the processor may store each of the one or more result reports within the federated area.

At 2140, the processor may check whether the one or more objects includes one or more task routines (e.g., one or more of the task routines 1440). If so, then the processor may generate and assign a task routine identifier for each task routine that is to be stored (e.g., one or more of the task routine identifiers 1441) at 2142. At 2144, the processor may store each of the one or more task routines within the federated area. At 2150, the processor may additionally check whether any of the task routines stored at 2144 have the same flow task identifier as another task routine that was already stored within the federated area, such that there is more than one task routine executable to perform the same task. If so, then at 2152 for each newly stored task routine that shares a flow task identifier with at least one other task routine already stored in the federated area, the processor may store an indication of there being multiple task routines with the same flow task identifier, along with an indication of which is the most recent of the task routines for that flow task identifier.

As has been discussed, in embodiments in which task routines are stored in a manner organized into a database or other data structure (e.g., the task routine database 1564) by which flow task identifiers may be employed as a mechanism to locate task routines, the storage of an indication of there being more than one task routine sharing the same flow task identifier may entail associating more than one task routine with the same flow task identifier so that a subsequent search for task routines using that flow task identifier will beget a result indicating that there is more than one. As has also been discussed, the manner in which one of multiple task routines sharing the same flow task identifier may be indicated as being the most current version may entail ordering the manner in which those task routines are listed within the database (or other data structure) to cause the most current one to be listed at a particular position within that order (e.g., listed first).

At 2160, the processor may check whether the one or more objects includes one or more job flow definitions (e.g., one or more of the job flow definitions 1220). If so, then at 2170, the processor may additionally check, for each job flow definition, whether there is at least one task routine stored within the federated area for each task specified by a flow task identifier within the job flow definition. If, at 2170, there are any job flow definitions requested to be stored for which there is at least one task routine stored in the federated area for each task, then for each of those job flow definitions where there is at least one stored task routine for each task, the processor may generate and assign a job flow identifier (e.g., one or more of the job flow identifiers 1221) at 2172. At 2174, the processor may store each of the one or more job flow definitions for which there was at least one task routine for each task.

At 2180, the processor may check whether the one or more objects includes one or more instance logs (e.g., one or more of the instance logs 1720). If so, then at 2190, the processor may additionally check, for each instance log, whether each object identified in the instance log by its identifier is stored within the federated area. If, at 2190, there are any instance logs requested to be stored for which each specified object is stored within the federated area, then for each instance log where each object specified therein is stored within the federated area, the processor may generate and assign an instance log identifier (e.g., one or more of the instance log identifiers 1721) at 2192. At 2194, the processor may store each of the one or more instance logs for which each specified object is stored within the federated area.

Figure 17A:
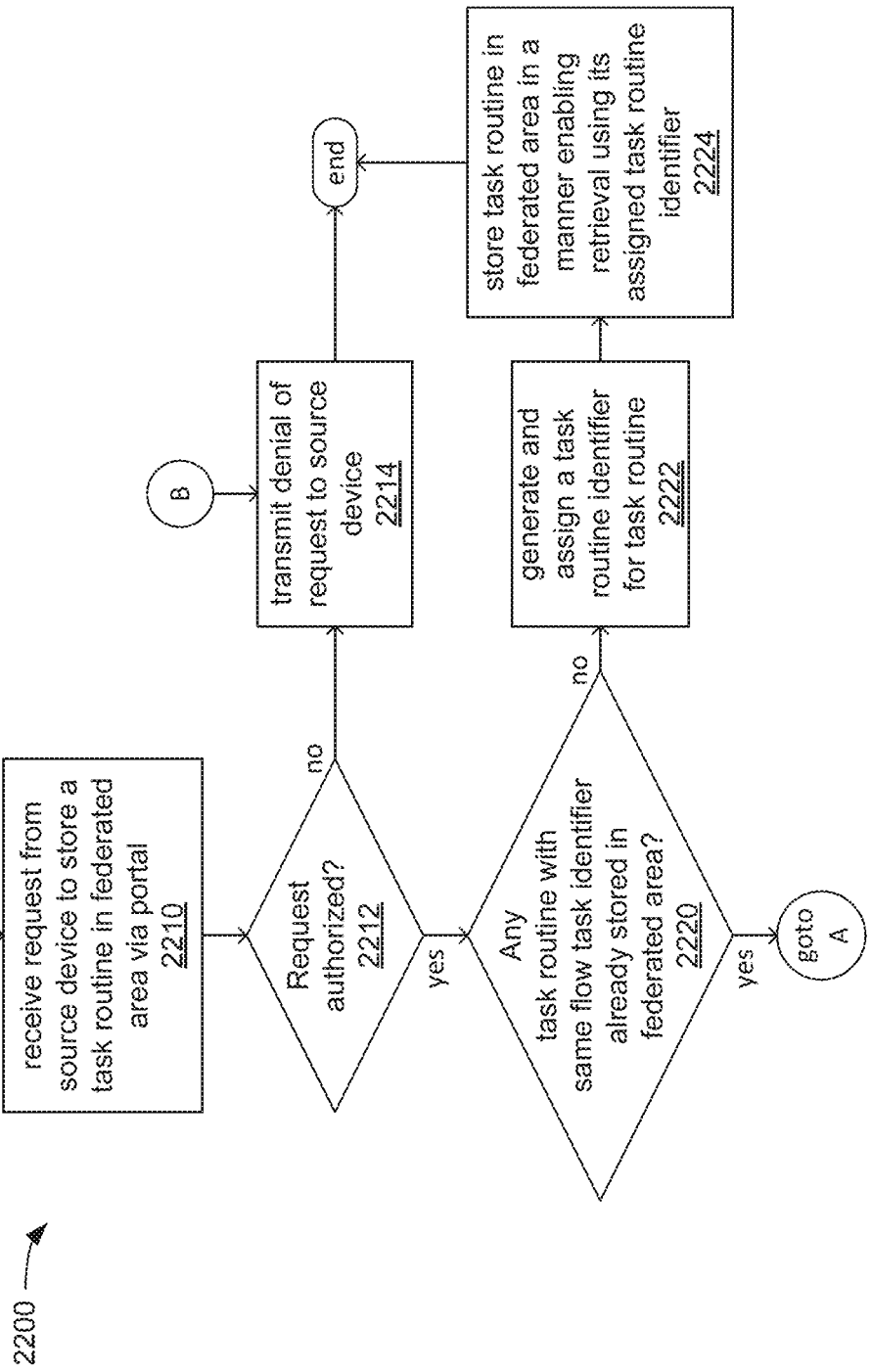
FIGS. 17A and 17B, together, illustrate another example embodiment of a logic flow of a federated device storing objects in a federated area
Figure 17B:
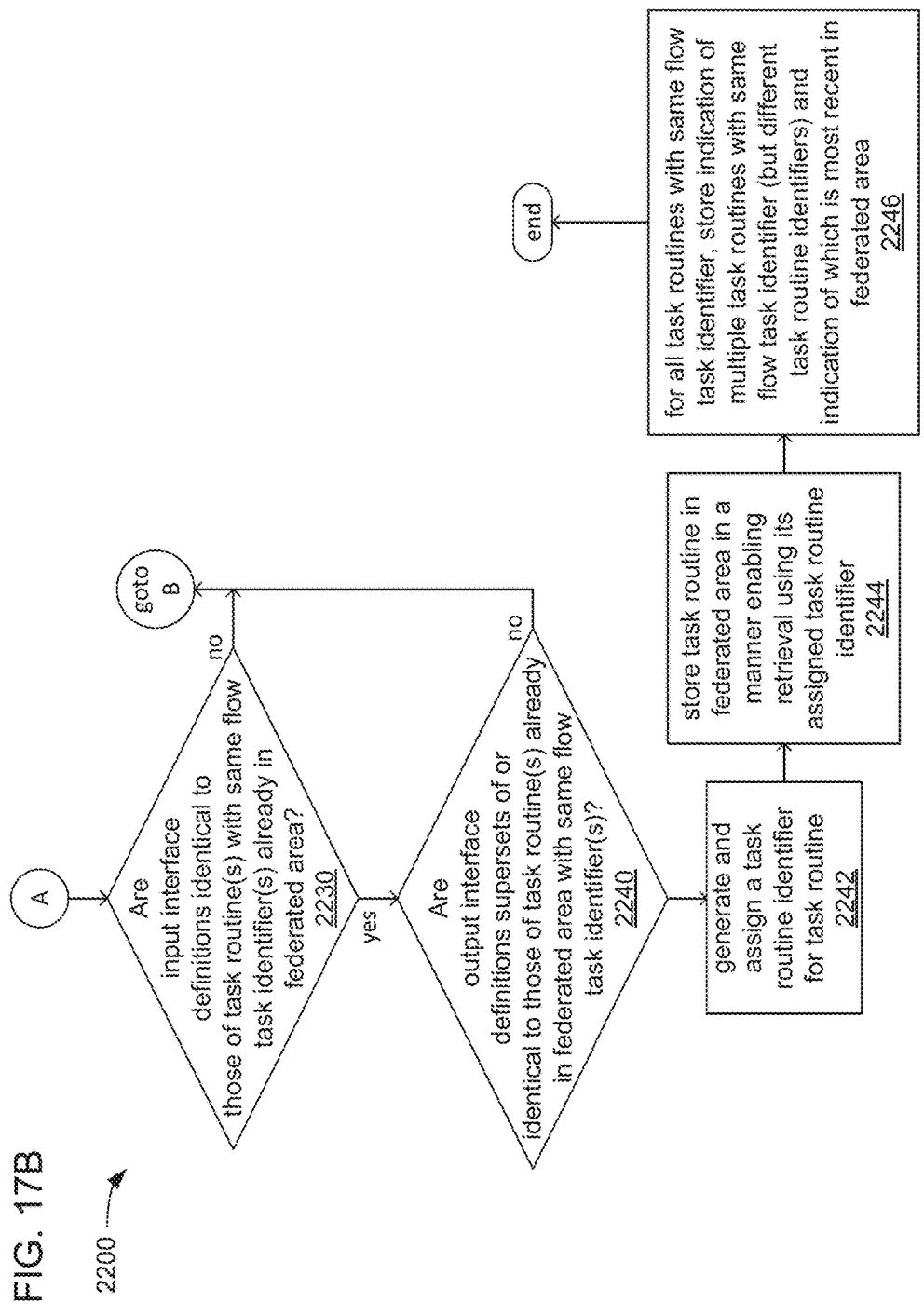

FIGS. 17A and 17B, together, illustrate an example embodiment of a logic flow 2200. The logic flow 2200 may be representative of some or all of the operations executed by one or more embodiments described herein. More specifically, the logic flow 2200 may illustrate operations performed by the processor 1550 in executing the control routine 1540, and/or performed by other component(s) of at least one of the federated devices 1500.

At 2210, a processor of a federated device of a distributed processing system (e.g., the processor 1550 of one of the federated devices 1500 of the distributed processing system 1000) may receive a request from a source device, via a network (e.g., one of the source devices 1100 via the network 1999) and through a portal provided by the processor for access to other devices via the network, to store a task routine (e.g., one of the task routines 1440) within a federated area (e.g., the federated area 1566). Again, such a portal may be generated by the processor to employ any of a variety of protocols and/or handshake mechanisms to enable the receipt of requests for various forms of access to the federated area by other devices, as well as to exchange objects with other devices, via the network.

At 2212, in embodiments in which the federated device(s) that provide the federated area also control access to the federated area, the processor may perform a check of whether the request is from an authorized source device and/or from an authorized person or entity operating the source device. Again, the processor may require the receipt of one or more security credentials from devices from which requests for access to the federated area are received. If, at 2212, the processor determines that the request is not from an authorized source device and/or not from a person and/or entity authorized to be granted the access requested to store a task routine within the federated area, then the processor may transmit an indication of denial of the request to the source device via the network at 2214.

However, if at 2212, the processor determines that the request to store a task routine within the federated area is authorized, then at 2220, the processor may check whether the task routine has the same flow task identifier as any of the task routines already stored within the federated area, such that there is already stored one or more other task routines executable to perform the same task. If not at 2220, then the processor may generate and assign a task routine identifier for the task routine (e.g., one of the task routine identifiers 1441) at 2222. At 2144, the processor may store the task routines within the federated area in a manner that enables later retrieval of the task routine by either its identifier or by the flow task identifier of the task that it performs.

However, if at 2220, there is at least one other task routine with the same flow task identifier already stored within the federated area, then the processor may check at 2230 whether the input interfaces (e.g., data interfaces 1443 that receive data from data objects, and/or task interfaces 1444 that receive parameters from another task routine) that are implemented in the task routine in a manner that is identical to those of the one or more task routines with the same flow task identifier that are already stored within the federated area. Alternatively, and as previously discussed, such a comparison may be made between the implementation of the input interfaces of the task routine and the specifications for the input interfaces within one or more job flow definitions that include the task performed by the task routine. If, at 2230, the input interfaces are not identical, then the processor may transmit a denial of the request to the source device via the network at 2214.

However, if at 2230, the input interfaces are identical, then the processor may check at 2240 whether the output interfaces (e.g., data interfaces 1443 that output a data object, and/or task interfaces 1444 that output parameters to another task routine) that are implemented in the task routine in a manner that is either identical to or a superset of those of the one or more task routines with the same flow task identifier that are already stored within the federated area. Alternatively, and as previously discussed, such a comparison may be made between the implementation of the output interfaces of the task routine and the specifications for the output interfaces within one or more job flow definitions that include the task performed by the task routine. If, at 2240, each of the output interfaces of the task routine are neither identical nor a superset, then the processor may transmit a denial of the request to the source device via the network at 2214.

However, if at 2240, each of the output interfaces of the task routine is identical to or a superset of the corresponding output interface within other task routine(s) and/or job flow definitions already stored within the federated area, then the processor may generate and assign a task routine identifier for the task routine at 2242. At 2244, the processor may store the task routine within the federated area in a manner that enables later retrieval of the task routine by either its identifier or by the flow task identifier of the task that it performs. At 2246, the processor may also store an indication of there being multiple task routines with the same flow task identifier, along with an indication of which is the most recent of the task routines for that flow task identifier.

FIG. 18 illustrates an example embodiment of a logic flow 2300. The logic flow 2300 may be representative of some or all of the operations executed by one or more embodiments described herein. More specifically, the logic flow 2300 may illustrate operations performed by the processor 1550 in executing the control routine 1540, and/or performed by other component(s) of at least one of the federated devices 1500.

At 2310, a processor of a federated device of a distributed processing system (e.g., the processor 1550 of one of the federated devices 1500 of the distributed processing system 1000) may receive a request from a source device, via a network (e.g., one of the source devices 1100 via the network 1999) and through a portal provided by the processor for access to other devices via the network, to store a job flow definition (e.g., one of the job flow definitions 1220) within a federated area (e.g., the federated area 1566). At 2312, in embodiments in which the federated device(s) that provide the federated area also control access to the federated area, the processor may perform a check of whether the request is from an authorized source device and/or from an authorized person or entity operating the source device. If, at 2312, the processor determines that the request is not from an authorized source device and/or not from a person and/or entity authorized to be granted the access requested to store a task routine within the federated area, then the processor may transmit an indication of denial of the request to the source device via the network at 2314.

However, if at 2312, the processor determines that the request to store a job flow definition within the federated area is authorized, then at 2320, the processor may check whether there is at least one task routine stored within the federated area for each task specified by a flow task identifier within the job flow definition. If, at 2320, there are no task routines stored within the federated area for one or more of the tasks specified by the job flow, then the processor may transmit a denial of the request to the source device via the network at 2314.

However, if at 2320, there is at least one task routine stored in the federated area for each task specified in the job flow, then the processor may check whether the input interfaces (e.g., data interfaces 1443 that receive data from data objects, and/or task interfaces 1444 that receive parameters from another task routine) that are implemented in the task routines stored in the federated area are identical to those specified in the job flow definition at 2330. If, at 2330, the input interfaces are not identical, then the processor may transmit a denial of the request to the source device via the network at 2314.

However, if at 2330, the input interfaces are identical, then the processor may check at 2340 whether the output interfaces (e.g., data interfaces 1443 that output a data object, and/or task interfaces 1444 that output parameters to another task routine) that are implemented in the task routines that are already stored within the federated area are identical to or are supersets of those specified in the job flow definition. If, at 2340, an output interface of one or more of the task routines already stored within the federated area is neither identical nor a superset of a corresponding output interface specified in the job flow definition, then the processor may transmit a denial of the request to the source device via the network at 2314.

However, if at 2340, all of the output interfaces of all of the task routines already stored within the federated area are either identical to or a superset of corresponding output interfaces specified in the job flow definitions, then the processor may generate and assign a job flow identifier for the task routine at 2342. At 2344, the processor may store the job flow within the federated area in a manner that enables later retrieval of the job flow by its identifier.

Figure 19A:
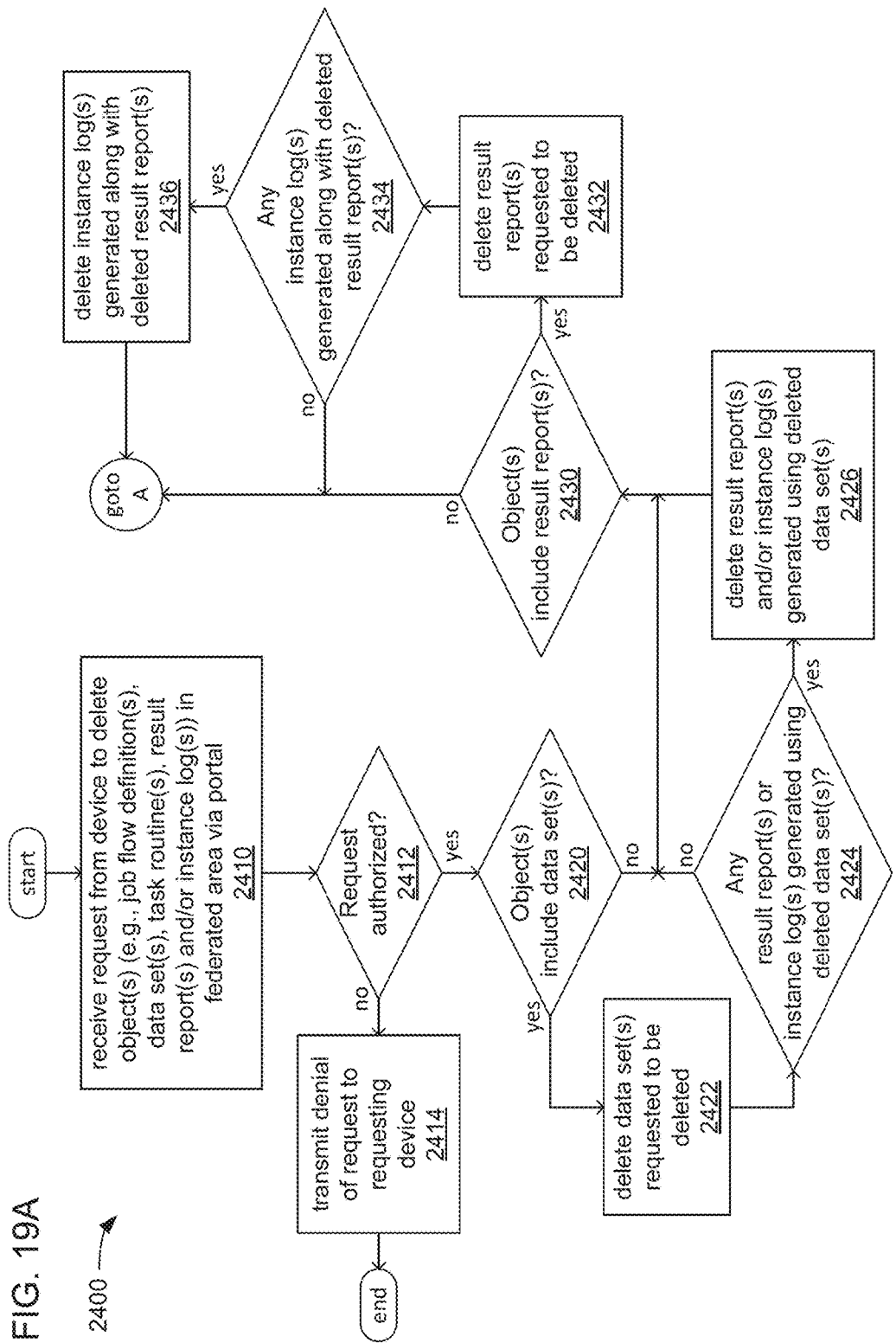
Figure 19B:
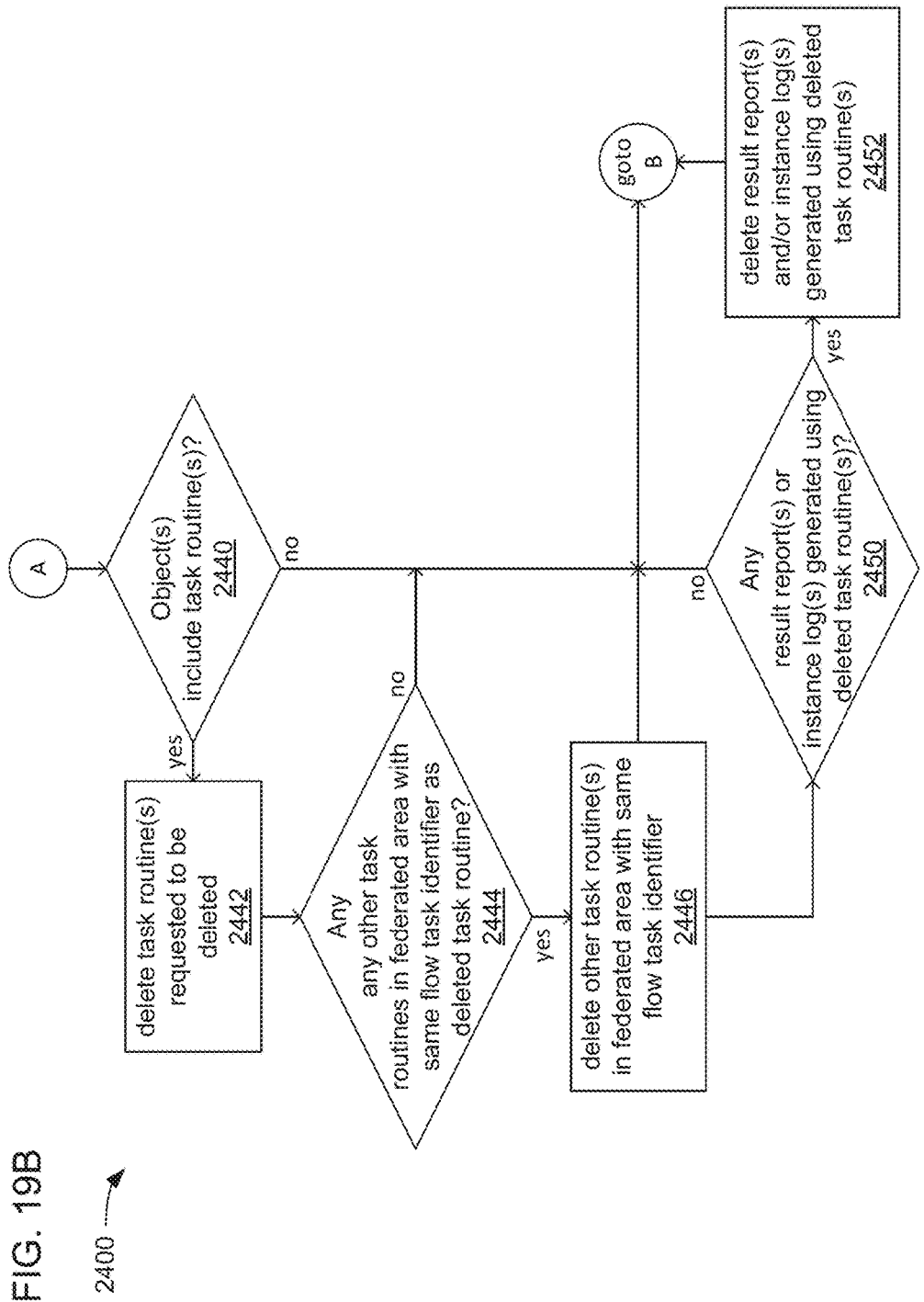

FIGS. 19A, 19B and 19C, together, illustrate an example embodiment of a logic flow 2400. The logic flow 2400 may be representative of some or all of the operations executed by one or more embodiments described herein. More specifically, the logic flow 2400 may illustrate operations performed by the processor 1550 in executing the control routine 1540, and/or performed by other component(s) of at least one of the federated devices 1500.

At 2410, a processor of a federated device of a distributed processing system (e.g., the processor 1550 of one of the federated devices 1500 of the distributed processing system 1000) may receive a request from a source device, via a network (e.g., one of the source devices 1100 via the network 1999) and through a portal provided by the processor, to delete one or more objects (e.g., one or more of the objects 1220, 1330, 1370, 1440, 1720 and/or 1770) within a federated area (e.g., the federated area 1566). At 2412, in embodiments in which the federated device(s) that provide the federated area also control access to the federated area, the processor may perform a check of whether the request is from an authorized source device and/or from an authorized person or entity operating the source device. If, at 2412, the processor determines that the request is not from an authorized source device and/or not from a person and/or entity authorized to be granted the access requested to delete objects within the federated area, then the processor may transmit an indication of denial of the request to the source device via the network at 2414.

However, if at 2412, the processor determines that the request to delete one or more objects within the federated area is authorized, then at 2420, the processor may check whether the one or more objects includes one or more data sets (e.g., one or more of the data sets 1330 or 1370). If so, then the processor may delete the one or more data sets from the federated area at 2422. At 2424, the processor may additionally check whether there are any result reports or instance logs stored in the federated area that were generated in a past performance of a job flow in which any of the one or more deleted data sets were used. If so, then at 2426, the processor may delete such result report(s) and/or instance log(s) from the federated area. As previously discussed, it may be deemed desirable for reasons of maintaining repeatability to avoid a situation in which there is an instance log that specifies one or more objects, such as data sets, as being associated with a performance of a job flow where the one or more objects are not present within the federated area such that the performance of the job flow cannot be repeated.

At 2430, the processor may check whether the one or more objects includes one or more result reports (e.g., one or more of the result reports 1770). If so, then the processor may delete the one or more result reports from the federated area at 2432. At 2434, the processor may additionally check whether there are any instance logs stored in the federated area that were generated in a past performance of a job flow in which any of the one or more deleted result reports were generated. If so, then at 2436, the processor may delete such instance log(s) from the federated area.

At 2440, the processor may check whether the one or more objects includes one or more task routines (e.g., one or more of the task routines 1440). If so, then the processor may delete the one or more task routines from the federated area at 2442. At 2444, the processor may additionally check whether there are any other task routines stored in the federated area that share the same flow task identifier(s) as any of the deleted task routines. If so, then at 2446, the processor may delete such task routine(s) from the federated area. At 2450, the processor may additionally check whether there are any result reports or instance logs stored in the federated area that were generated in a past performance of a job flow in which any of the one or more deleted task routines were used. If so, then at 2452, the processor may delete such result report(s) and/or instance log(s) from the federated area.

At 2460, the processor may check whether the one or more objects includes one or more job flow definitions (e.g., one or more of the job flow definitions 1220). If so, then at 2462, the processor may delete the one or more job flow definitions. At 2464, the processor may additionally check whether there are any result reports or instance logs stored in the federated area that were generated in a past performance of a job flow defined by any of the one or more deleted job flow definitions. If so, then at 2466, the processor may delete such result report(s) and/or instance log(s) from the federated area.

At 2470, the processor may check whether the one or more objects includes one or more instance logs (e.g., one or more of the instance logs 1720). If so, then at 2472, the processor may delete the one or more instance logs from the federated area.

Figure 20:
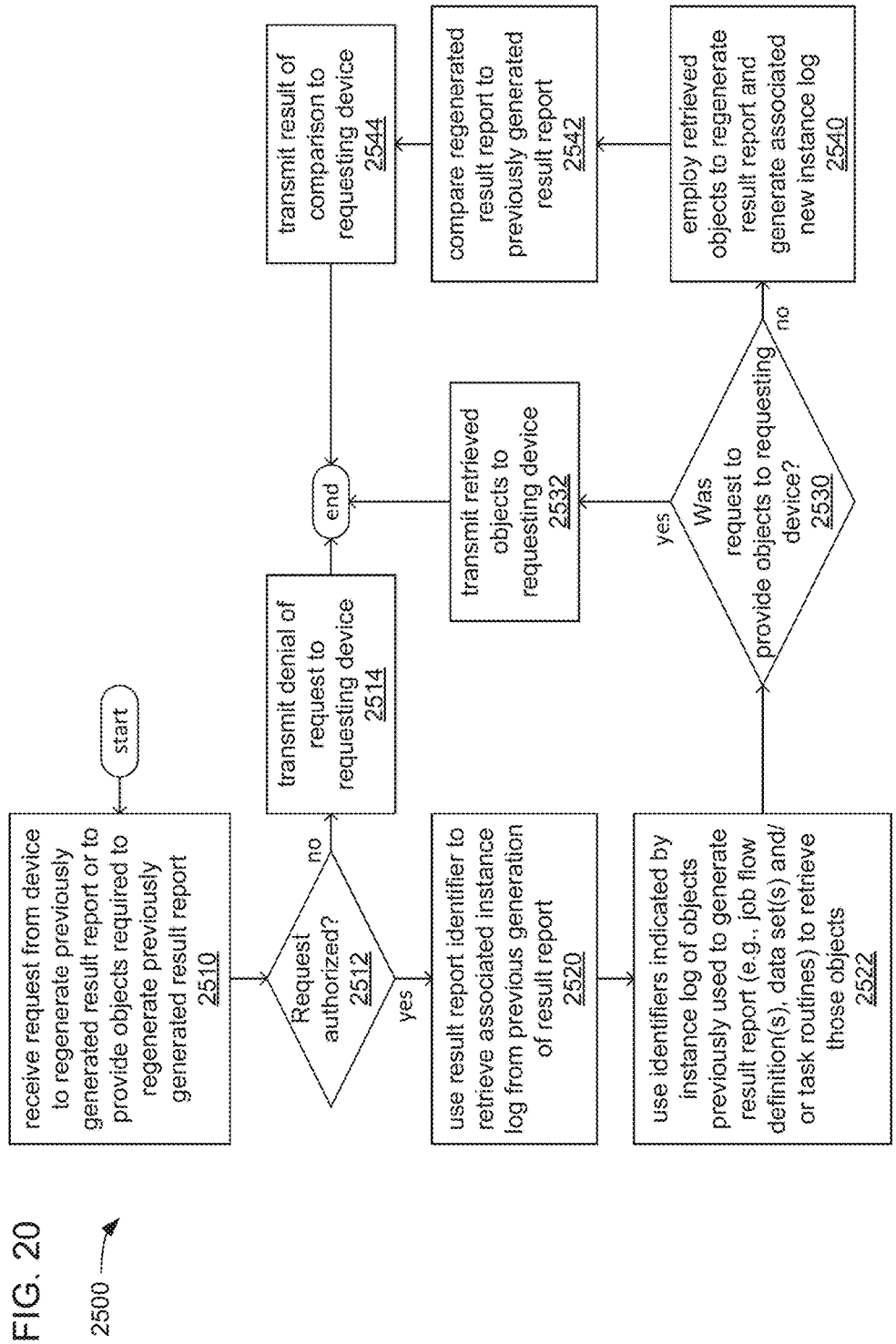
FIG. 20 illustrates an example embodiment of a logic flow of a federated device either repeating an earlier performance of a job flow or transmitting objects to enable a requesting device to do so.

FIG. 20 illustrates an example embodiment of a logic flow 2500. The logic flow 2500 may be representative of some or all of the operations executed by one or more embodiments described herein. More specifically, the logic flow 2500 may illustrate operations performed by the processor 1550 in executing the control routine 1540, and/or performed by other component(s) of at least one of the federated devices 1500.

At 2510, a processor of a federated device of a distributed processing system (e.g., the processor 1550 of one of the federated devices 1500 of the distributed processing system 1000) may receive a request from a reviewing device, via a network (e.g., one of the reviewing devices 1800 via the network 1999) and through a portal provided by the processor, to regenerate a result report (e.g., one of the result reports 1770), or to provide the reviewing device with the objects (e.g., one or more of the objects 1220, 1330, 1370, 1440 and/or 1720) from the federated area (e.g., the federated area 1566) needed to enable the reviewing device to independently regenerate the result report. As previously discussed, persons and/or entities involved in peer reviewing and/or other forms of review of analyses may operate a reviewing device to make a request for one or more federated devices to repeat a performance of a job flow to verify an earlier performance, or may make a request for the objects needed from the federated area provided by the one or more federated devices to allow the persons and/or entities to independent repeat the performance.

At 2512, in embodiments in which the federated device(s) that provide the federated area also control access to the federated area, the processor may perform a check of whether the request is from an authorized reviewing device and/or from an authorized person or entity operating the reviewing device. If, at 2512, the processor determines that the request is not from an authorized reviewing device and/or not from a person and/or entity authorized to be granted the access requested to objects within the federated area, then the processor may transmit an indication of denial of the request to the source device via the network at 2514.

However, if at 2512, the processor determines that the request either for a result report regenerated from a repeat performance of a job flow within the federated area or for the objects needed from the federated area to independent repeat the performance is authorized, then at 2520, the processor may the use the result report identifier for the result report provided in the request to retrieve the instance log associated with the previous performance that previously begat the result report. At 2522, the processor may use the identifiers specified in the instance log for the objects associated with the previous performance to retrieve each of those objects.

If, at 2530, the request received from the reviewing device was to provide the objects needed to enable an independent repeat performance of the job flow that previously begat the result report, then at 2532, the processor may transmit the retrieved objects to the reviewing device to so enable such an independent repeat performance. As previously discussed, the regenerated result report may be compared at the reviewing device to the result report that was previously generated to verify one or more aspects of the previous performance.

However, if at 2530, the request received was not to so provide the retrieved objects, but instead, was for one or more federated devices to repeat the performance of the job flow, then the processor may employ the retrieved objects at 2540 to repeat the performance, and thereby regenerate the result report. As previously discussed, in some embodiments, including embodiments in which one or more of the data sets associated with the previous performance is relatively large in size, the processor of the federated device may cooperate with the processors of multiple other federated devices (e.g., operate as the federated device grid 1005) to portions of the repeat performance among multiple federate devices to be carried out at least partially in parallel.

At 2542, the processor may compare the regenerated result report to the result report previously generated in the previous performance of the job flow. The processor may then transmit the results of that comparison to the requesting reviewing device at 2544.

Figure 21A:
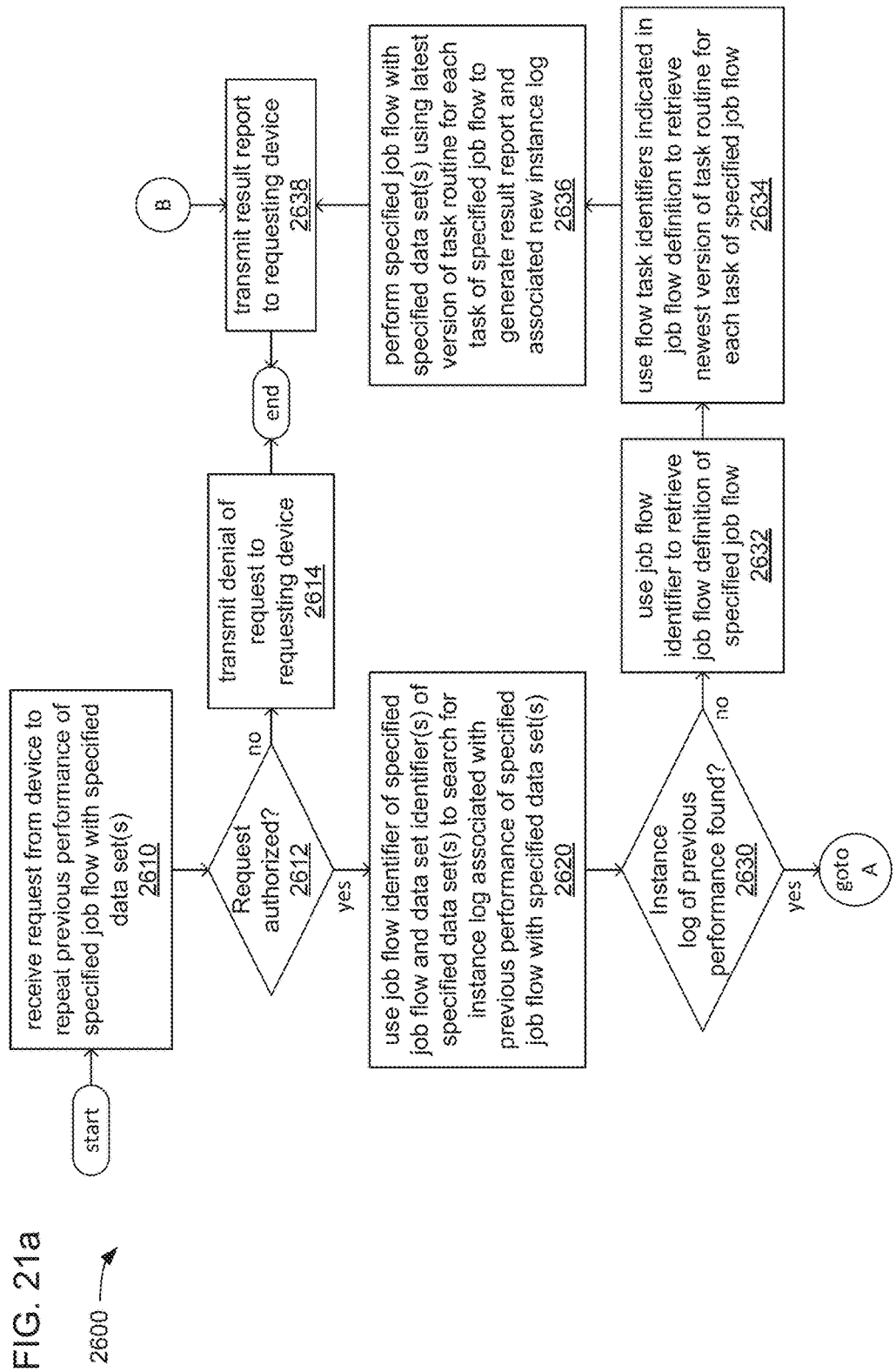
FIGS. 21A and 21B, together, illustrate an example embodiment of a logic flow of a federated device performing a job flow.
Figure 21B:
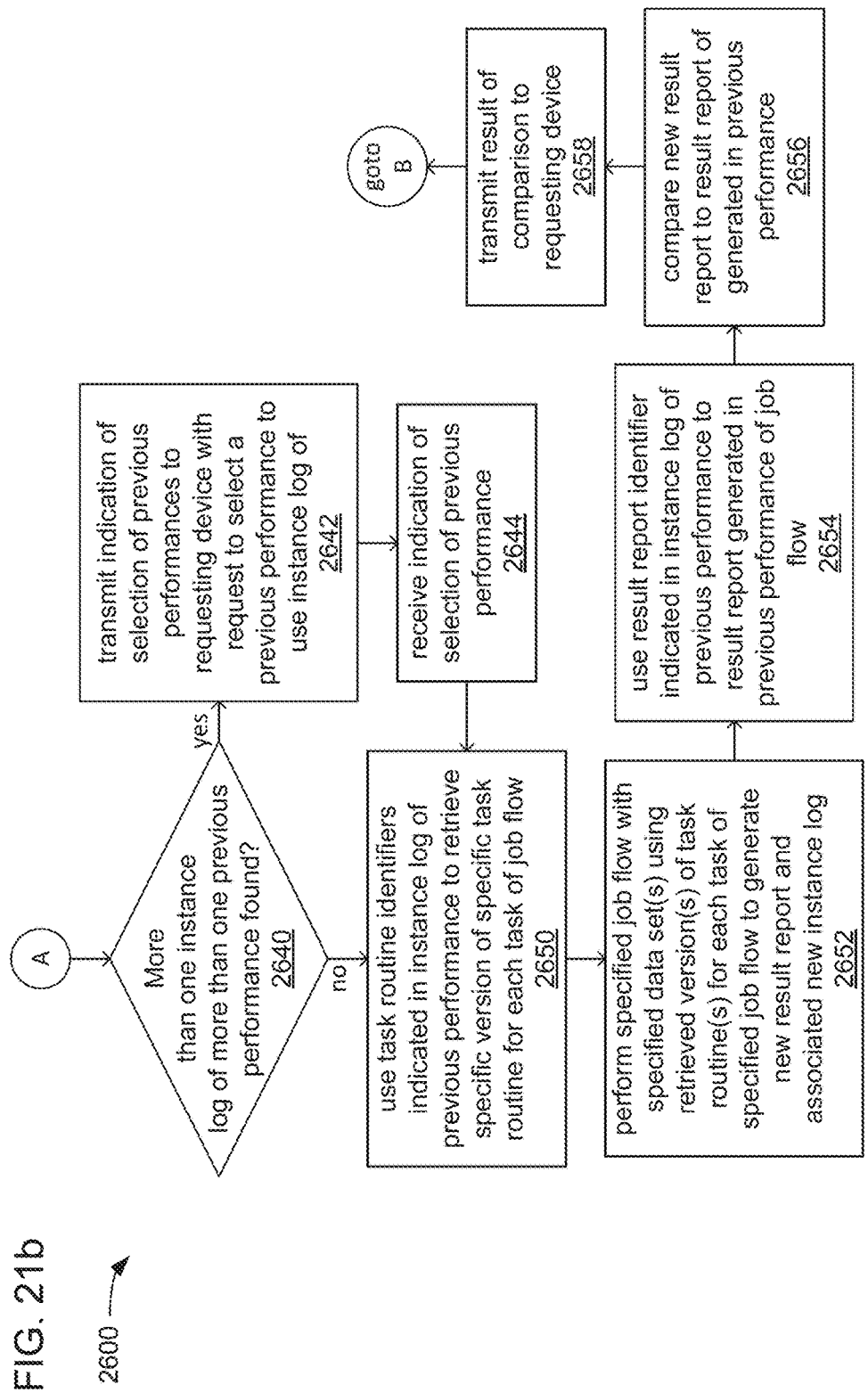

FIGS. 21A and 21B, together, illustrate an example embodiment of a logic flow 2600. The logic flow 2600 may be representative of some or all of the operations executed by one or more embodiments described herein. More specifically, the logic flow 2600 may illustrate operations performed by the processor 1550 in executing the control routine 1540, and/or performed by other component(s) of at least one of the federated devices 1500.

At 2610, a processor of a federated device of a distributed processing system (e.g., the processor 1550 of one of the federated devices 1500 of the distributed processing system 1000) may receive a request from a reviewing device, via a network (e.g., one of the reviewing devices 1800 via the network 1999) and through a portal provided by the processor, to repeat a previous performance a job flow with one or more data sets (e.g. one or more of the data sets 1330) specified in the request by a job flow identifier and one or more data object identifiers (e.g., one of the job flow identifiers 1221, and one or more of the data object identifiers 1331) within the federated area (e.g., the federated area 1566). As previously discussed, persons and/or entities involved either in consuming results of analyses or in reviewing past performances of analyses may operate a reviewing device to make a request for one or more federated devices to perform a job flow.

At 2612, in embodiments in which the federated device(s) that provide the federated area also control access to the federated area, the processor may perform a check of whether the request is from an authorized reviewing device and/or from an authorized person or entity operating the reviewing device. If, at 2612, the processor determines that the request is not from an authorized reviewing device and/or not from a person and/or entity authorized to be granted the requested access for being provided with objects generated within the federated area, then the processor may transmit an indication of denial of the request to the source device via the network at 2614.

However, if at 2612, the processor determines that the request for a performance of the specified job flow with the specified one or more data sets is authorized, then at 2620, the processor may the use the combination of the job flow identifier and the one or more data object identifiers to search within the federated area for an instance log associated with a previous performance of the job flow with the one or more data sets. If, at 2630, the processor determines that there is no such instance log, then at 2632, the processor may retrieve the job flow definition specified by the job flow identifier provided in the request (e.g., one of the job flow definitions 1220). At 2634, the processor may then retrieve the most recent version of task routine stored within the federated area for each task specified in the job flow definition by a flow task identifier (e.g., one or more of the task routines 1440, each specified by a flow task identifiers 1241). At 2636, the processor may retrieve each of the one or more data sets specified by the one or more data object identifiers, and may then use the retrieved job flow definition, the retrieved newest versions of task routines, and the retrieved one or more data sets to perform the job flow as requested. At 2638, the processor may transmit the results of the performance to the reviewing device. As an alternative to (or in addition to) performing the job flow with the most recent versions of the task routines, the processor may transmit an indication to the requesting device that no record has been found in the federated area of a previous performance.

However, if at 2630, the processor successfully locates such an instance log, then the process may additionally determine at 2640 whether there is more than one such instance log, each of which is associated with a different performance of the job flow with the one or more data sets specified in the request. If only one such instance log is located at 2640, then at 2650, the processor may then retrieve the versions specified in the instance log of each of the task routines stored within the federated area for each task specified in the job flow definition by a flow task identifier. At 2652, the processor may retrieve each of the one or more data sets specified by the one or more data object identifiers, and may then use the retrieved job flow definition, the retrieved specified versions of task routines, and the retrieved one or more data sets to perform the job flow as requested. At 2654, the processor may additionally retrieve the result report generated in the previous performance of the job flow, and may compare the retrieved result report to the new result report generated in the new performance of the job flow at 2566. At 2658, the processor may transmit the results of the comparison of result reports to the reviewing device, and may transmit the new result report, itself, to the reviewing device at 2638.

However, if at 2640, there is more than one such instance log located, then the processor may transmit an indication of the available selection of the multiple previous performances that correspond to the multiple located instance logs to the reviewing device with a request that one of the multiple previous performances be selected as the one from which the instance log will be used. The processor may then await receipt of an indication of a selection of one of the multiple previous performances at 2644 before proceeding to retrieve specific versions of task routines at 2650.

Figure 22A:
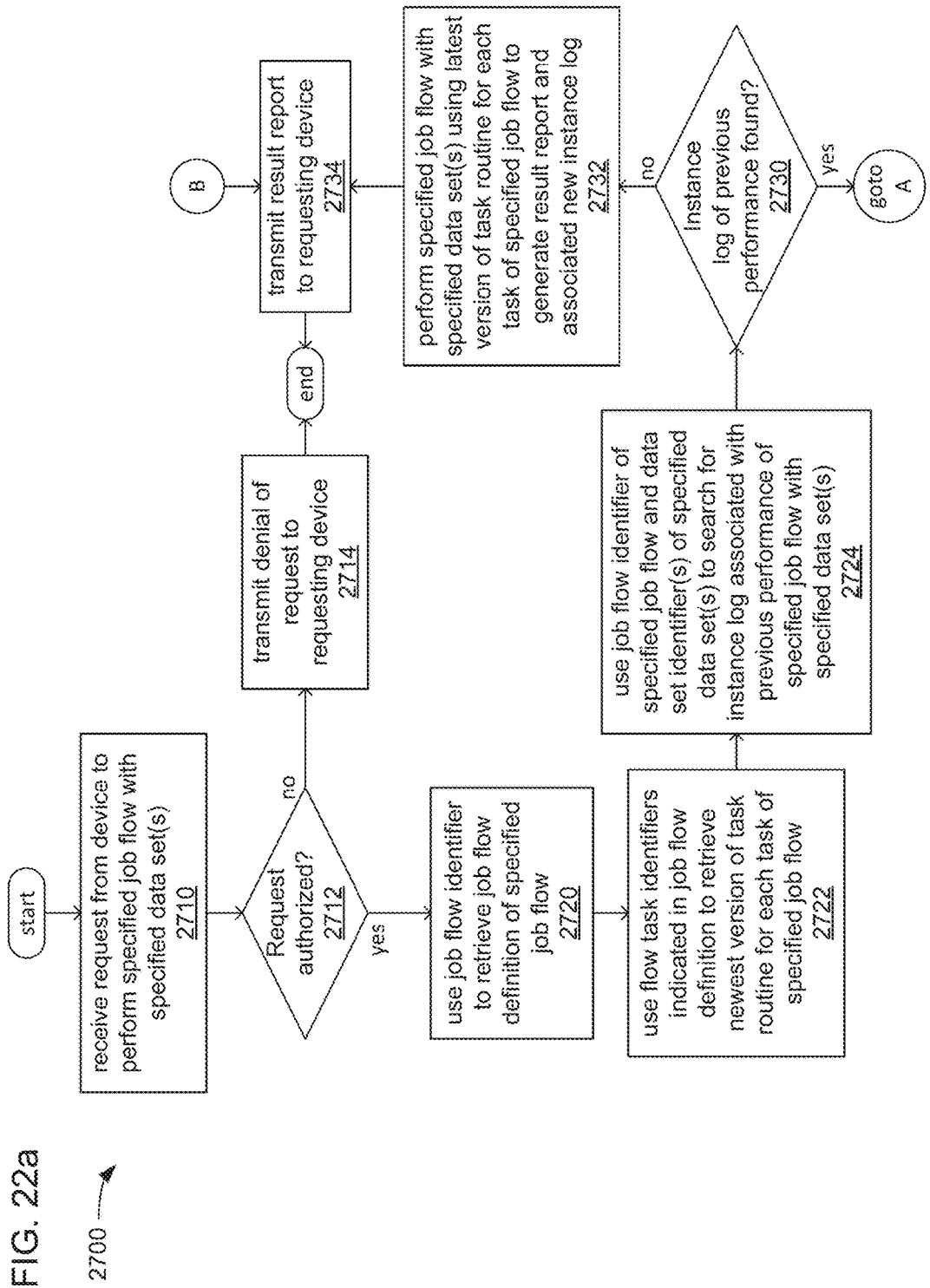

FIGS. 22A and 22B, together, illustrate an example embodiment of a logic flow 2700. The logic flow 2700 may be representative of some or all of the operations executed by one or more embodiments described herein. More specifically, the logic flow 2700 may illustrate operations performed by the processor 1550 in executing the control routine 1540, and/or performed by other component(s) of at least one of the federated devices 1500.

At 2710, a processor of a federated device of a distributed processing system (e.g., the processor 1550 of one of the federated devices 1500 of the distributed processing system 1000) may receive a request from a reviewing device, via a network (e.g., one of the reviewing devices 1800 via the network 1999) and through a portal provided by the processor, to perform a job flow with one or more data sets (e.g. one or more of the data sets 1330) specified in the request by a job flow identifier and one or more data object identifiers (e.g., one of the job flow identifiers 1221, and one or more of the data object identifiers 1331) within the federated area (e.g., the federated area 1566). At 2712, in embodiments in which the federated device(s) that provide the federated area also control access to the federated area, the processor may perform a check of whether the request is from an authorized reviewing device and/or from an authorized person or entity operating the reviewing device. If, at 2712, the processor determines that the request is not from an authorized reviewing device and/or not from a person and/or entity authorized to be granted the requested access for being provided with objects generated within the federated area, then the processor may transmit an indication of denial of the request to the source device via the network at 2714.

However, if at 2612, the processor determines that the request for a performance of the specified job flow with the specified one or more data sets is authorized, then at 2720, the processor may the use the job flow identifier provided in the request to retrieve the corresponding job flow definition (e.g., one of the job flow definitions 1220) from within the federated area. At 2722, the processor may then retrieve the most recent version of task routine stored within the federated area for each task specified in the job flow definition by a flow task identifier (e.g., one or more of the task routines 1440, each specified by a flow task identifiers 1241).

At 2724, the processor may use the combination of the job flow identifier and the one or more data object identifiers to search within the federated area for an instance log associated with a previous performance of the job flow with the one or more data sets. If, at 2730, the processor determines that there is no such instance log, then at 2732, the processor may retrieve each of the one or more data sets specified by the one or more data object identifiers, and may then use the retrieved job flow definition, the retrieved newest versions of task routines, and the retrieved one or more data sets to perform the job flow as requested. At 2734, the processor may transmit the results of the performance to the reviewing device.

However, if at 2730, the processor successfully locates such an instance log, then the process may additionally determine at 2740 whether there is more than one such instance log, each of which is associated with a different performance of the job flow with the one or more data sets specified in the request. If only one such instance log is located at 2740, then at 2750, the processor may then retrieve the versions specified in the instance log of each of the task routines stored within the federated area for each task specified in the job flow definition by a flow task identifier. However, if at 2740, there is more than one such instance log located, then the processor may analyze the multiple instance logs to identify and select the instance log from among the multiple instance logs that is associated with the most recent performance of the job flow at 2742, before proceeding to retrieve specified versions task routines for each task of the job flow at 2750.

At 2752, for each task specified in the job flow definition, the processor may compare the retrieved version of the task routine identified in the instance log to the newest version stored within the federated area to determine whether each of the retrieved task routines is the newest version. At 2760, if each of the retrieved task routines is the newest version thereof, then there is no need to perform the job flow anew, as the most recent previous performance (or the only previous performance) used the newest version of each task routine such that the result report generated is already the most up to date form of the result report, possible. Thus, at 2762, the processor may retrieve the result report of that previous performance using the result report identifier specified by the instance log, and may then transmit the result report to the reviewing device at 2734.

However, if at 2760, one or more of the task routines specified in the instance log and retrieved from the federated area is not the newest version thereof, then at 2770, the processor may parse the job flow set forth in the job flow definition to identify the earliest task within the job flow at which the version of the task routine retrieved from the federated area is not the newest version. At 2772, starting at that earliest task, the processor may use the newest version of task routine for that task and for each later task in the job flow to perform that task and each of the later tasks, thereby taking advantage of the one or more earlier tasks of job flow at which the newest version of task routine was used in the most recent previous performance (or the only previous performance). The processor may then transmit the result report generated in the partial performance of the job flow to the reviewing device at 2734.

In various embodiments, each of the processors 1150, 1550 and 1850 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 1550 of each of the one or more federated devices 1500 may be selected to efficiently perform the analysis of multiple instances of job flows at least partially in parallel. By way of example, the processor 1550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1550 may incorporate multi-threaded capabilities and/or multiple processor cores to enable parallel performances of the tasks of more than job flow.

In various embodiments, each of the control routines 1140, 1540 and 1840, including the components of which each is composed, may be selected to be operative on whatever type of processor or processors that are selected to implement applicable ones of the processors 1150, 1550 and/or 1850 within each one of the devices 1100, 1500 and/or 1800, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1150, 1550 and/or 1850. Where one or more device drivers are included, those device drivers may provide support for any of a variety of other components, whether hardware or software components, of the devices 1100, 1500 and/or 1800.

In various embodiments, each of the storages 1160, 1560 and 1860 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1560 in embodiments in which the one or more of the federated devices 1500 provide the federated space 1566, or the storage devices 1600 in embodiments in which the one or more storage devices 1600 provide the federated space 1566, may be implemented with a redundant array of independent discs (RAID) of a RAID level selected to provide fault tolerance to objects stored within the federated space 1566.

In various embodiments, each of the input devices 1110 and 1810 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the displays 1180 and 1880 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 1180 and/or 1880 may each be a touch-screen display such that the input devices 1110 and/or 1810, respectively, may be incorporated therein as touch-sensitive components thereof.

In various embodiments, each of the network interfaces 1190, 1590 and 1890 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, one or more of the network interfaces 1190, 1590 and/or 1890 may be implemented with multiple copper-based or fiber-optic based network interface ports to provide redundant and/or parallel pathways in exchanging one or more of the data sets 1330 and/or 1370.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of portions of the data sets 1330 and/or 1370 are not dependent on, nor constrained by, existing API architectures and/or supporting communications protocols. More broadly, there is nothing in the manner in which the data sets 1330 and/or 1370 may be organized in storage, transmission and/or distribution via the network 1999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:
1. An apparatus comprising a processor and a storage to store instructions that, when executed by the processor, cause the processor to perform operations comprising:
   maintain, within one or more storage devices, a federated area to store multiple data sets, multiple job flow definitions, multiple task routines, multiple result reports and multiple instance logs;
   provide, on a network, a portal to control access by a remote device to the federated area via the network;
   receive, at the portal, and from the remote device via the network, a first request to execute at least one task routine stored in the federated area to perform at least one corresponding task of a job flow specified in a job flow definition stored in the federated area with at least one data set stored in the federated area, wherein the first request specifies the job flow definition and the at least one data set;

retrieve the job flow definition from among the multiple job flow definitions stored in the federated area;
retrieve the at least one data set from among the multiple data sets stored in the federated area;
determine whether there are one or more instance logs among the multiple instance logs stored in the federated area that were each generated by a previous performance of the at least one task of the job flow with the at least one data set;
in response to a determination that there is just one instance log among the multiple instance logs stored in the federated area that was generated by a previous performance of the at least one task of the job flow with the at least one data set, the processor is caused to perform operations comprising:
  retrieve, from among the multiple task routines stored in the federated area, a version specified by the one instance log of each task routine of the at least one task routine;
  execute the retrieved version of each task routine of the at least one task routine to perform the at least one corresponding task of the job flow with the at least one data set to generate a new result report and a new instance log;
  store the new result report among the multiple result reports in the federated area;
  store the new instance log among the multiple instance logs in the federated area; and
  provide access to the new result report to the remote device via the network;
in response to a determination that there is no instance log among the multiple instance logs stored in the federated area that was generated by a previous performance of the at least one task of the job flow with the at least one data set, the processor is caused to perform operations comprising:
  retrieve, from among the multiple task routines stored in the federated area, a most recent version of each task routine of the at least one task routine;
  execute the most recent version of each task routine of the at least one task routine to perform the at least one corresponding task of the job flow with the at least one data set to generate a new result report and a new instance log;
  store the new result report among the multiple result reports in the federated area;
  store the new instance log among the multiple instance logs in the federated area; and
  provide access to the new result report to the remote device via the network; and
in response to a determination that there is more than one instance log among the multiple instance logs that were each generated by a previous performance of the at least one task of the job flow with the at least one data set, the processor is caused to provide, via the network, an indication of the more than one instance log to the remote device.

2. The apparatus of claim 1, wherein:
in response to a determination that there is more than one instance log among the multiple instance logs that were each generated by a previous performance of the at least one task of the job flow with the at least one data set, the processor is caused to perform operations comprising:
provide, via the network, a second request to the remote device to select an instance log from among the more than one instance log;
receive, at the portal, and from the remote device via the network, an indication of a selected instance log from among the more than one instance log; and
retrieve, from among the multiple task routines stored in the federated area, a version of each task routine of the at least one task routine specified by the selected instance log.

3. The apparatus of claim 1, wherein:
the determination of whether there is an instance log among the multiple instance logs stored in the federated area that was generated by a previous performance of the at least one task of the job flow with the at least one data set comprises a determination, by the processor, of whether there is more than one instance log among the multiple instance logs that were each generated by a previous performance of the at least one task of the job flow with the at least one data set; and
in response to a determination that there is more than one instance log among the multiple instance logs that were each generated by a previous performance of the at least one task of the job flow with the at least one data set, the processor is caused to retrieve, from among the multiple task routines stored in the federated area, a version of each task routine of the at least one task routine specified by the most recently generated one of the more than one instance logs.

4. The apparatus of claim 1, wherein the processor is caused to perform operations comprising:
prior to the determination of whether there is an instance log that was generated by a previous performance of the at least one task, determine whether the first request is authorized;
condition performance of the determination of whether there is an instance log that was generated by a previous performance of the at least one task, the performance of the at least one task, and the storage of the new result report and the new instance log on the determination of whether the first request is authorized; and
in response to a determination that the first request is not authorized, provide an indication of a denial of the first request to the remote device via the network.

5. The apparatus of claim 1, wherein, in the generation of the new instance log, the processor is caused to perform operations comprising:
take at least a first hash of the at least one data set;
take at least a second hash of the retrieved version of a task routine of the at least one task routine;
take at least a third hash of the new result report; and
concatenate at least the first, second and third hashes to generate a string.

6. The apparatus of claim 5, wherein, in the generation of the new instance log, the processor is caused to generate the new instance log to comprise the string.

7. The apparatus of claim 5, wherein, in the storage of the new instance log among the multiple instance logs within the federated area, the processor is caused to use the string as an index to a location in the federated area at which the new instance log is stored.

8. The apparatus of claim 1, wherein, in the determination of whether there is an instance log stored among the multiple instance logs that was generated by a previous performance of the at least one task of the job flow with the at least one data set, the processor is caused to perform operations comprising:
use at least one data set identifier of the at least one data set and a flow identifier of the job flow as portions of an index to a location in the federated area; and search the location for an instance log that was generated by a previous performance of the at least one task of the job flow with the at least one data set.

9. The apparatus of claim 1, wherein the processor is caused to perform operations comprising:
receive, at the portal, and from a source device via the network, a second request to store a task routine among the multiple task routines in the federated area, wherein the task routine comprises a flow task identifier to indicate a corresponding task that is performed when the task routine is executed;
determine whether another task routine is already stored among the multiple task routines in the federated area that comprises the same flow task identifier to indicate that the same corresponding task is performed when the other task routine is executed; and
in response to a determination that another task routine is already stored among the multiple task routines that comprises the same flow task identifier, store the task routine among the multiple task routines and store an indication of the storage of more than one task routine comprising the same flow task identifier in the federated area.

10. The apparatus of claim 1, wherein:
for each task of the at least one task of the job flow, the job flow definition comprises a corresponding flow task identifier; and
in the retrieval of a task routine for each task of the at least one task of the job flow, the processor is caused to use the corresponding task flow identifier as at least a portion of an index to a location in the federated area.

11. A computer-program product tangibly embodied in a non-transitory machine-readable storage medium, the computer-program product including instructions operable to cause a processor to perform operations comprising:
maintain, within one or more storage devices, a federated area to store multiple data sets, multiple job flow definitions, multiple task routines, multiple result reports and multiple instance logs;
provide, on a network, a portal to control access by a remote device to the federated area via the network;
receive, at the portal, and from the remote device via the network, a first request to execute at least one task routine stored in the federated area to perform at least one corresponding task of a job flow specified in a job flow definition stored in the federated area with at least one data set stored in the federated area, wherein the first request specifies the job flow definition and the at least one data set;
retrieve the job flow definition from among the multiple job flow definitions stored in the federated area;
retrieve the at least one data set from among the multiple data sets stored in the federated area;
determine whether there are one or more instance logs among the multiple instance logs stored in the federated area that were each generated by a previous performance of the at least one task of the job flow with the at least one data set;
in response to a determination that there is just one instance log among the multiple instance logs stored in the federated area that was generated by a previous performance of the at least one task of the job flow with the at least one data set, the processor is caused to perform operations comprising:
retrieve, from among the multiple task routines stored in the federated area, a version specified by the one instance log of each task routine of the at least one task routine;
execute the retrieved version of each task routine of the at least one task routine to perform the at least one corresponding task of the job flow with the at least one data set to generate a new result report and a new instance log;
store the new result report among the multiple result reports in the federated area;
store the new instance log among the multiple instance logs in the federated area; and
provide access to the new result report to the remote device via the network;
in response to a determination that there is no instance log among the multiple instance logs stored in the federated area that was generated by a previous performance of the at least one task of the job flow with the at least one data set, the processor is caused to perform operations comprising:
retrieve, from among the multiple task routines stored in the federated area, a most recent version of each task routine of the at least one task routine;
execute the most recent version of each task routine of the at least one task routine to perform the at least one corresponding task of the job flow with the at least one data set to generate a new result report and a new instance log;
store the new result report among the multiple result reports in the federated area;
store the new instance log among the multiple instance logs in the federated area; and
provide access to the new result report to the remote device via the network; and
in response to a determination that there is more than one instance log among the multiple instance logs that were each generated by a previous performance of the at least one task of the job flow with the at least one data set, the processor is caused to provide, via the network, an indication of the more than one instance log to the remote device.

12. The computer-program product of claim 11, wherein:
in response to a determination that there is more than one instance log among the multiple instance logs that were each generated by a previous performance of the at least one task of the job flow with the at least one data set, the processor is caused to perform operations comprising:
provide, via the network, a second request to the remote device to select an instance log from among the more than one instance log;
receive, at the portal, and from the remote device via the network, an indication of a selected instance log from among the more than one instance log; and
retrieve, from among the multiple task routines stored in the federated area, a version of each task routine of the at least one task routine specified by the selected instance log.

13. The computer-program product of claim 11, wherein:
the determination of whether there is an instance log among the multiple instance logs stored in the federated area that was generated by a previous performance of the at least one task of the job flow with the at least one data set comprises a determination, by the processor, of whether there is more than one instance log among the multiple instance logs that were each generated by a previous performance of the at least one task of the job flow with the at least one data set; and in response to a determination that there is more than one instance log among the multiple instance logs that were each generated by a previous performance of the at least one task of the job flow with the at least one data set, the processor is caused to retrieve, from among the multiple task routines stored in the federated area, a version of each task routine of the at least one task routine specified by the most recently generated one of the more than one instance logs.

14. The computer-program product of claim 11, wherein the processor is caused to perform operations comprising:
   prior to the determination of whether there is an instance log that was generated by a previous performance of the at least one task, determine whether the first request is authorized;
   condition performance of the determination of whether there is an instance log that was generated by a previous performance of the at least one task, the performance of the at least one task, and the storage of the new result report and the new instance log on the determination of whether the first request is authorized; and
   in response to a determination that the first request is not authorized, provide an indication of a denial of the first request to the remote device via the network.

15. The computer-program product of claim 11, wherein, in the generation of the new instance log, the processor is caused to perform operations comprising:
   take at least a first hash of the at least one data set;
   take at least a second hash of the retrieved version of a task routine of the at least one task routine;
   take at least a third hash of the new result report; and
   concatenate at least the first, second and third hashes to generate a string.

16. The computer-program product of claim 15, wherein, in the generation of the new instance log, the processor is caused to generate the new instance log to comprise the string.

17. The computer-program product of claim 15, wherein, in the storage of the new instance log among the multiple instance logs within the federated area, the processor is caused to use the string as an index to a location in the federated area at which the new instance log is stored.

18. The computer-program product of claim 11, wherein, in the determination of whether there is an instance log stored among the multiple instance logs that was generated by a previous performance of the at least one task of the job flow with the at least one data set, the processor is caused to perform operations comprising:
   use at least one data set identifier of the at least one data set and a flow identifier of the job flow as portions of an index to a location in the federated area; and
   search the location for an instance log that was generated by a previous performance of the at least one task of the job flow with the at least one data set.

19. The computer-program product of claim 11, wherein the processor is caused to perform operations comprising:
   receive, at the portal, and from a source device via the network, a second request to store a task routine among the multiple task routines in the federated area, wherein the task routine comprises:
      a flow task identifier to indicate a corresponding task that is performed when the task routine is executed;
      an input interface by which the task routine is to receive the at least one data set; and
      an output interface;
   determine whether another task routine is already stored among the multiple task routines in the federated area that comprises the same flow task identifier to indicate that the same corresponding task is performed when the other task routine is executed; and
   in response to a determination that another task routine is already stored among the multiple task routines that comprises the same flow task identifier, perform operations comprising:
      compare the input interface to a corresponding input interface of the other task routine;
      compare the output interface to a corresponding output interface of the other task routine; and
      in response to a determination that the input interface matches the corresponding input interface, and in response to a determination that the output interface matches or is a superset of the corresponding output interface, store the task routine among the multiple task routines and store an indication of the storage of more than one task routine comprising the same flow task identifier in the federated area.

20. The computer-program product of claim 11, wherein:
   for each task of the at least one task of the job flow, the job flow definition comprises a corresponding flow task identifier; and
   in the retrieval of a task routine for each task of the at least one task of the job flow, the processor is caused to use the corresponding task flow identifier as at least a portion of an index to a location in the federated area.

21. A computer-implemented method comprising:
   maintaining, at a server by a processor, and within one or more storage devices, a federated area to store multiple data sets, multiple job flow definitions, multiple task routines, multiple result reports and multiple instance logs;
   providing, at the server by the processor, a portal to control access by a remote device to the federated area through a network coupled to the server;
   receiving, at the portal at the server, and from the remote device via the network, a first request to execute at least one task routine stored in the federated area to perform at least one corresponding task of a job flow specified in a job flow definition stored in the federated area with at least one data set stored in the federated area, wherein the first request specifies the job flow definition and the at least one data set;
   retrieving, by the processor, the job flow definition from among the multiple job flow definitions stored in the federated area;
   retrieving, by the processor, the at least one data set from among the multiple data sets stored in the federated area;
   determining, by the processor, whether there are one or more instance logs among the multiple instance logs stored in the federated area that were each generated by a previous performance of the at least one task of the job flow with the at least one data set;
   in response to a determination by the processor that there is just one instance log among the multiple instance logs stored in the federated area that was generated by a previous performance of the at least one task of the job flow with the at least one data set, performing operations comprising:
      retrieving, by the processor and from among the multiple task routines stored in the federated area, a version specified by the one instance log of each task routine of the at least one task routine;

executing the retrieved version of each task routine of the at least one task routine to perform the at least one corresponding task of the job flow with the at least one data set to generate a new result report and a new instance log;

storing, by the processor, the new result report among the multiple result reports in the federated area;

storing, by the processor, the new instance log among the multiple instance logs in the federated area; and providing access to the new result report to the remote device via the network;

in response to a determination by the processor that there is no instance log among the multiple instance logs stored in the federated area that was generated by a previous performance of the at least one task of the job flow with the at least one data set, performing operations comprising:

retrieving by the processor and from among the multiple task routines stored in the federated area, a most recent version of each task routine of the at least one task routine;

executing the most recent version of each task routine of the at least one task routine to perform the at least one corresponding task of the job flow with the at least one data set to generate a new result report and a new instance log;

storing, by the processor, the new result report among the multiple result reports in the federated area;

storing, by the processor, the new instance log among the multiple instance logs in the federated area; and providing access to the new result report to the remote device via the network; and in response to a determination by the processor that there is more than one instance log among the multiple instance logs that were each generated by a previous performance of the at least one task of the job flow with the at least one data set, providing, via the network, an indication of the more than one instance log to the remote device.

22. The computer-implemented method of claim 21, comprising:

in response to a determination by the processor that there is more than one instance log among the multiple instance logs that were each generated by a previous performance of the at least one task of the job flow with the at least one data set, performing operations comprising:

providing, via the network, a second request to the remote device to select an instance log from among the more than one instance log;

receiving, at the portal of the server, and from the remove device via the network, an indication of a selected instance log from among the more than one instance log; and retrieving, by the processor, and from among the multiple task routines stored in the federated area, a version of each task routine of the at least one task routine specified by the selected instance log.

23. The computer-implemented method of claim 21, comprising:

prior to determining whether there is an instance log that was generated by a previous performance of the at least one task, determining, by the processor, whether the first request is authorized;

conditioning the determining of whether there is an instance log that was generated by a previous performance of the at least one task, the performing of the at least one task, and the storing of the new result report and the new instance log on the determining of whether the first request is authorized; and in response determining that the first request is not authorized, providing an indication of a denial of the first request to the remote device via the network.

24. The computer-implemented method of claim 21, wherein generating the new instance log comprises:

taking, by the processor, at least a first hash of the at least one data set;

taking, by the processor, at least a second hash of the retrieved version of a task routine of the at least one task routine;

taking, by the processor, at least a third hash of the new result report; and concatenating, by the processor, at least the first, second and third hashes to generate a string.

25. The computer-implemented method of claim 24, wherein generating the new instance log comprises generating the new instance log to comprise the string.

26. The computer-implemented method of claim 24, wherein storing of the new instance log among the multiple instance logs within the federated area comprises using, by the processor, the string as an index to a location in the federated area at which the new instance log is stored.

27. The computer-implemented method of claim 21, wherein determining whether there is an instance log stored among the multiple instance logs that was generated by a previous performance of the at least one task of the job flow with the at least one data set comprises:

using, by the processor, at least one data set identifier of the at least one data set and a flow identifier of the job flow as portions of an index to a location in the federated area; and searching, by the processor, the location for an instance log that was generated by a previous performance of the at least one task of the job flow with the at least one data set.

28. The computer-implemented method of claim 21, comprising:

receiving, at the portal at the server, and from a source device via the network, a second request to store a task routine among the multiple task routines in the federated area, wherein the task routine comprises a flow task identifier to indicate a corresponding task that is performed when the task routine is executed;

determining, by the processor, whether another task routine is already stored among the multiple task routines in the federated area that comprises the same flow task identifier to indicate that the same corresponding task is performed when the other task routine is executed; and in response to determining that another task routine is already stored among the multiple task routines that comprises the same flow task identifier, storing, by the processor, the task routine among the multiple task routines and store an indication of the storage of more than one task routine comprising the same flow task identifier in the federated area.

29. The computer-implemented method of claim 21, wherein:

for each task of the at least one task of the job flow, the job flow definition comprises a corresponding flow task identifier; and the retrieving of a task routine for each task of the at least one task of the job flow comprises using, by the processor, the corresponding task flow identifier as at least a portion of an index to a location in the federated area.

\* \* \* \* \*